US007026736B2

(12) United States Patent
Safonov

(10) Patent No.: US 7,026,736 B2
(45) Date of Patent: Apr. 11, 2006

(54) TURBINE GENERATOR VIBRATION DAMPER SYSTEM

(76) Inventor: Vladilen Safonov, 455 Graceland Ave., Apt. 2E, Des Plaines, IL (US) 60016

( * ) Notice: Subject to any disclaimer, the term of this patent is extended or adjusted under 35 U.S.C. 154(b) by 15 days.

(21) Appl. No.: 10/724,541

(22) Filed: Dec. 1, 2003

(65) Prior Publication Data

US 2005/0116552 A1    Jun. 2, 2005

(51) Int. Cl.
    *H02K 5/00* (2006.01)
(52) U.S. Cl. .......................... 310/90; 310/51
(58) Field of Classification Search ................. 310/51, 310/89, 90, 91; 290/55, 52; 60/698
    See application file for complete search history.

(56) References Cited

U.S. PATENT DOCUMENTS

| 1,777,852 | A | * | 10/1930 | Lawrence ................... 417/360 |
| 4,561,774 | A | * | 12/1985 | Takahashi et al. ............ 355/75 |
| 4,735,036 | A | * | 4/1988 | Alexander .................. 56/12.6 |
| 5,046,154 | A | * | 9/1991 | MacManus ................. 324/146 |
| 5,083,040 | A | * | 1/1992 | Whitford et al. ............. 290/52 |
| 5,109,943 | A | * | 5/1992 | Crenshaw et al. .......... 180/228 |
| 5,445,105 | A | * | 8/1995 | Chen et al. ................. 114/338 |
| 5,505,662 | A | * | 4/1996 | Giberson ................... 464/156 |
| 6,006,879 | A |   | 12/1999 | Sudau |
| 6,056,093 | A |   | 5/2000 | Hinkel |
| 6,070,704 | A |   | 6/2000 | Sasse |
| 6,102,174 | A |   | 8/2000 | Sasse |
| 6,112,869 | A |   | 9/2000 | Krause et al. |
| 6,298,965 | B1 |   | 10/2001 | Krause et al. |
| 6,471,484 | B1 |   | 10/2002 | Crall |
| 6,857,335 | B1 | * | 2/2005 | Kahara .................... 74/473.33 |

* cited by examiner

*Primary Examiner*—Darren Schuberg
*Assistant Examiner*—Leda T. Pham
(74) *Attorney, Agent, or Firm*—John D. Gugliotta

(57) ABSTRACT

The invention relates to the vibration damper systems (here, method and apparatus) for active removal of beyond-normal internal vibrations from turbine-generator-sets [T-G-Ss*]. The invention relies on dynamic forces generated by a pair of "wings" and associated hardware mounted on the bearing housing, which operate to offset internally produced vibrations in an active or "real time" fashion. This is in contrast to the typical method of taking the turbine-generator off-line, shutting it down and then eliminating the source of vibration. The invention allows the generator to remain operational during adjustments. Thus, it remains on-line producing electricity and associated revenue. The system may be installed at presently operating T-G-Ss. It also foresees the simple developments to be done in future designed T-G-Ss for use of this method. The use of invention provides a real solution to internal vibrations that develop in turbine-generator-sets throughout their lifetime.

17 Claims, 56 Drawing Sheets

The B-F-L-Ws for removal of beyond-normal
vibrations in wide diapasons (variant). See text in Specification.

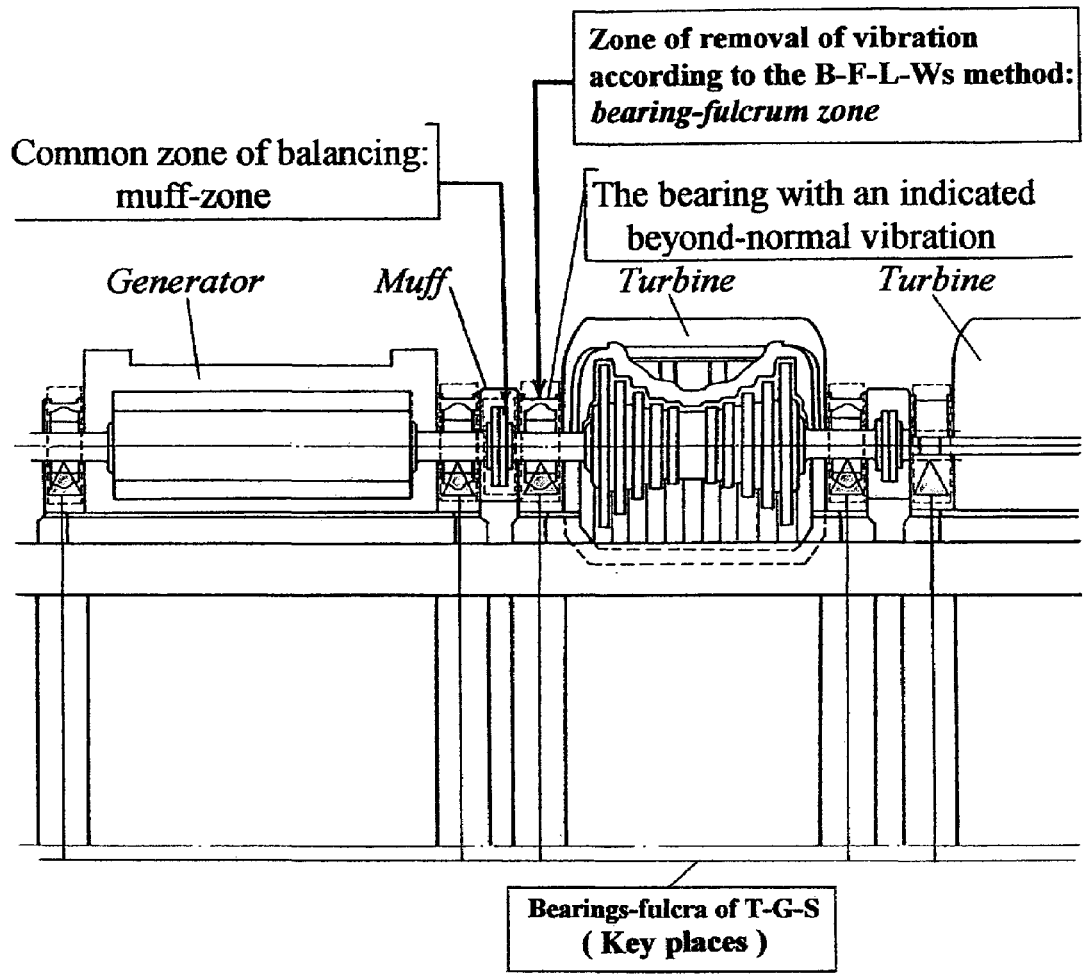
Fig. 1 Zones for application of the process (the method of removal of beyond-normal vibrations at T-G-Ss without stopping their generating electricity / being in operation) - bearings-fulcra zones.

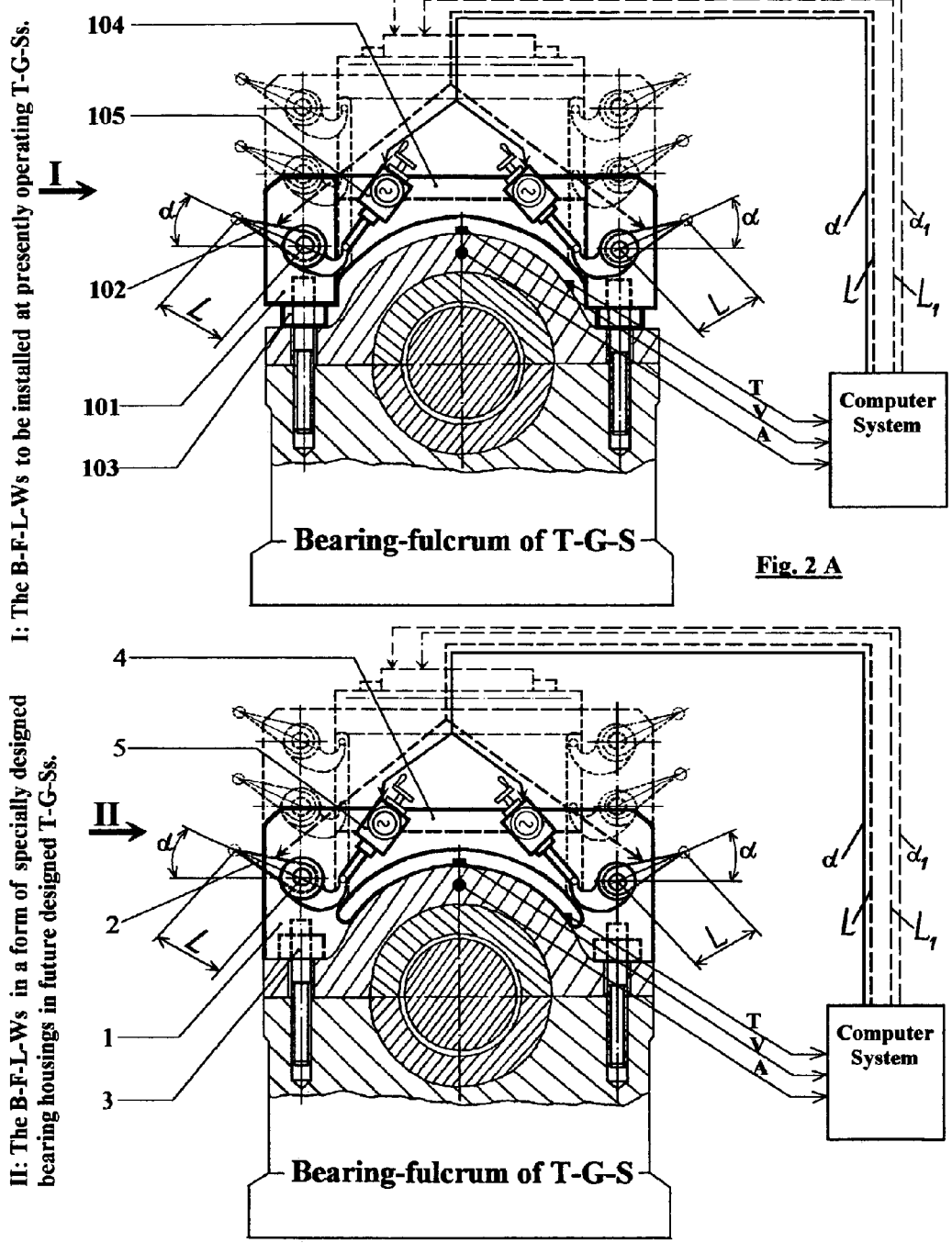
Fig. 2 B Turbine Generator Vibration Damper System: Principal scheme of application upon T-G-Ss.

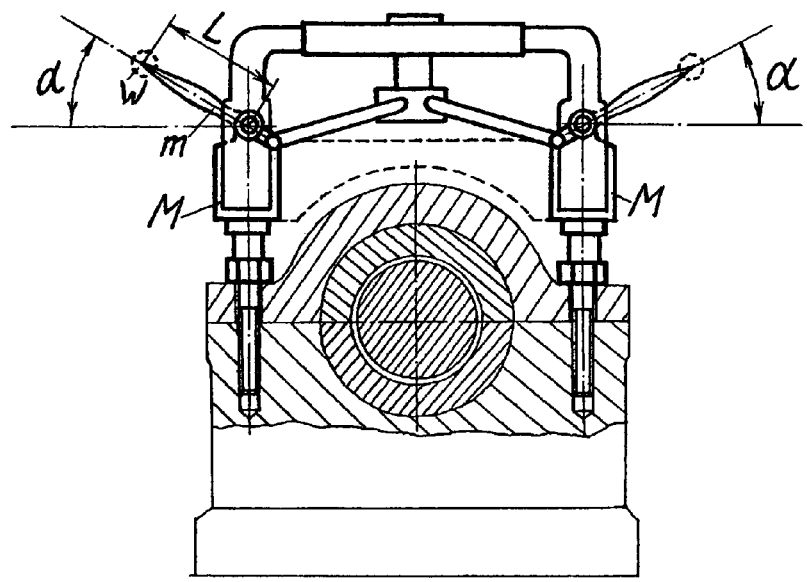
Bearing-fulcrum of T-G-S
Fig. 3 The B-F-L-Ws for removal of beyond-normal vibrations in wide diapasons.
For the stated M & L(m, w) tuning the system to the vibrations damping is done by changing $\alpha$.
See text in Specification.

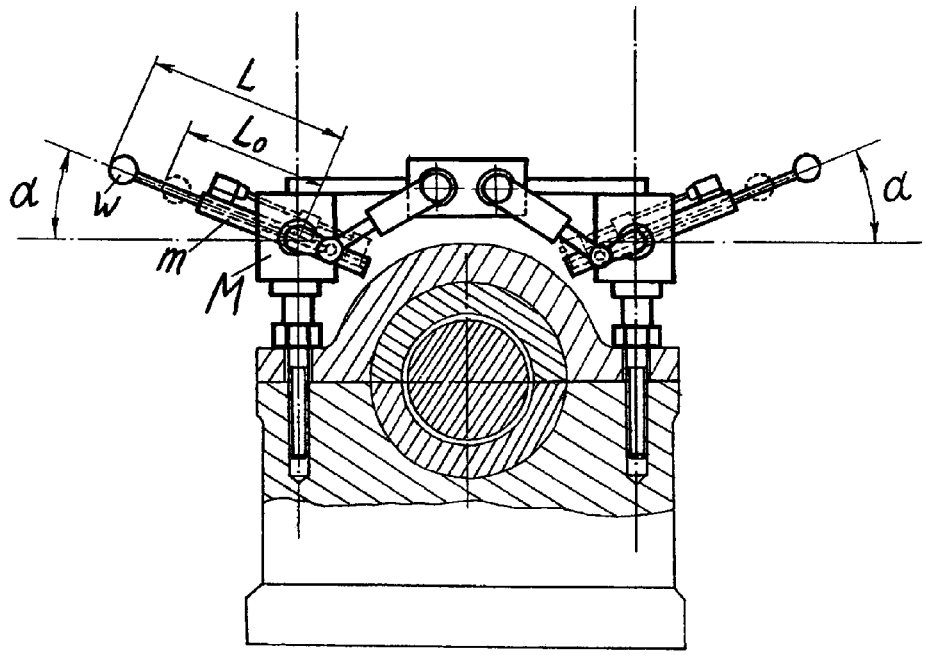
Bearing-fulcrum of T-G-S
Fig. 4   The B-F-L-Ws for removal of beyond-normal vibrations in super-wide diapasons.
For the stated M (and m, w) tuning the system to the vibrations damping is done by changing L and α.
See text in Specification.

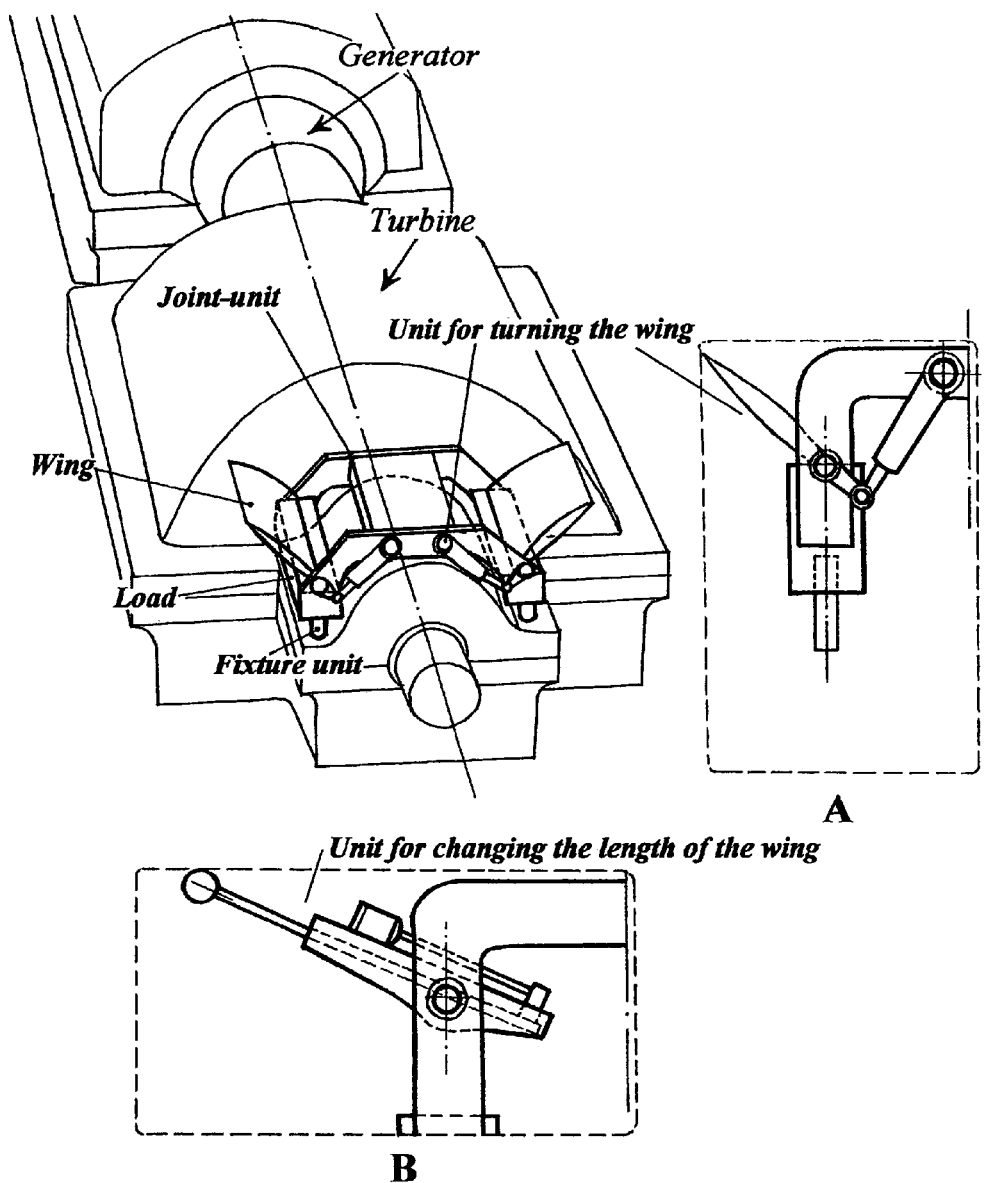
Fig. 5 The main elements of the B-F-L-Ws.

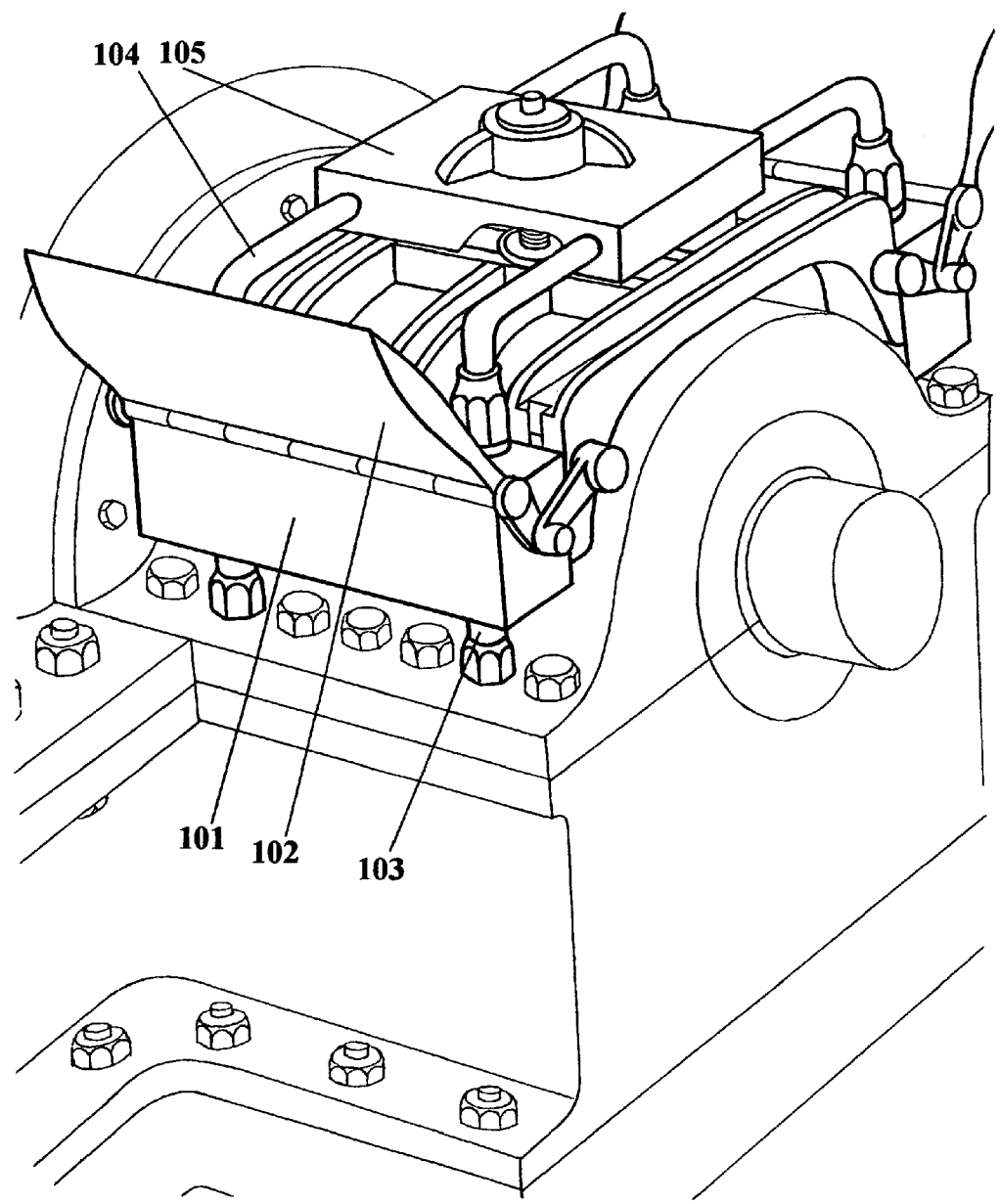
Fig. 6  The B-F-L-Ws for removal of beyond-normal vibrations in wide diapasons (variant). See text in Specification.

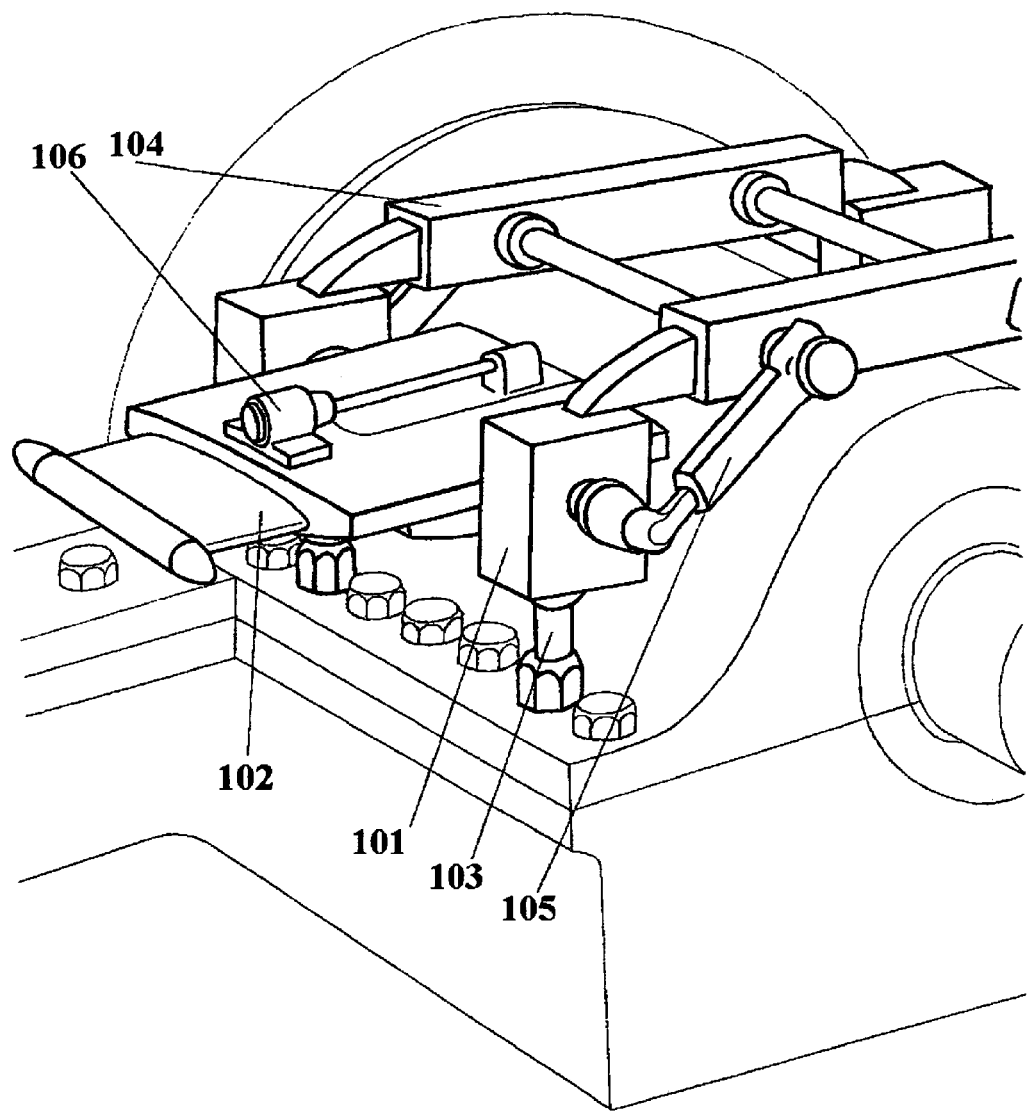
Fig. 7 The B-F-L-Ws for removal of beyond-normal vibrations in super-wide diapasons (variant).
See text in Specification.

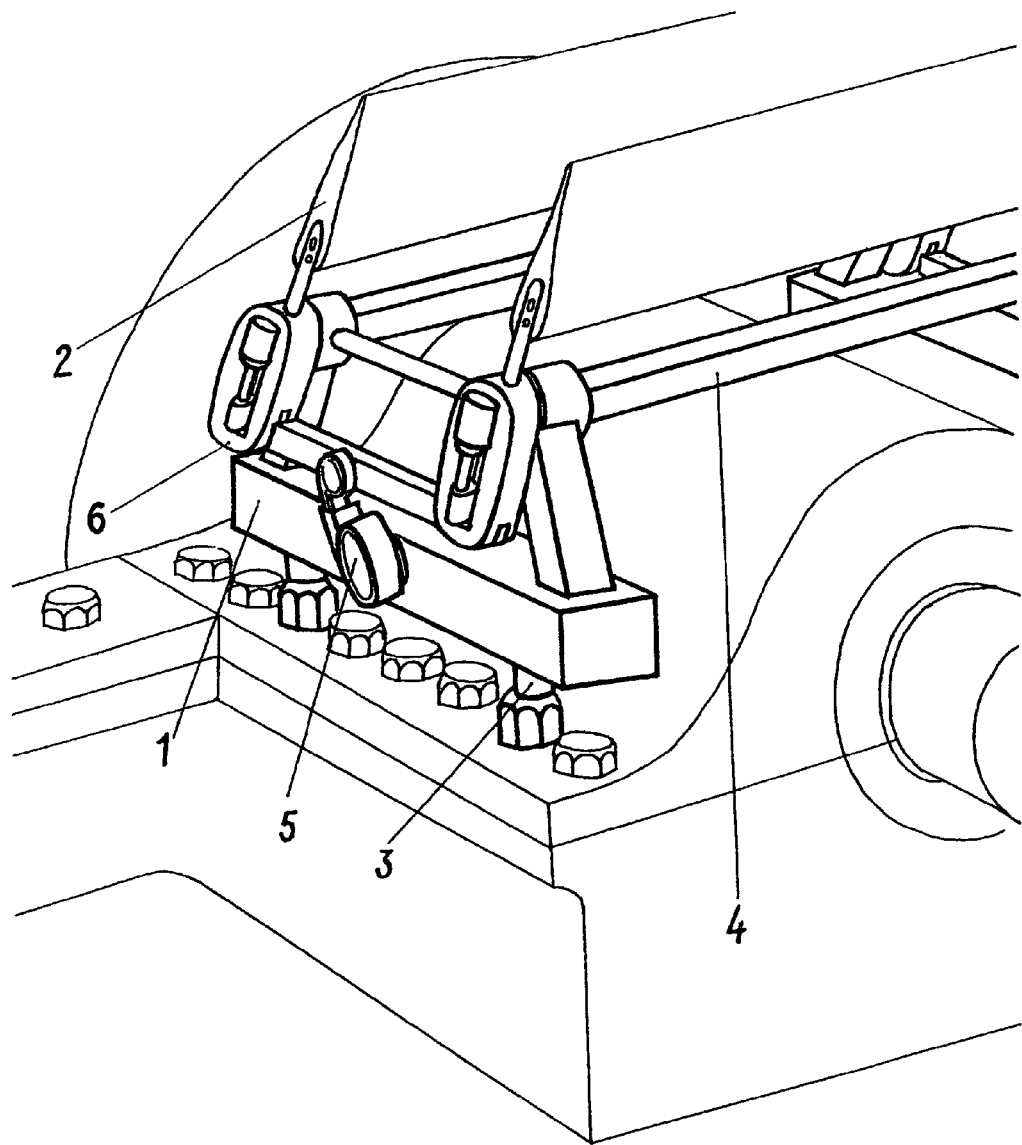
Fig. 8  The B-F-L-Ws for removal of beyond-normal vibrations in super-wide diapasons (variant).
Placement in direction perpendicularly to rotor axis of T-G-S.
See text in Specification.

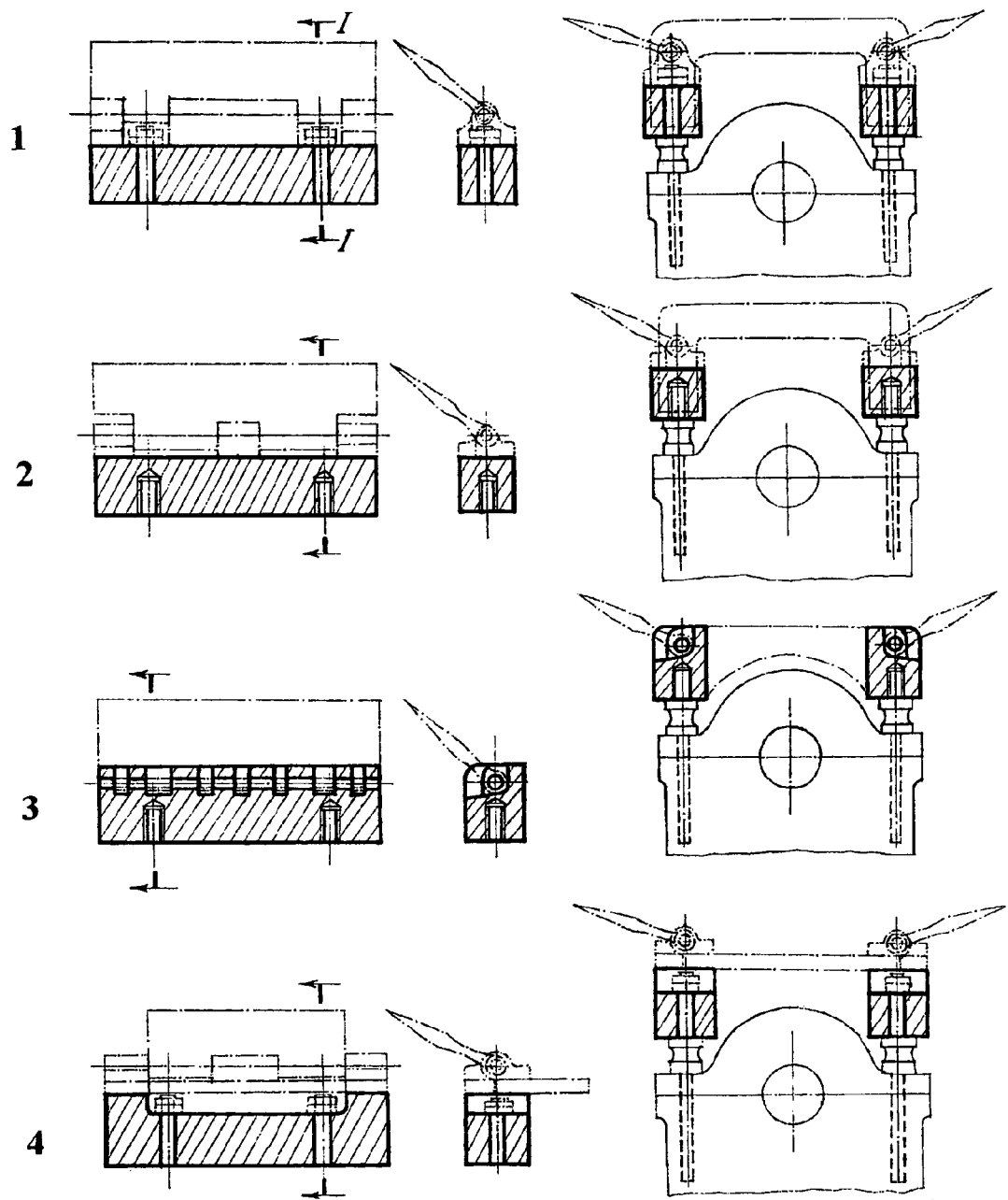
Fig. 9 Loads of the B-F-L-Ws (variants).
Various forms of the loads.

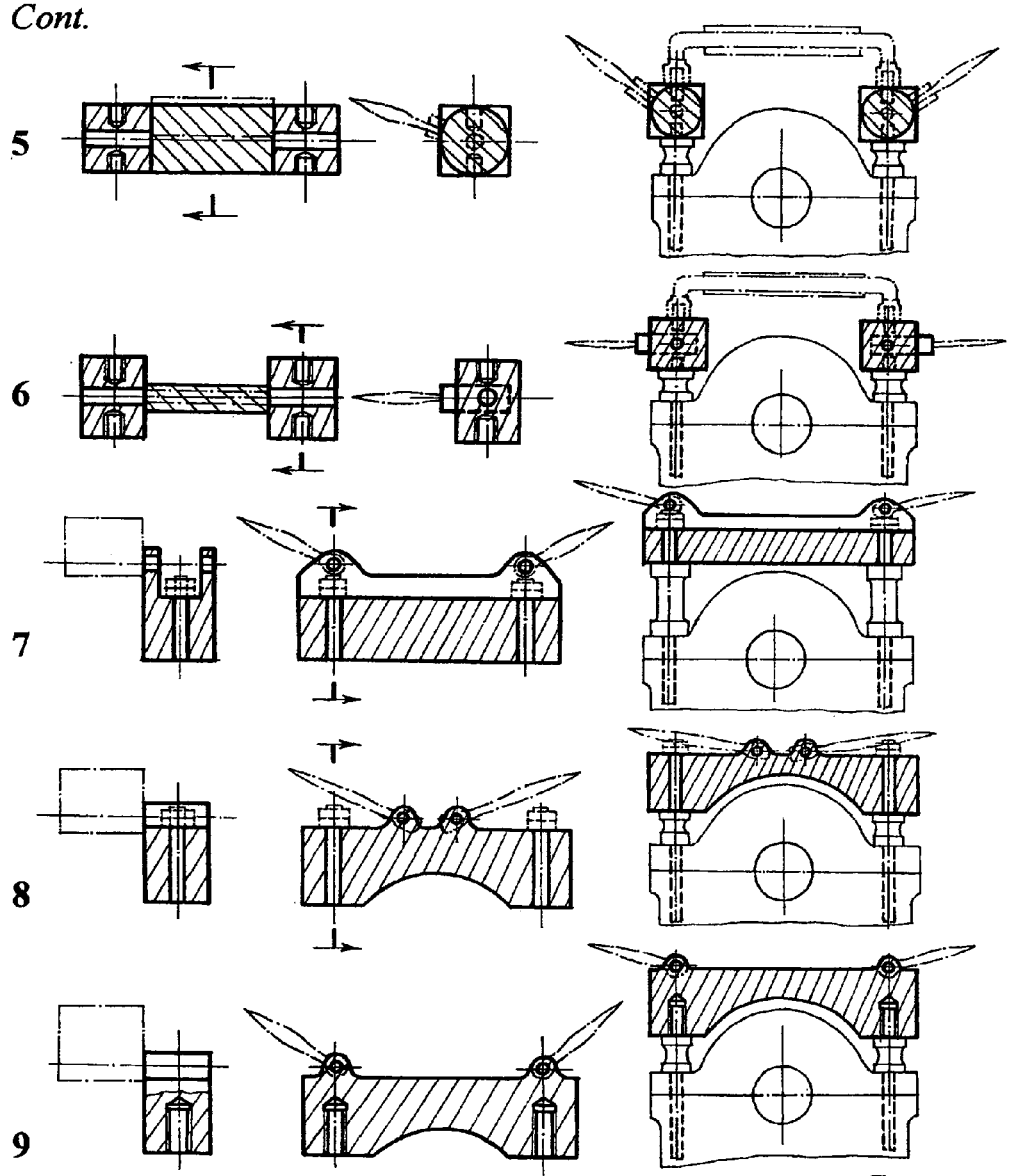
Fig. 9 *Continuation.* Loads of the B-F-L-Ws (variants).
Various forms of the loads.

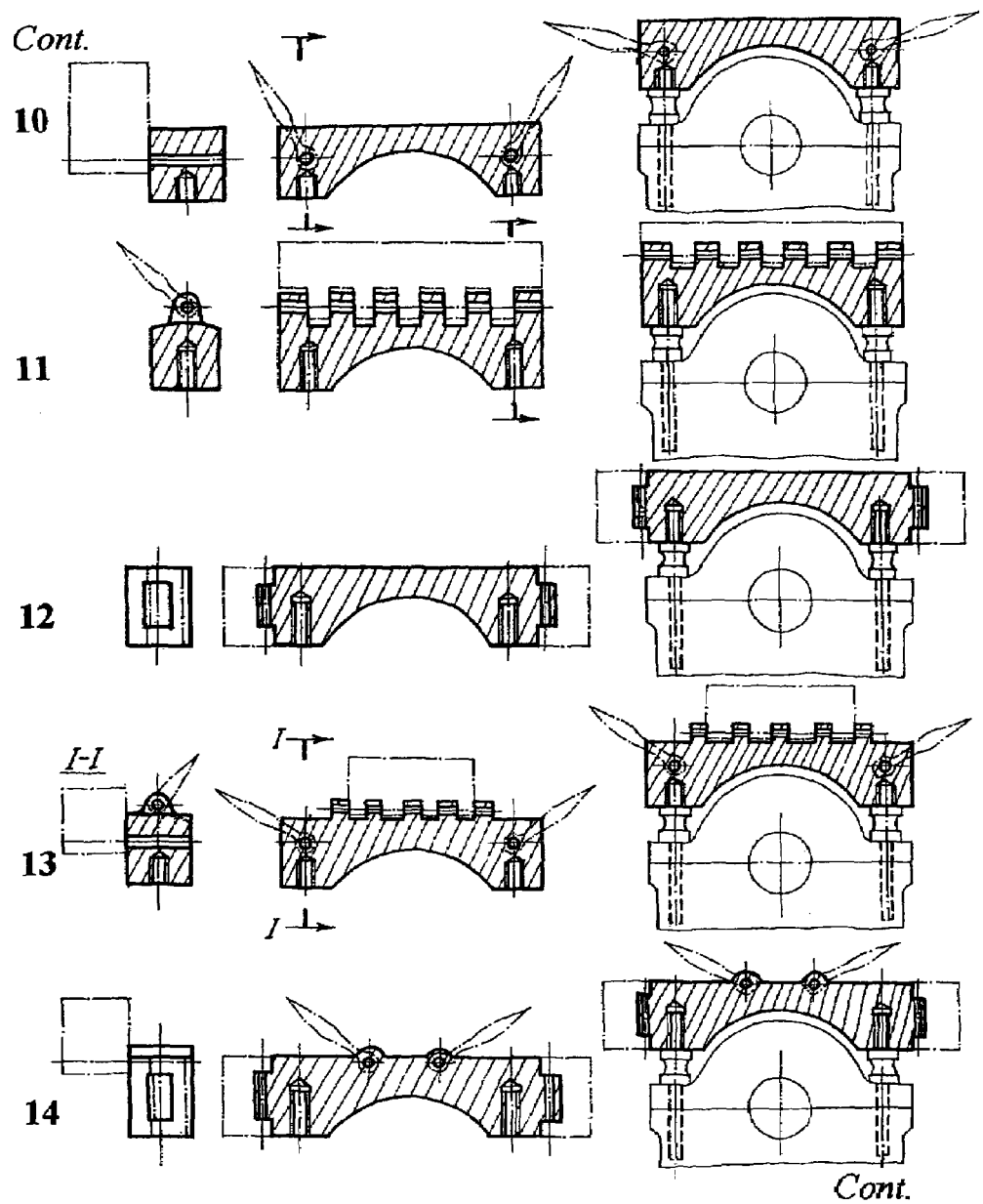
Fig. 9 *Continuation.* Loads of the B-F-L-Ws (variants).
Various forms of the loads.

*Cont.*
15. The ways of forming the loads ( variants ).
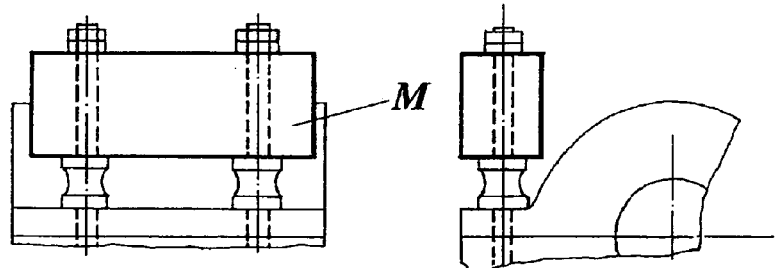
15a. The stated mass load manufactured by casting ( or pressing, shaping, etc. ).
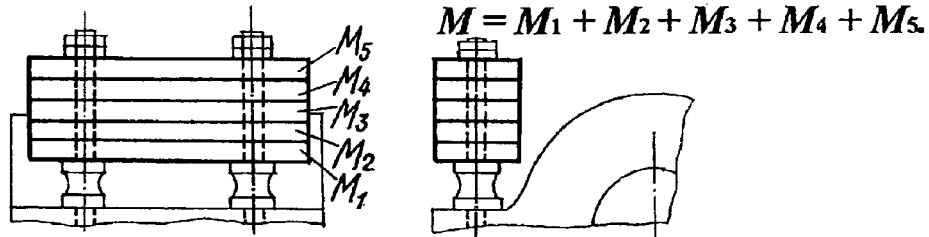
15b. The stated mass load collected from the weights.
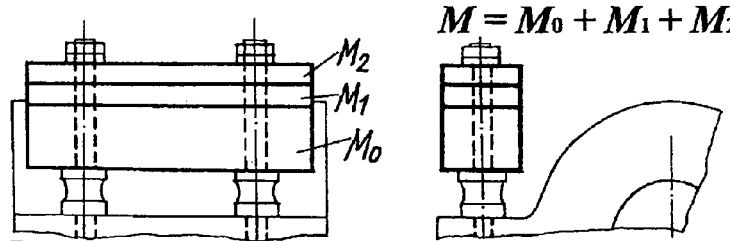
15c. The load collected from the basic load and the additional weights.
Fig. 9 *Continuation.* Loads of the B-F-L-Ws (variants).
The ways of forming the loads.

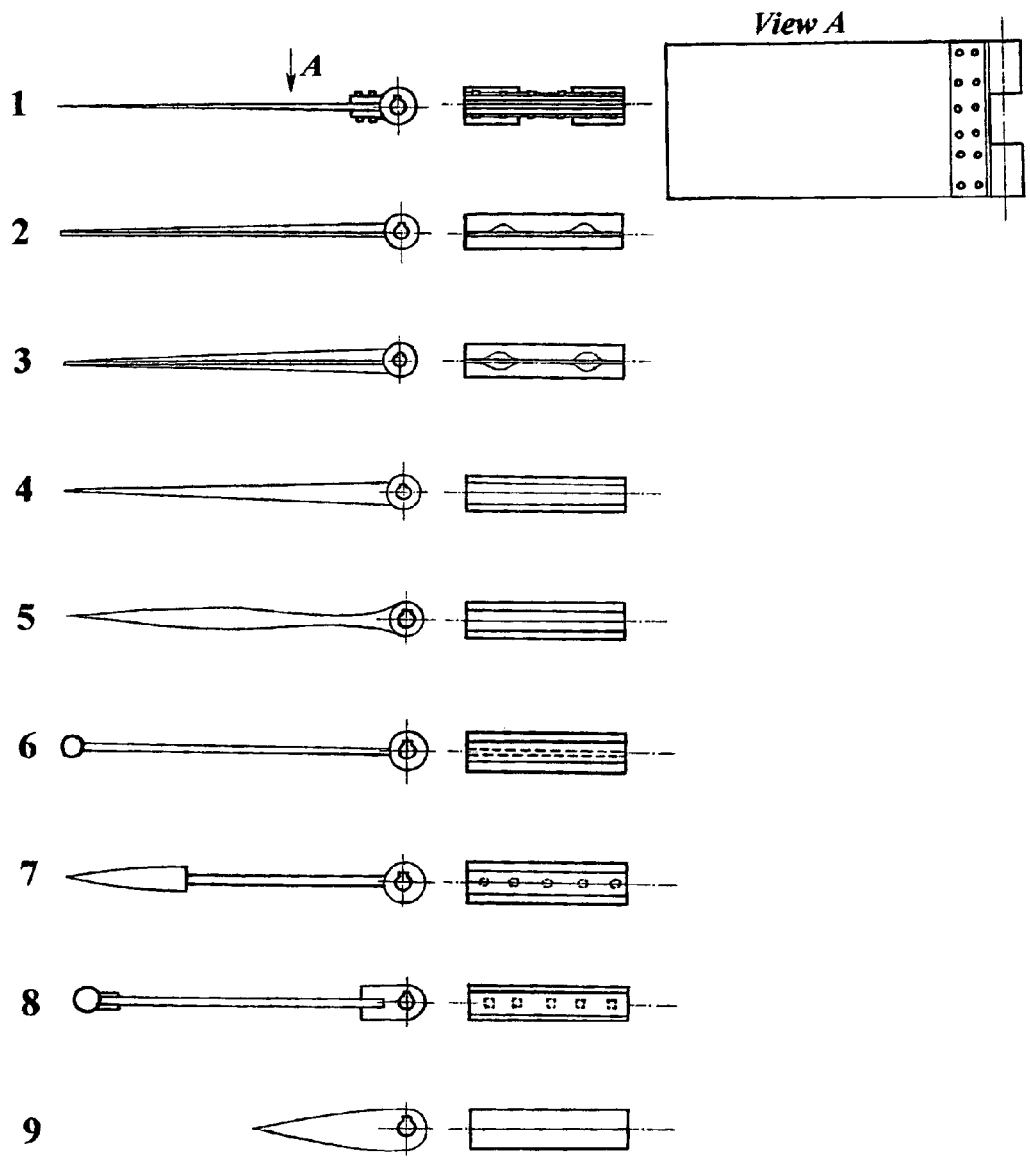
Fig. 10 Wings of the B-F-L-Ws (variants).
Various forms of the wings.
Cont.

*Cont.*
10 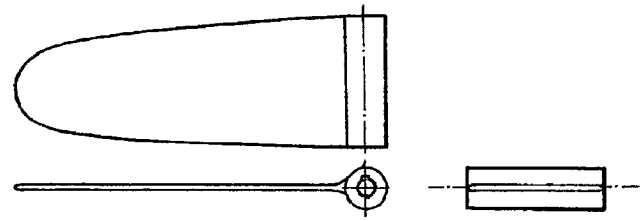
11 
12 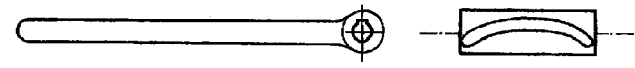
13 
14 
15
16 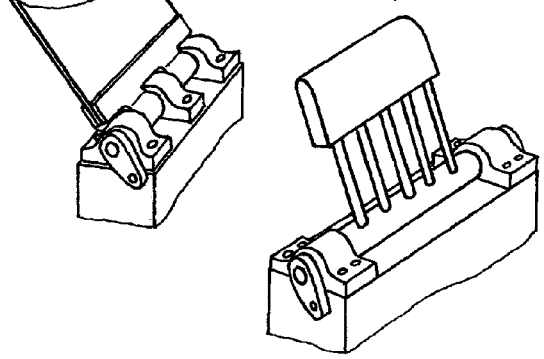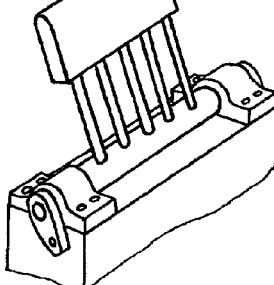
Fig. 10 *Continuation.* Wings of the B-F-L-Ws (variants).
Various forms of the wings.
See also: *Preferable fixations of wings fulcra (on)to the loads and the joint–units* [Fig. 17 (par. 4)], *Folding wings of the B-F-L-Ws* (Fig. 35).

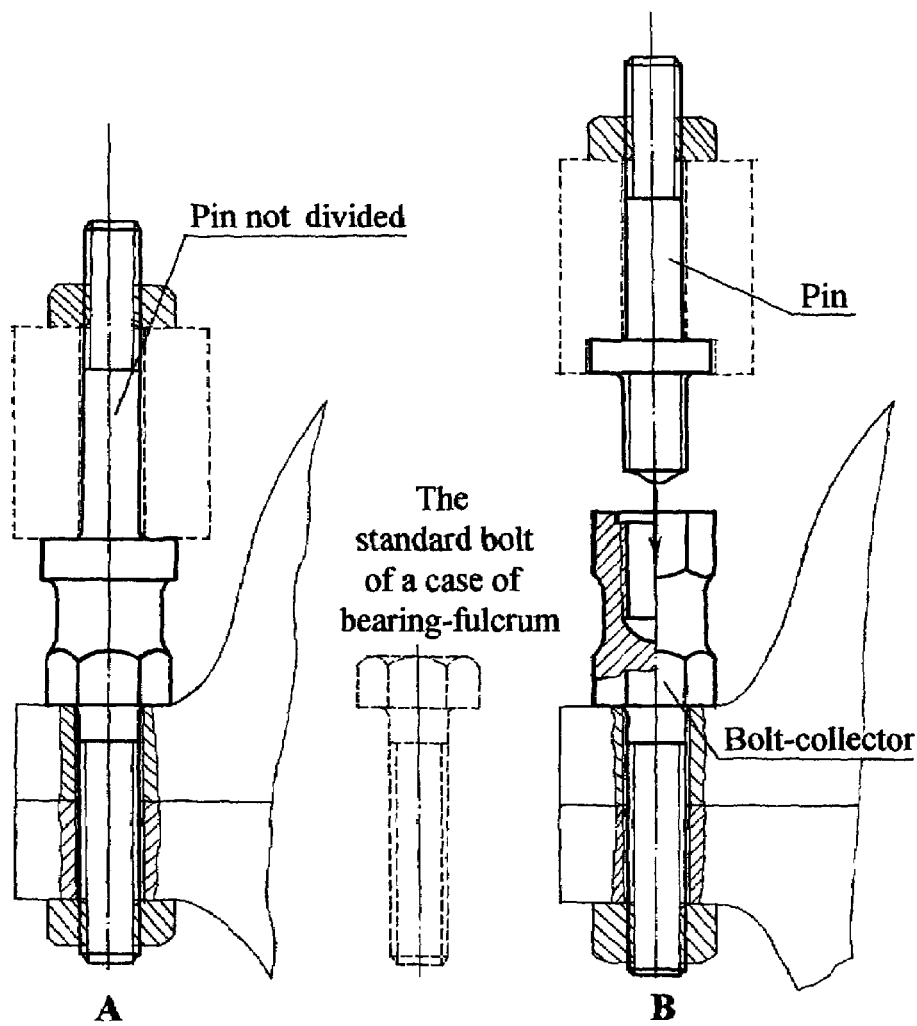
Fig. 11 Fixture units for fixing of loads of the B-F-L-Ws to a case of bearing-fulcrum (variants).

*Cont.*
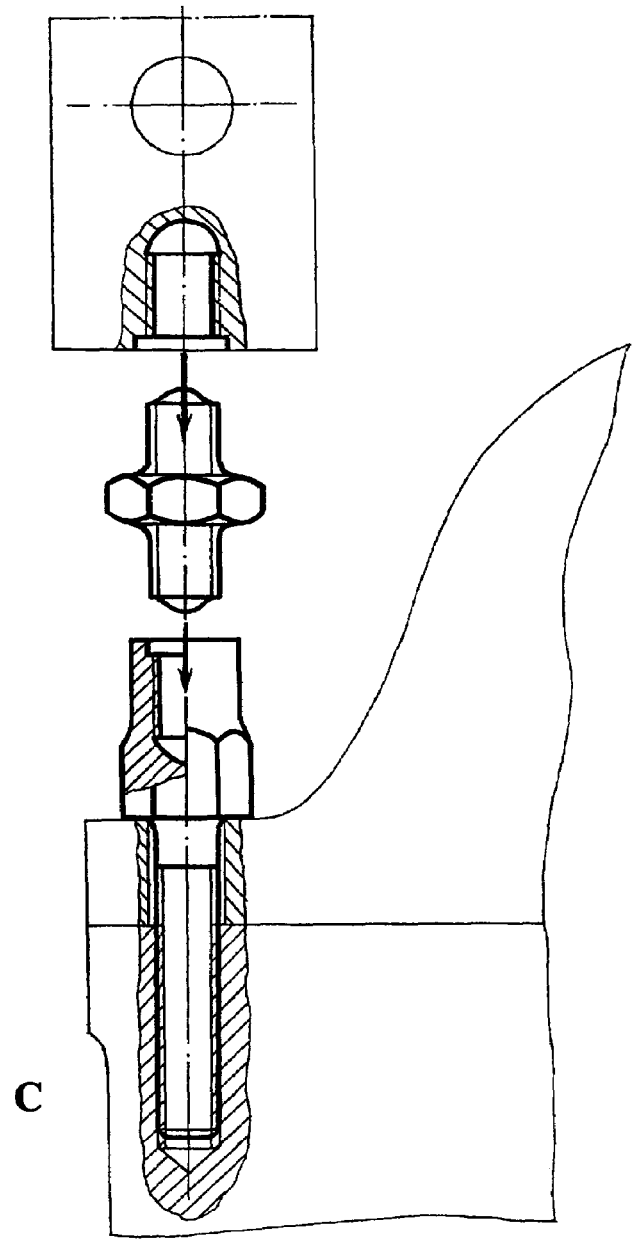
Fig. 11 *Continuation.* Fixture units for fixing loads of the B-F-L-Ws to a case of bearing-fulcrum (variant).

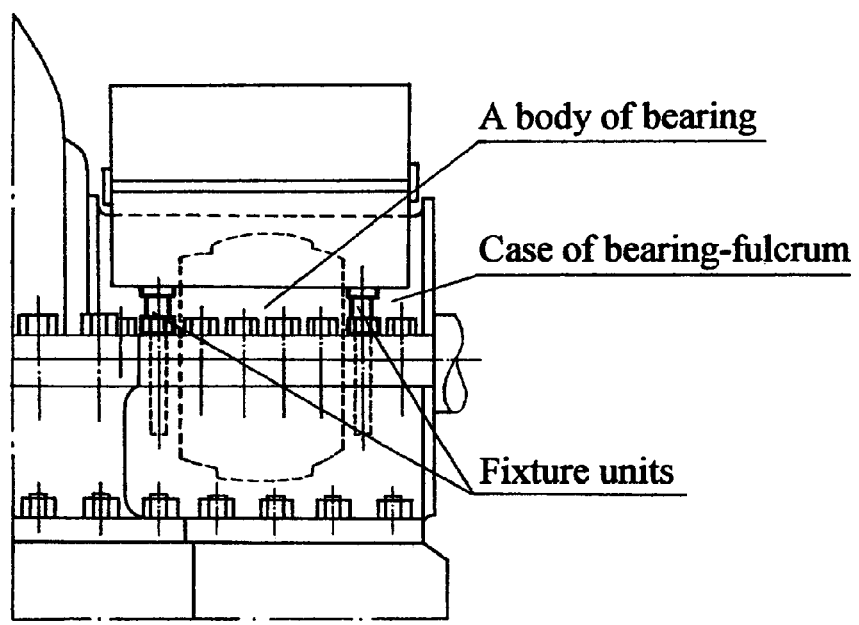
Fig. 12 Preferable setting of fixture units of the B-F-L-Ws.

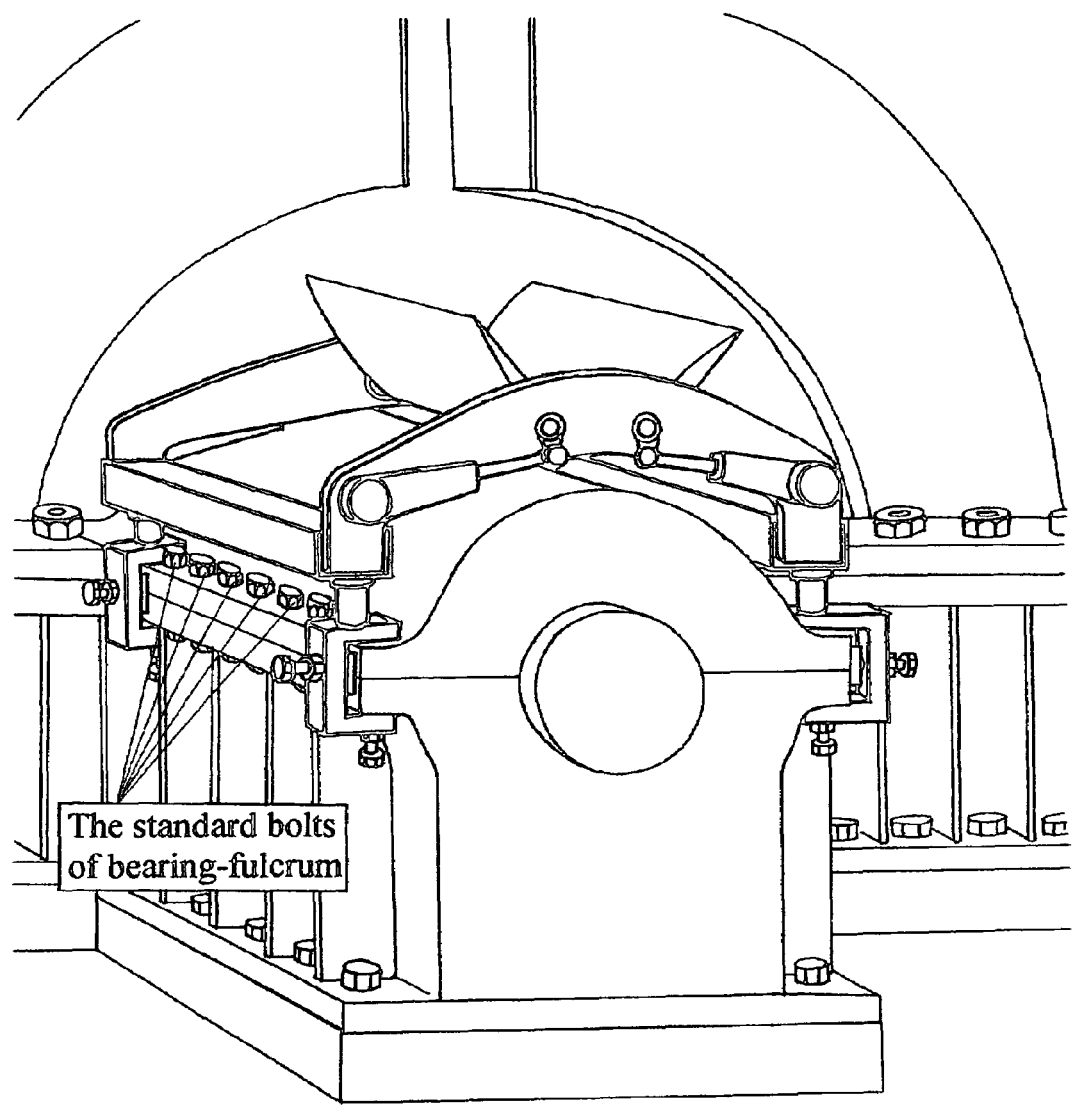
Fig. 13 Installation of the B-F-L-Ws with fixation which not requires replacement of the standard bolts of bearing-fulcrum (variant).

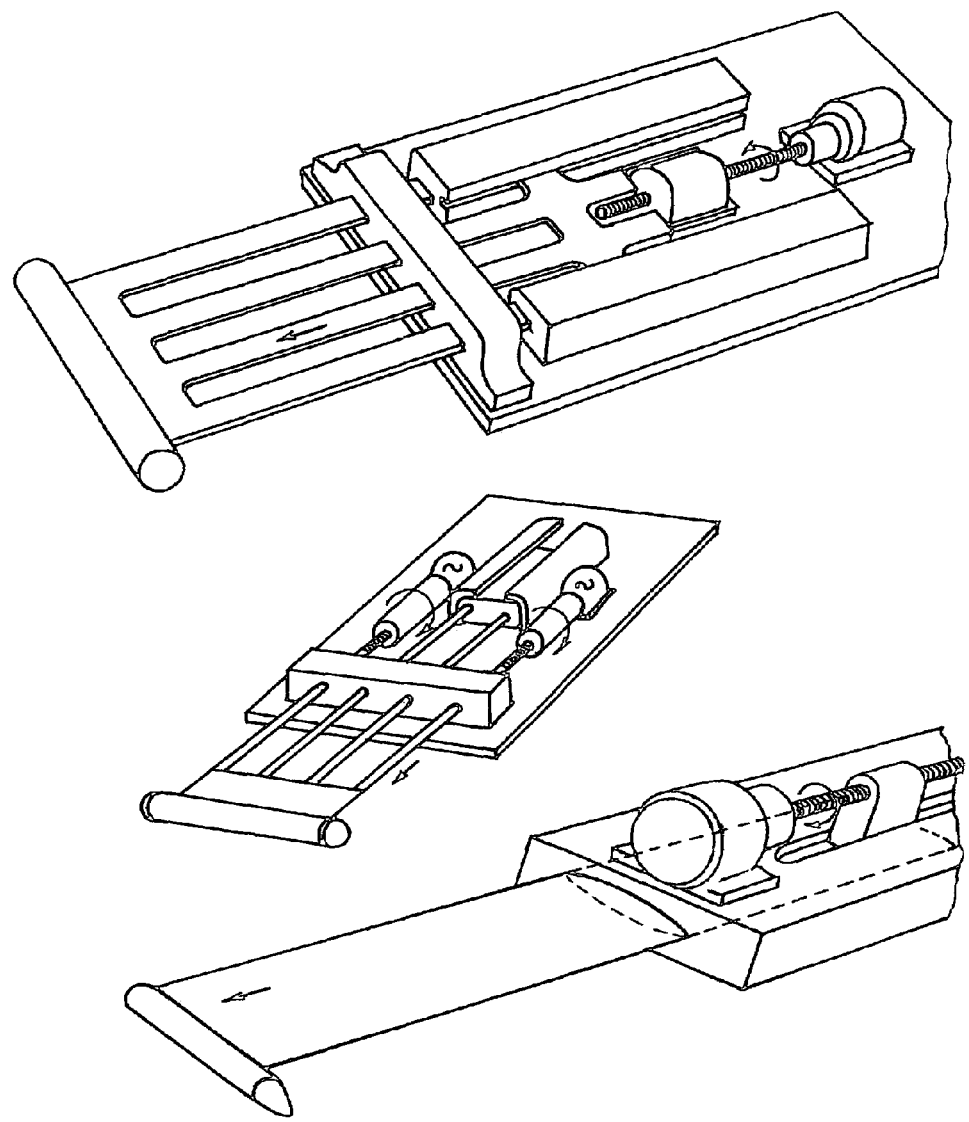
Fig. 14 Variants of units for changing the length of wings of the B-F-L-Ws.
See text in Specification.

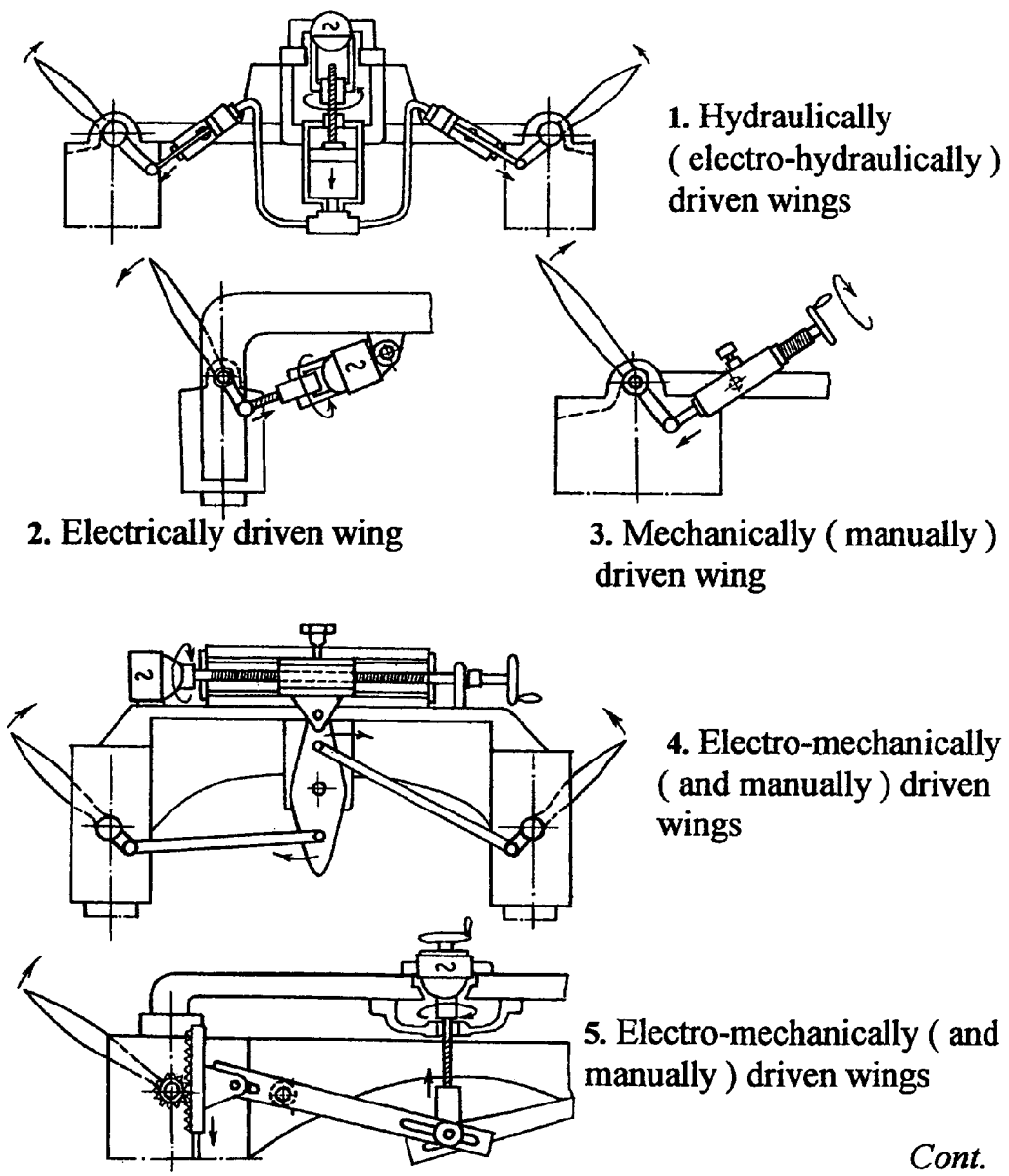
Fig. 15 Various types of drivers (shown schematically) of units for turning wings of the B-F-L-Ws.
See text in Specification.

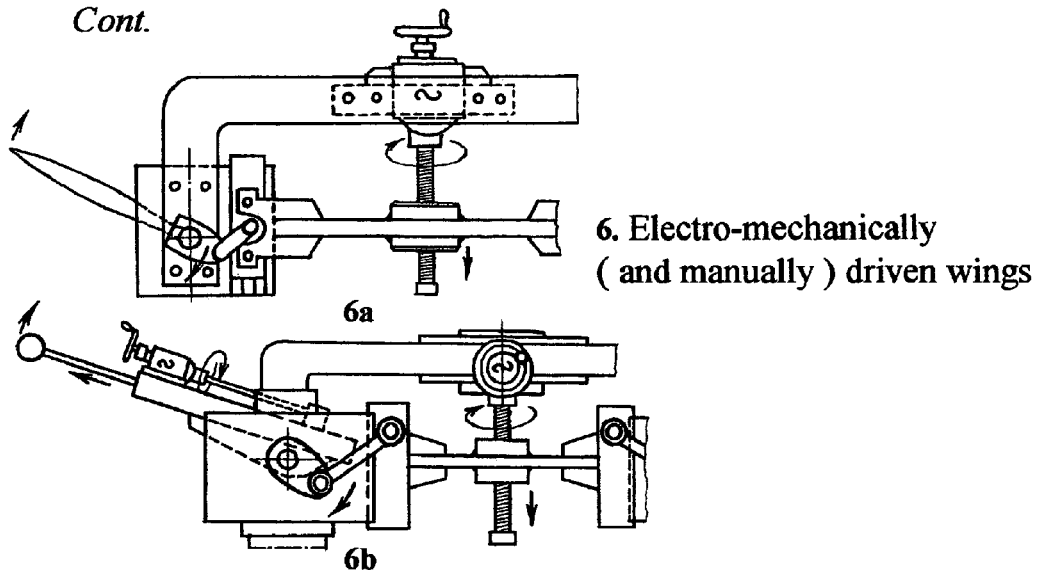
Fig. 15 *Continuation.* Various types of drivers (shown schematically) of units for turning wings of the B-F-L-Ws.
See text in Specification.

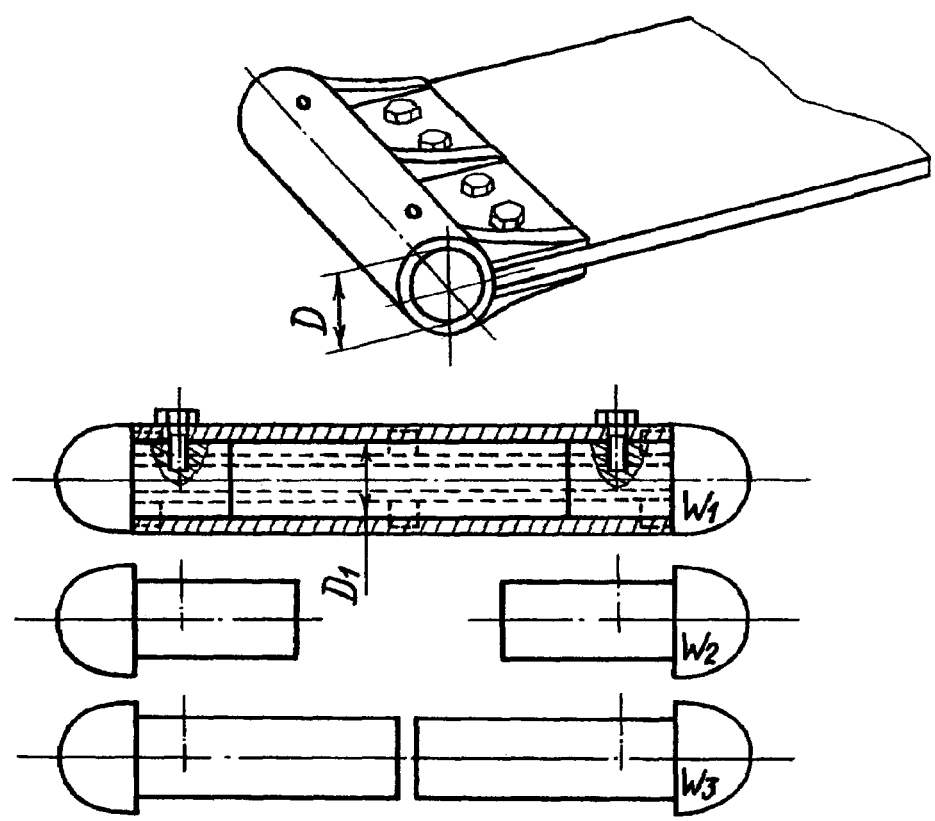
Fig. 16  A change of mass of wing of the B-F-L-Ws by attached weights (variant).
A change may be done by attached pairs of weights of various length and diameter $D_1$, $D_2$, ..., etc.

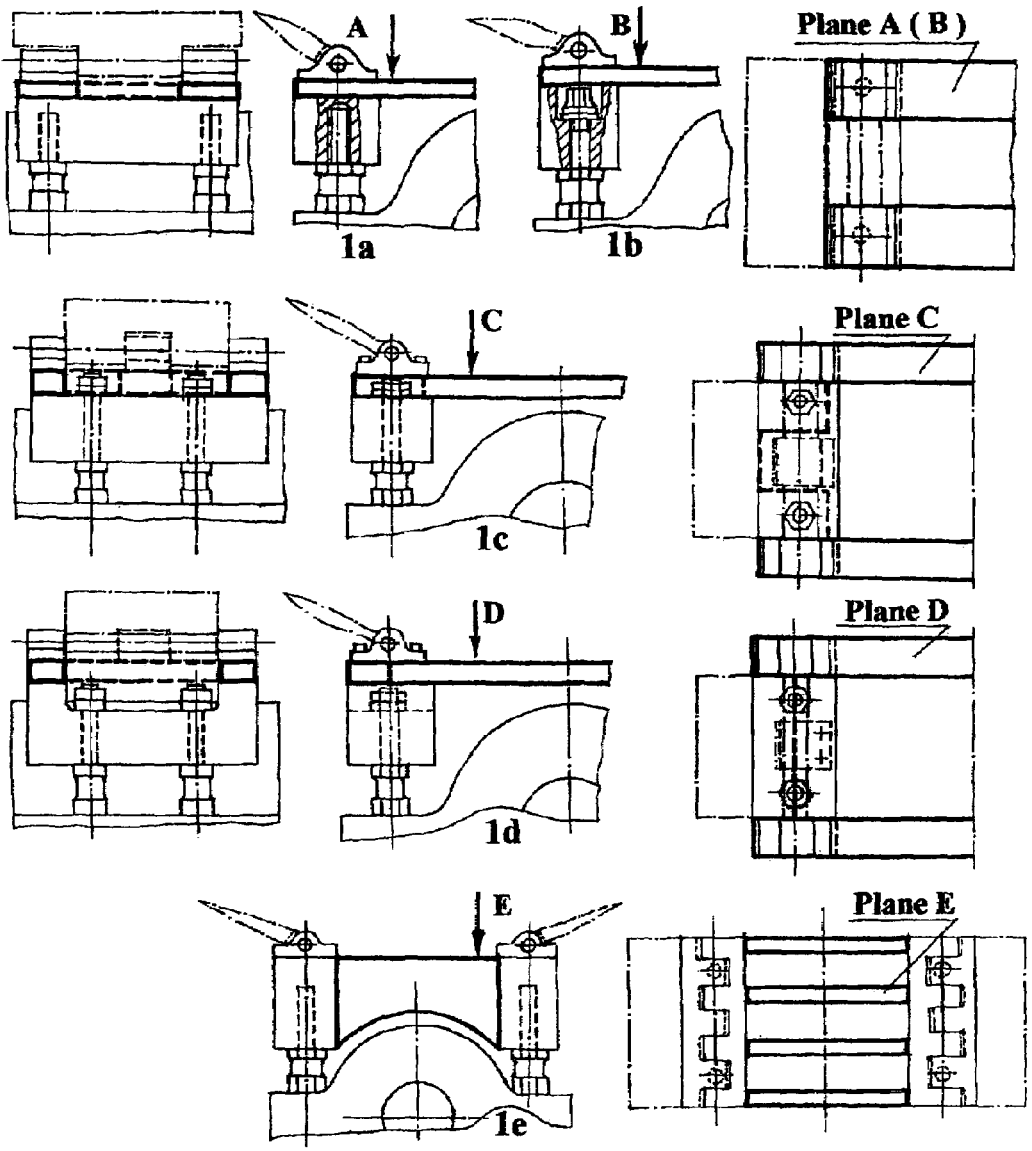
1. The two loads are firmly joined together by the connecting plate(s) [ or bars, ribs, etc. ].
*Cont.*
Fig. 17 Joint-units of the B-F-L-Ws (variants).

*Cont.*
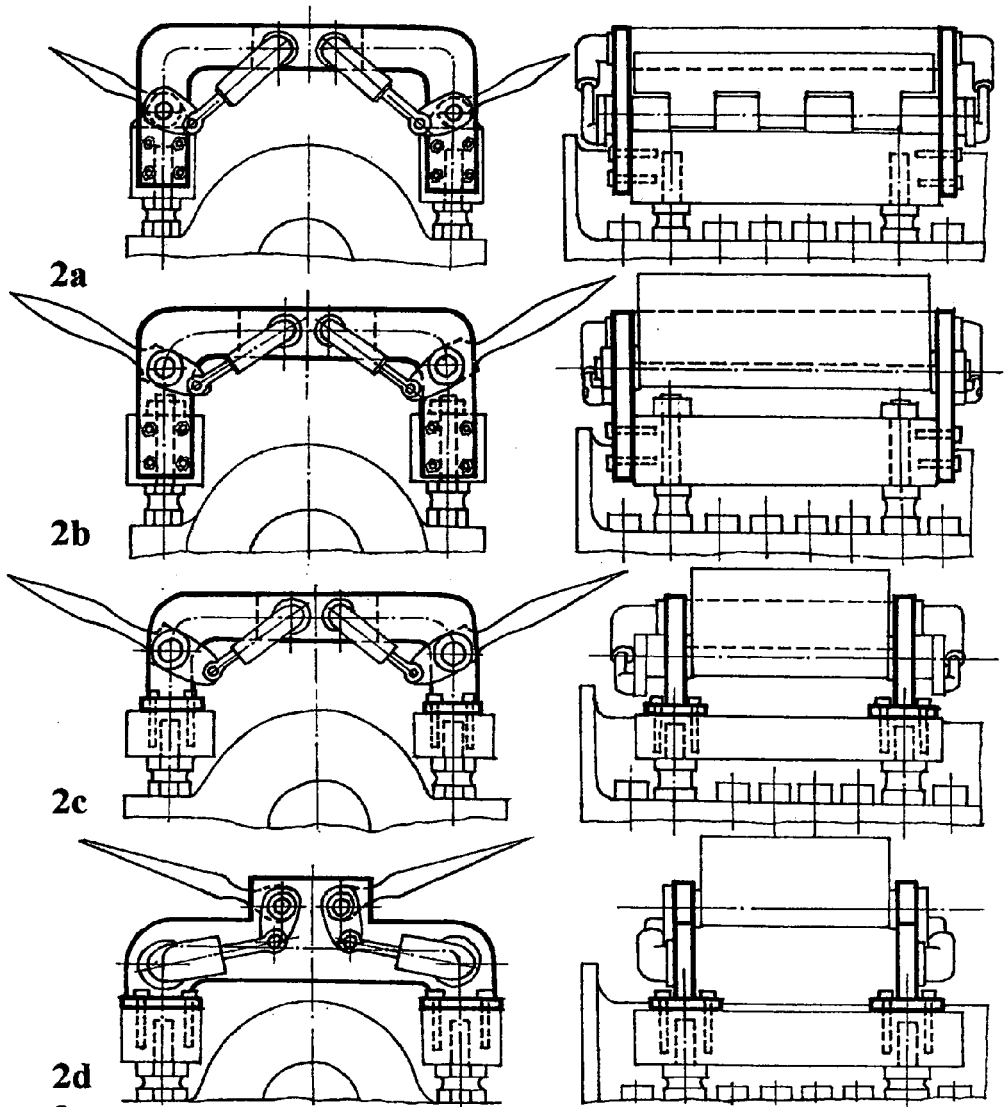
2a
2b
2c
2d
2. The two loads are firmly joined together by the connecting arch-
-shaped units. ( For variants 2b, 2c, 2d wings fulcra are fixed onto
the joint-unit ).
*Cont.*
Fig. 17 *Continuation.* Joint-units of the B-F-L-Ws (variants).

*Cont.*
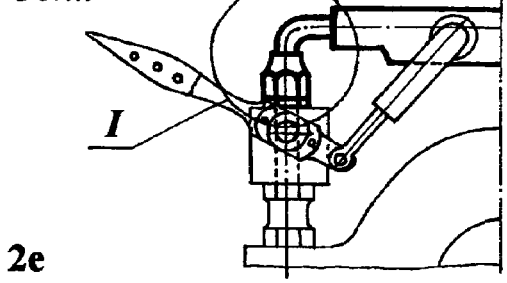
2e
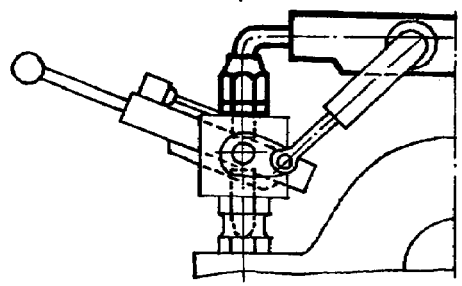
2f
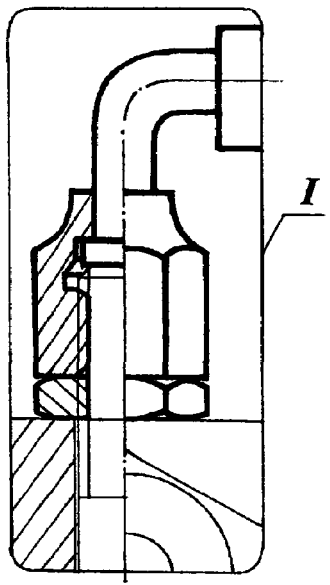
2. The two loads are firmly joined together by the connecting arch-
-shaped ( pipe ) units.
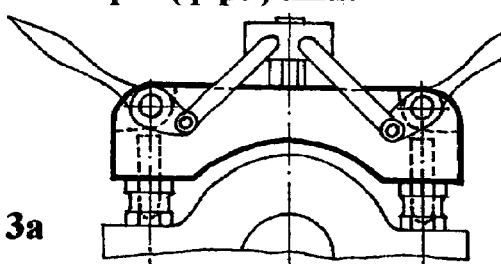
3a
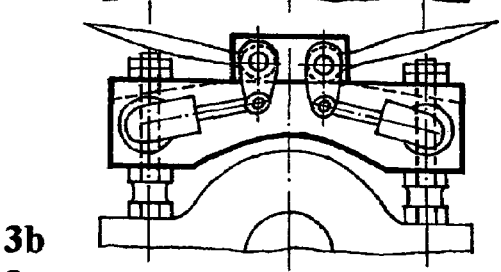
3b
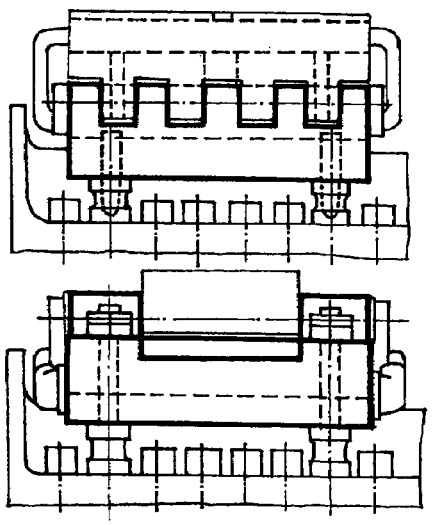
3. The two loads are manufactured as the whole one ( e.g. by casting,
pressing, shaping, etc. ) with the arch jointing. [ For variant 3b
wings fulcra are fixed onto the joint-unit ].
*Cont.*
Fig. 17 *Continuation.* Joint-units of the B-F-L-Ws (variants).

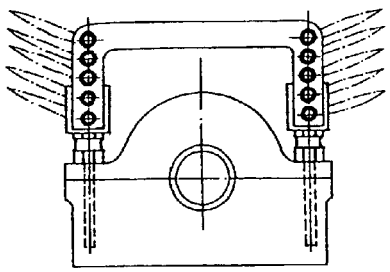

4a. The most preferable variants of fixation of wings fulcra (on)to the loads and the joint-units.

4b. Fixation with the eccentricity $a$ ( external ).

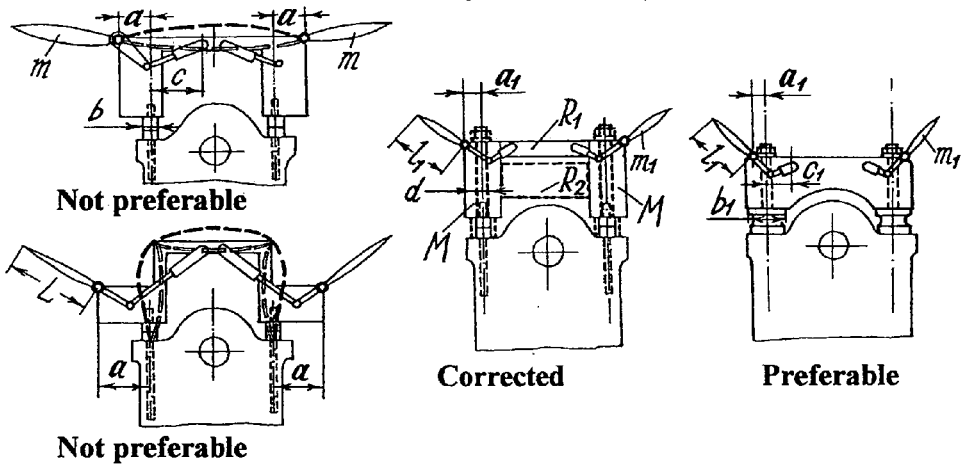

Not preferable

Not preferable

Corrected

Preferable

The recommendations to prefer the fixing of the wings fulcra:

1) $a \rightarrow a_1 = a_{min}$.
2) $b_1 > b$.
3) $a_1 < 1/2\, b_1$.
4) $l_1 < L$, ( $m_1 < m$ ); $c_1 < c$.
5) The system [ formed out of the loads $M$, the fixture units $d$, the joint-units $R_1$, $R_2$ ] is so rigid that it may also successfully resist the additional momentum originated from the eccentricity $a_1$.

4. Some recommendations for preferable fixing of wings fulcra (on)to the loads and the joint-units.

Cont.

Fig. 17 *Continuation.* Joint-units of the B-F-L-Ws (variants).

*Cont.*
**4c. Fixation with the eccentricity *e* ( internal ).**

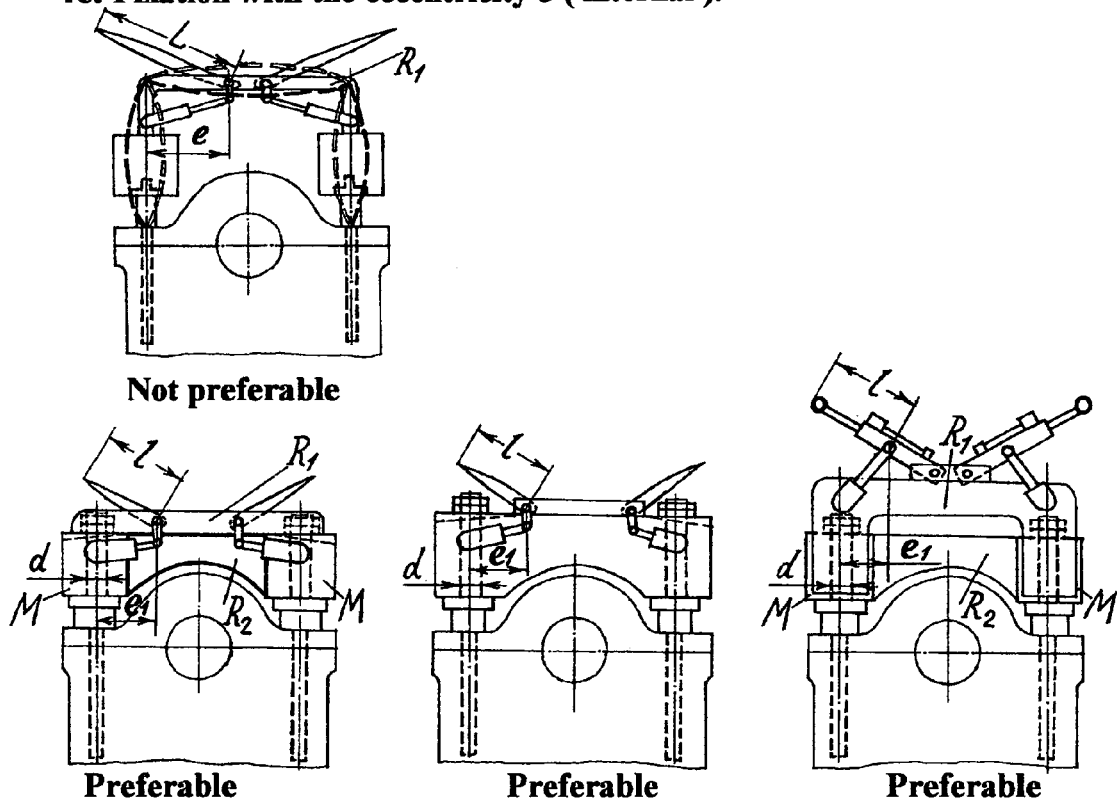

Not preferable

Preferable    Preferable    Preferable

The recommendations to prefer the fixing of the wings fulcra:
1) $e, e_1 \rightarrow e_{min}$.
2) $l < L$ ( e.g. work within limited space for spreading the wings ).
3) The system [ formed out of the loads $M$, the fixture units $d$, the joint-units $R_1, R_2$ ] is so rigid that it may also successfully resist the additional momentum originated from eccentricity $e_1$.

4. Some recommendations for preferable fixing of wings fulcra (on)to the loads and the joint-units.

Fig. 17 *Continuation.* Joint-units of the B-F-L-Ws (variants).

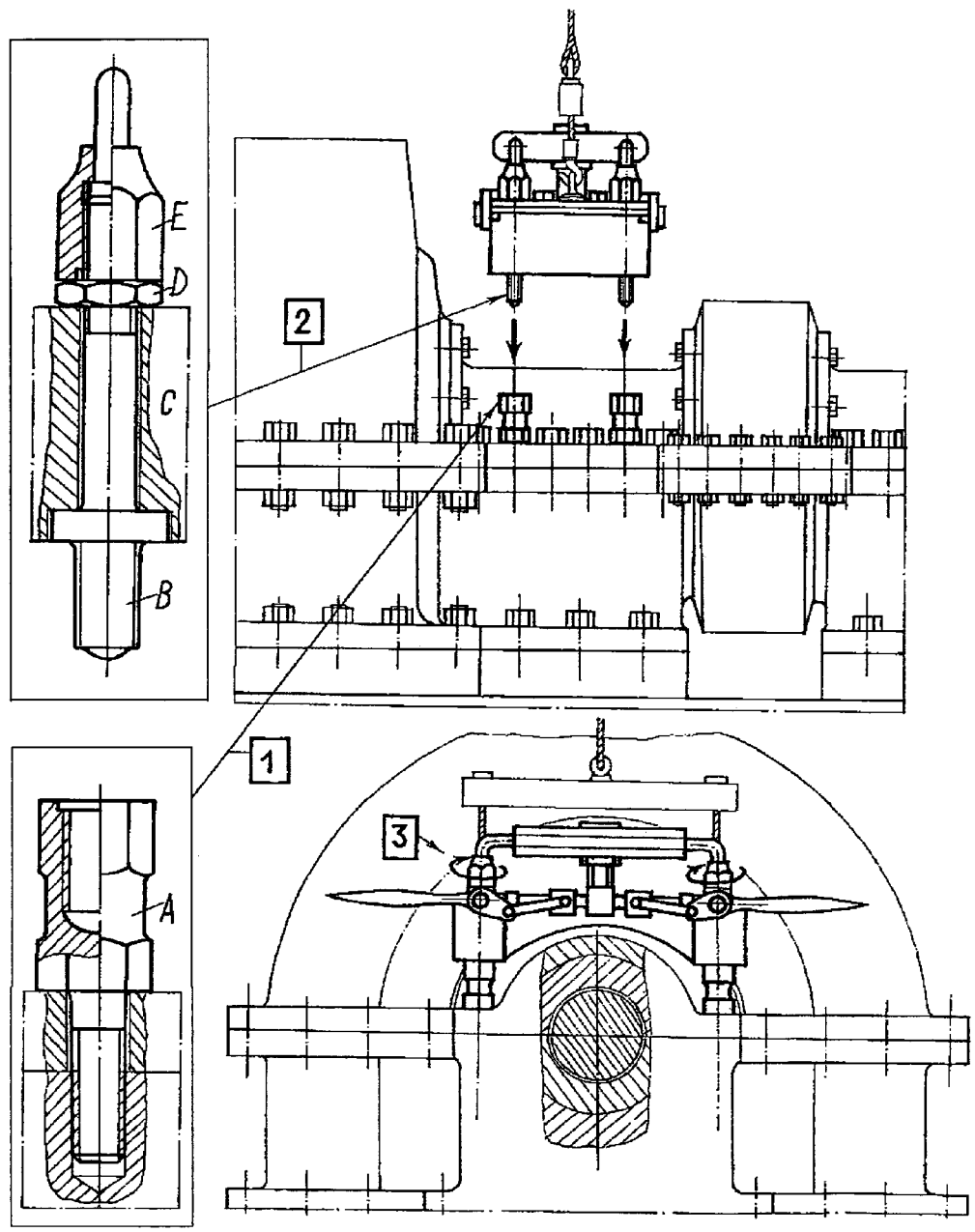
Fig.18 Operations (in number and sequence) to install the B-F-L-Ws [variant]. See text in Specification.

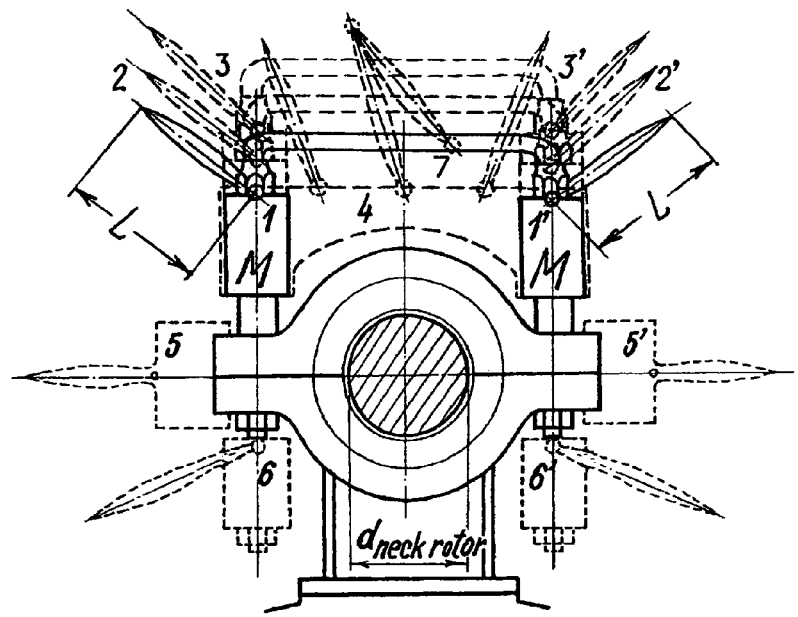

Fig.19 Placement of the B-F-L-Ws around bearing-fulcrum at T-G-S in direction parallelly to rotor axis.

Placement:

(1 & 1') - the most adequate and practically possible variant.

(2 & 2'), (3 & 3') - additional (and limited) variants.

(1 & 1') + (6 & 6') – adequate, but practically not always possible variant.

(4) – most adequate variant.

(5 & 5') - adequate, but practically not always possible variant.

(6 & 6') - adequate, but practically not always possible; not preferable variant as not increasing the weight of an upper cover of bearing-fulcrum. Loads may be used with wings, or without wings (as additional variant).

(7) - adequate, but practically not always possible variant.
Here the wing is shown folding (and changeable in length, width and weight).

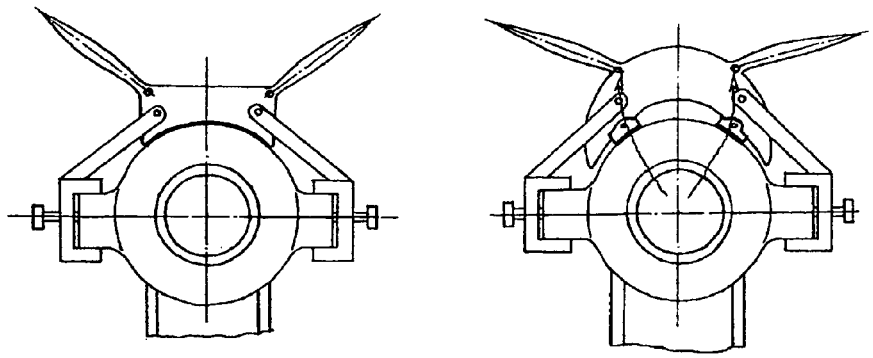
1) Incorrect placements.
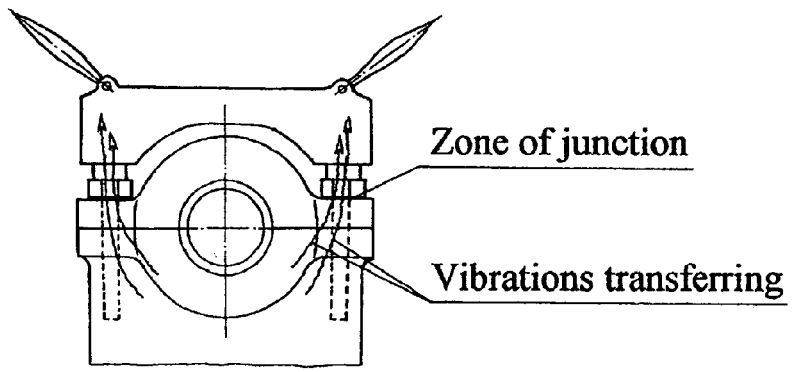
2) Correct placement.
Fig. 20 Correct and incorrect placements of the B-F-L-Ws at bearing-fulcrum /if to follow the instructions of the B-F-L-Ws method/.
See text in Specification.

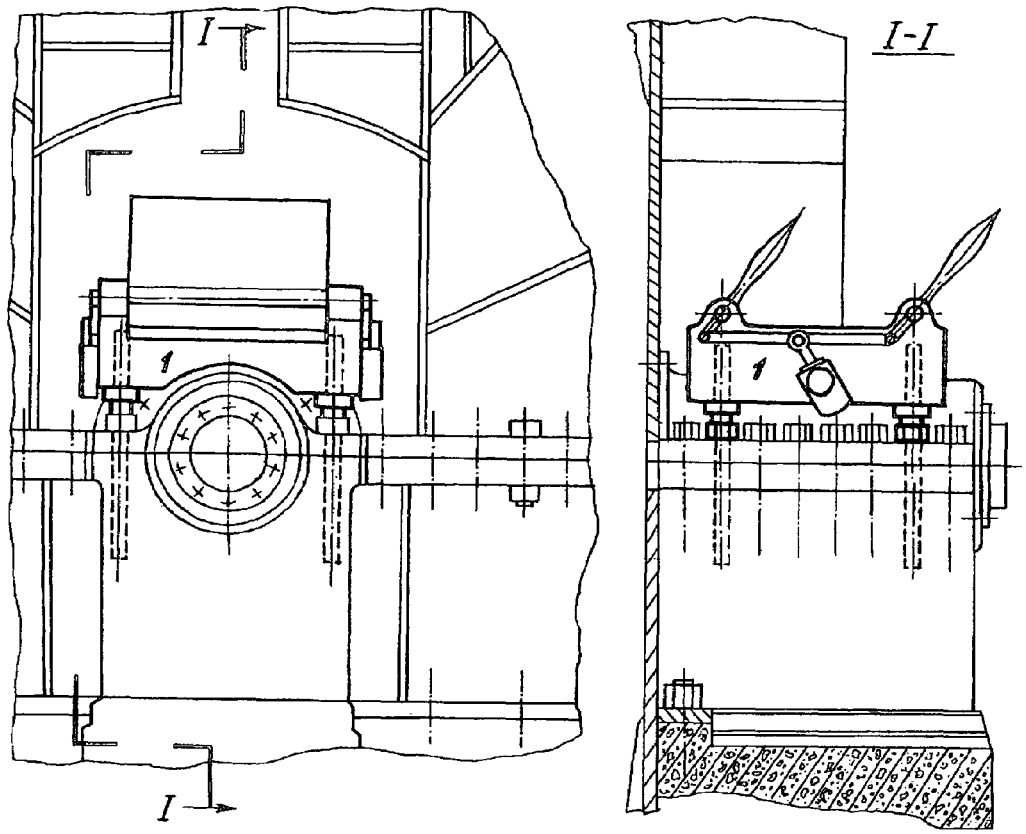
An axial stress bearing-fulcrum
Cont.
Fig. 21 Placement of the B-F-L-Ws upon bearing-
-fulcrum at T-G-S in direction perpendicularly to rotor
axis.
  Placement:
    1 - the most adequate and practically possible variant.

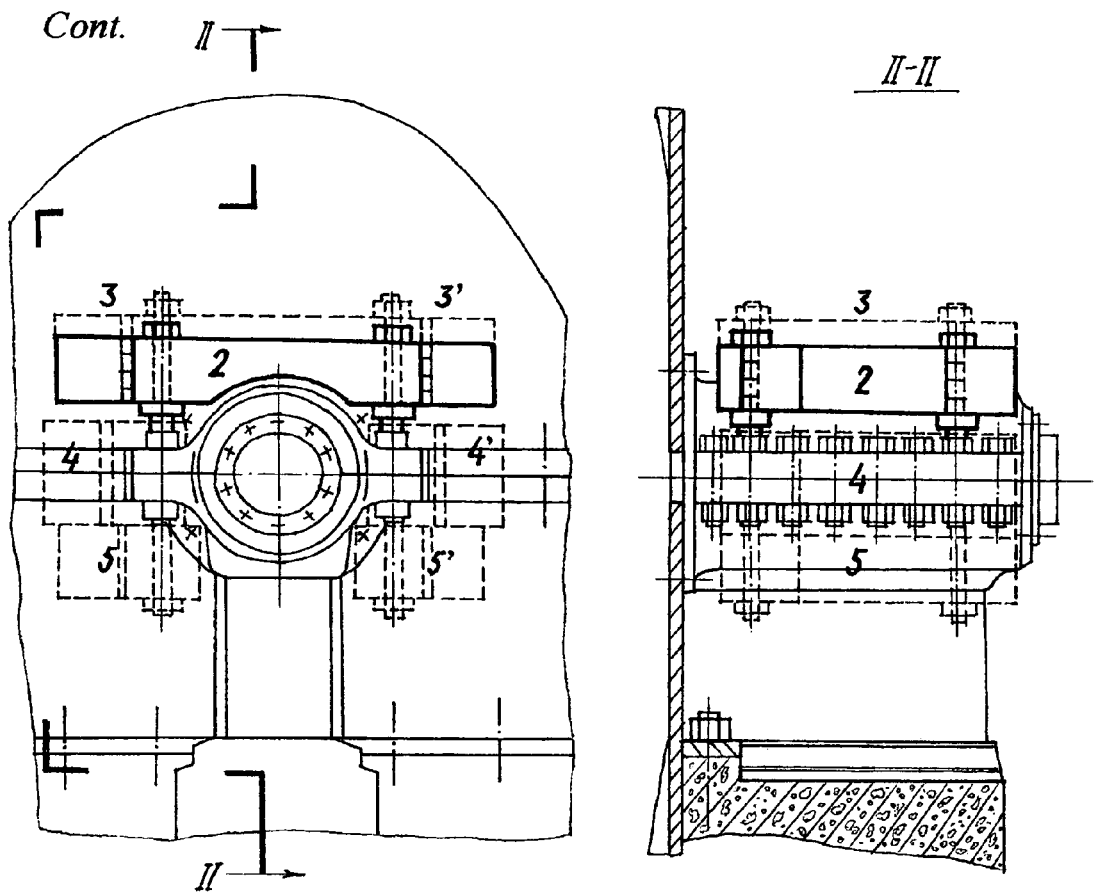
Fig. 21 *Continuation.* Placements of the B-F-L-Ws around bearing-fulcrum at T-G-S in direction perpendicularly to rotor axis.
Placements:
2 - most adequate variant.
(3 & 3') - additional variants [for loading].
(4 & 4') - adequate, but practically not always possible variant.
(5 & 5') - adequate, but practically not always possible variant.

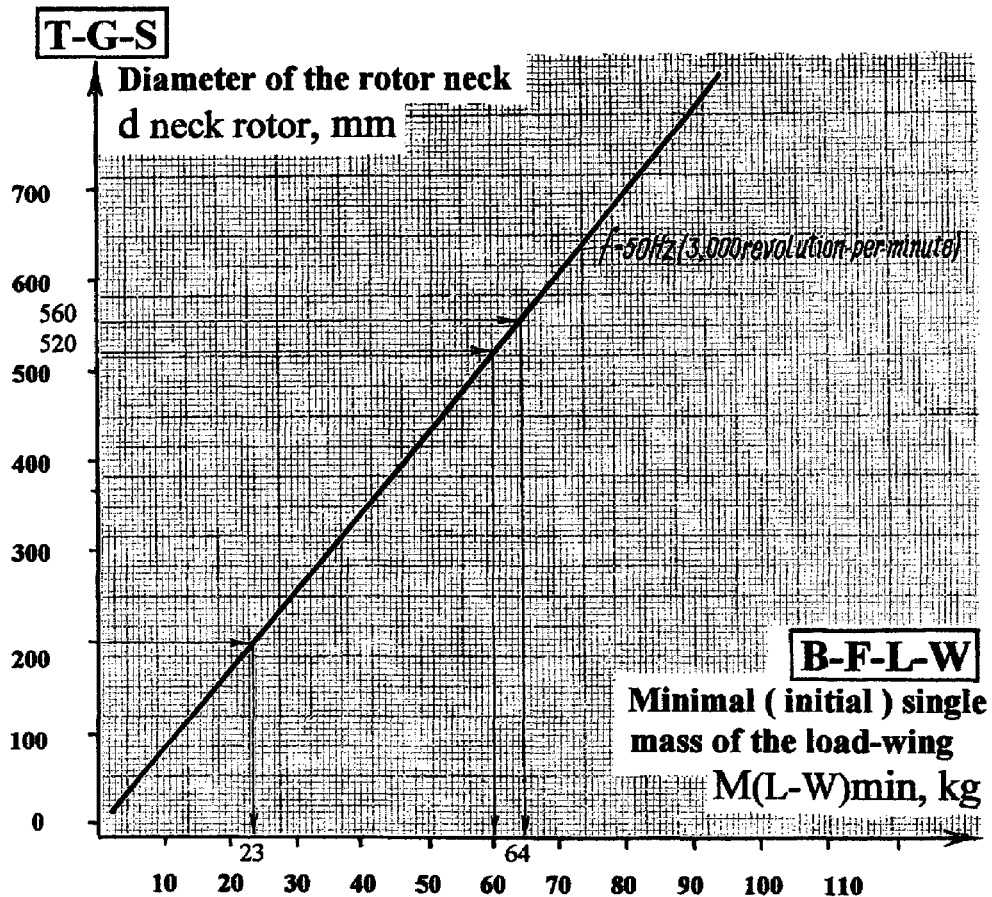

Fig. 22 The graph for determination of initial single mass of the load-wing $M_{(L-W)min}$ of B-F-L-W as function of diameter of the rotor neck $d_{neck\ rotor}$ of T-G-S [by Vladilen Safonov].
(See text in Specification).
The graph may be used for determination of minimal /initial/ single mass of the load-wing: for example, for T-G-S with designed operating frequency f = 50 Hz (3000 revolutions-per-minute), for $d_{neck\ rotor}$ = 560 mm - - $M_{(L-W)min}$ = 64 kg; for $d_{neck\ rotor}$ = 520 mm - - $M_{(L-W)min}$ = 60 kg; for $d_{neck\ rotor}$ = 200 mm - - $M_{(L-W)min}$ = 23 kg.

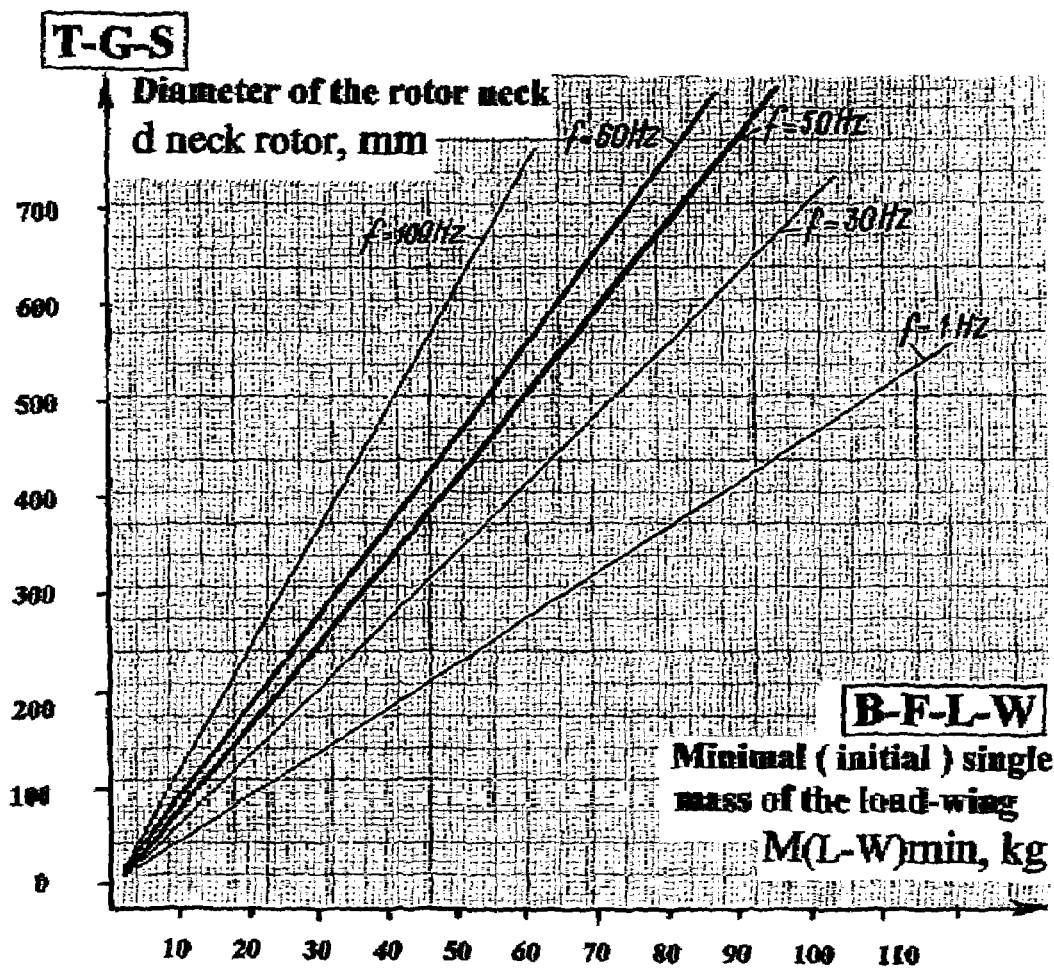
Fig. 23 The graphs for determination of initial single mass of the load-wing M(L-W)min as function of diameter of the rotor neck d neck rotor, for various values of designed operating frequency f of T-G-Ss [by Vladilen Safonov].
(See text in Specification).

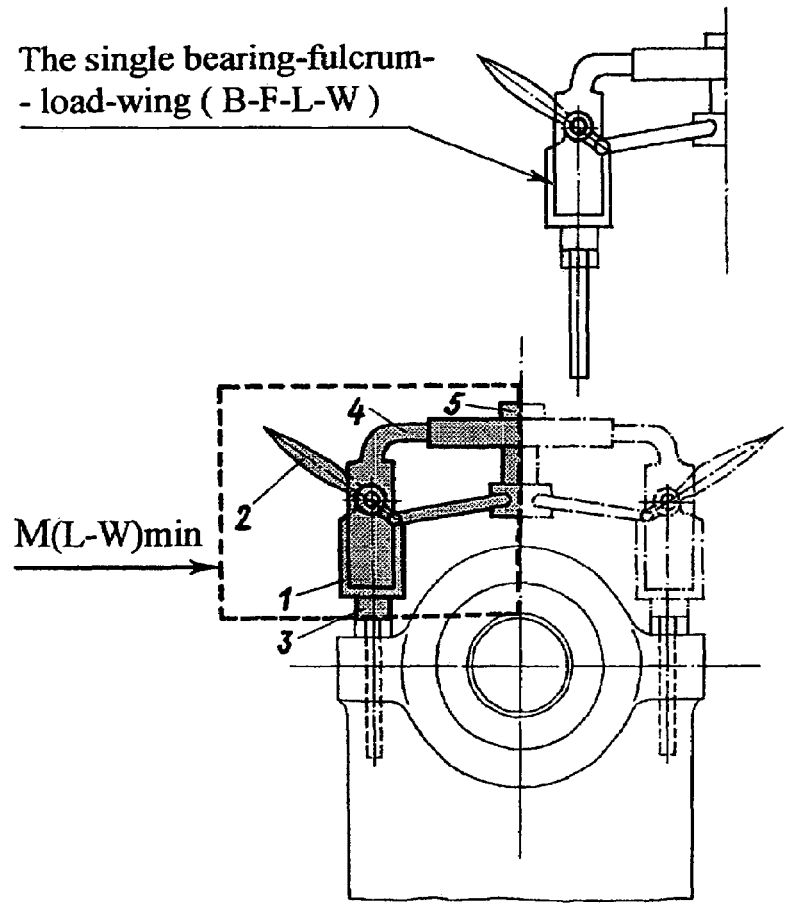

Fig. 24 Distribution of the minimal /initial/ single mass of the load-wing M(L-W)min among all elements and mechanisms, forming the single bearing-fulcrum-load-wing (B-F-L-W).
Removal of vibrations in wide diapasons.
Placement of the B-F-L-Ws in direction parallelly to rotor axis.
A total mass of the bearing-fulcrum-loads-wings (the B-F-L-Ws) is equal to a double mass of the single bearing-fulcrum-load-wing (B-F-L-W).
See text in Specification.

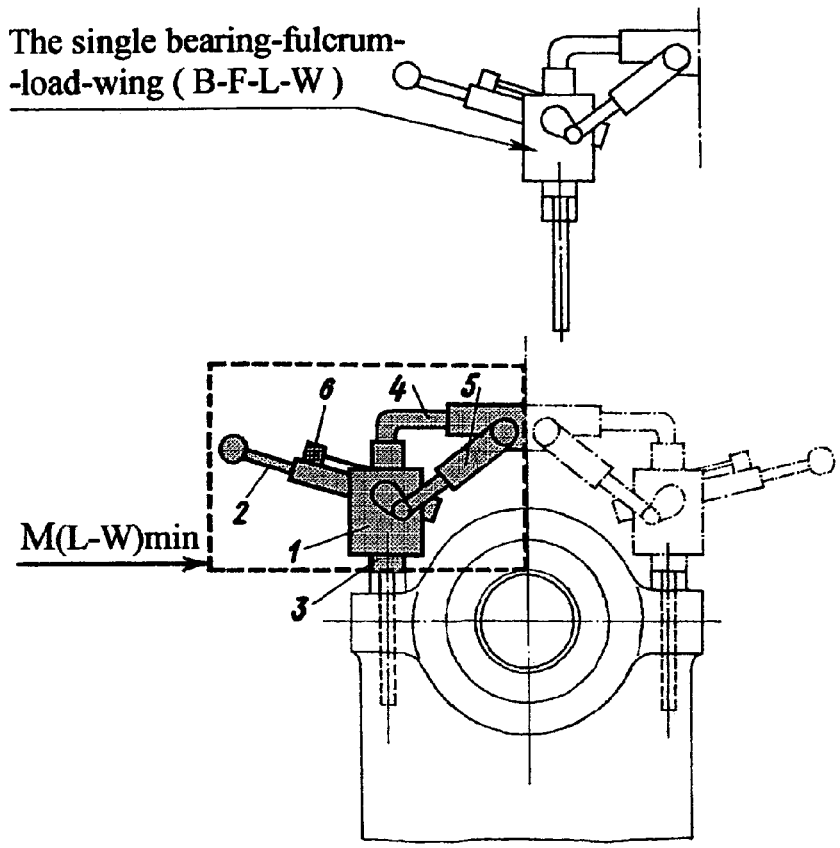

Fig. 25 Distribution of the minimal /initial/ single mass of the load-wing M(L-W)min among all elements and mechanisms, forming the single bearing-fulcrum-load-wing (B-F-L-W).
Removal of vibrations in super-wide diapasons.
Placement of the B-F-L-Ws in direction parallelly to rotor axis.
A total mass of the bearing-fulcrum-loads-wings (the B-F-L-Ws) is equal to a double mass of the single bearing-fulcrum-load-wing (B-F-L-W).
See text in Specification.

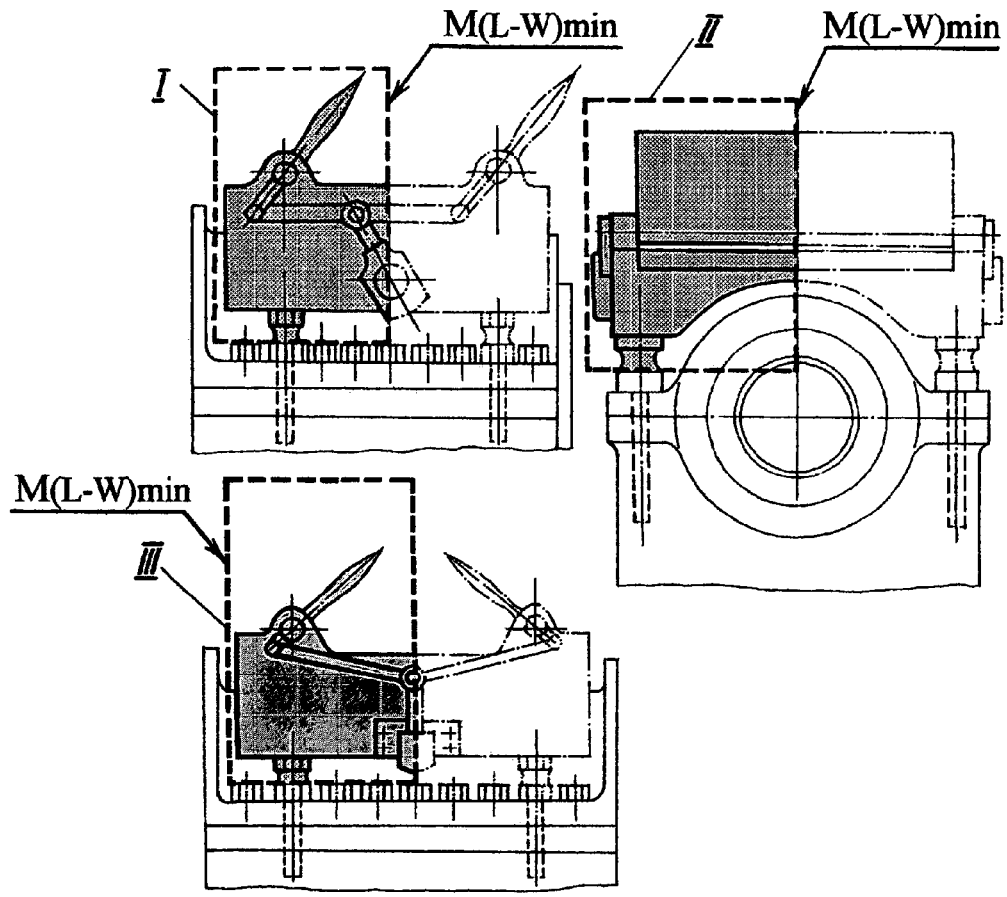
Fig. 26 Distribution of the minimal /initial/ single mass of the load-wing M(L-W)min among all elements and mechanisms, forming the single bearing-fulcrum-load-wing (B-F-L-W).
Placement of the B-F-L-Ws in direction perpendicularly to rotor axis.
See text in Specification.

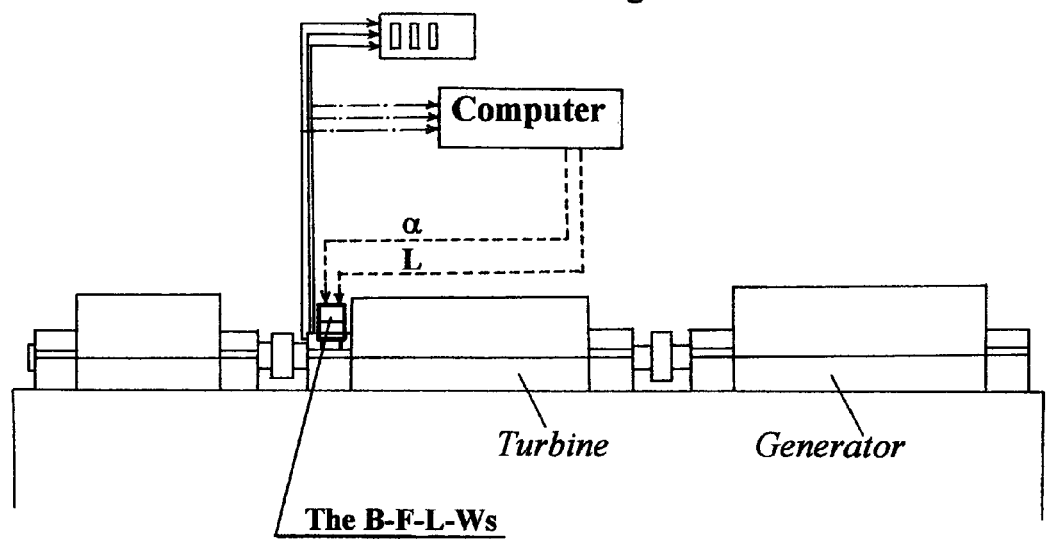
Fig. 27 Connecting of computer with the database to the bearing vibrations indicatory system to conduct removal of beyond-normal vibrations at the bearing-fulcrum automatically.

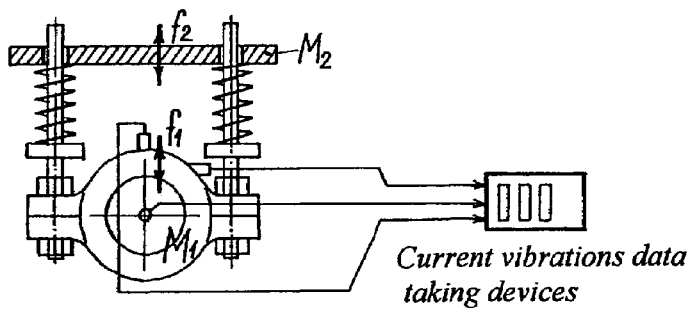
a)
The 'mass and spring' vibrating system method.
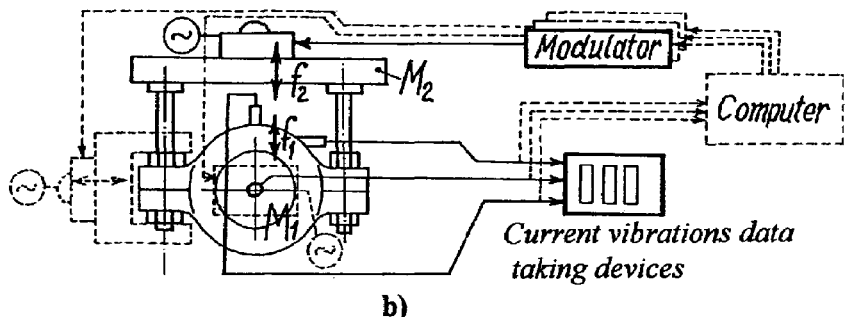
b)
The 'mass and vibrator' vibrating system method.
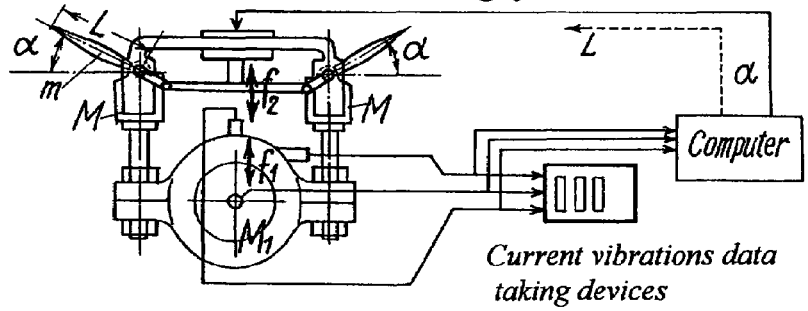
c)
The B-F-L-Ws method.
Fig. 28 Other methods of damping vibration [a), b)]
-- but of extremely limited capabilities to be used upon bearings-fulcra zones at T-G-Ss -- in comparison with the B-F-L-Ws method [c)].
See text.

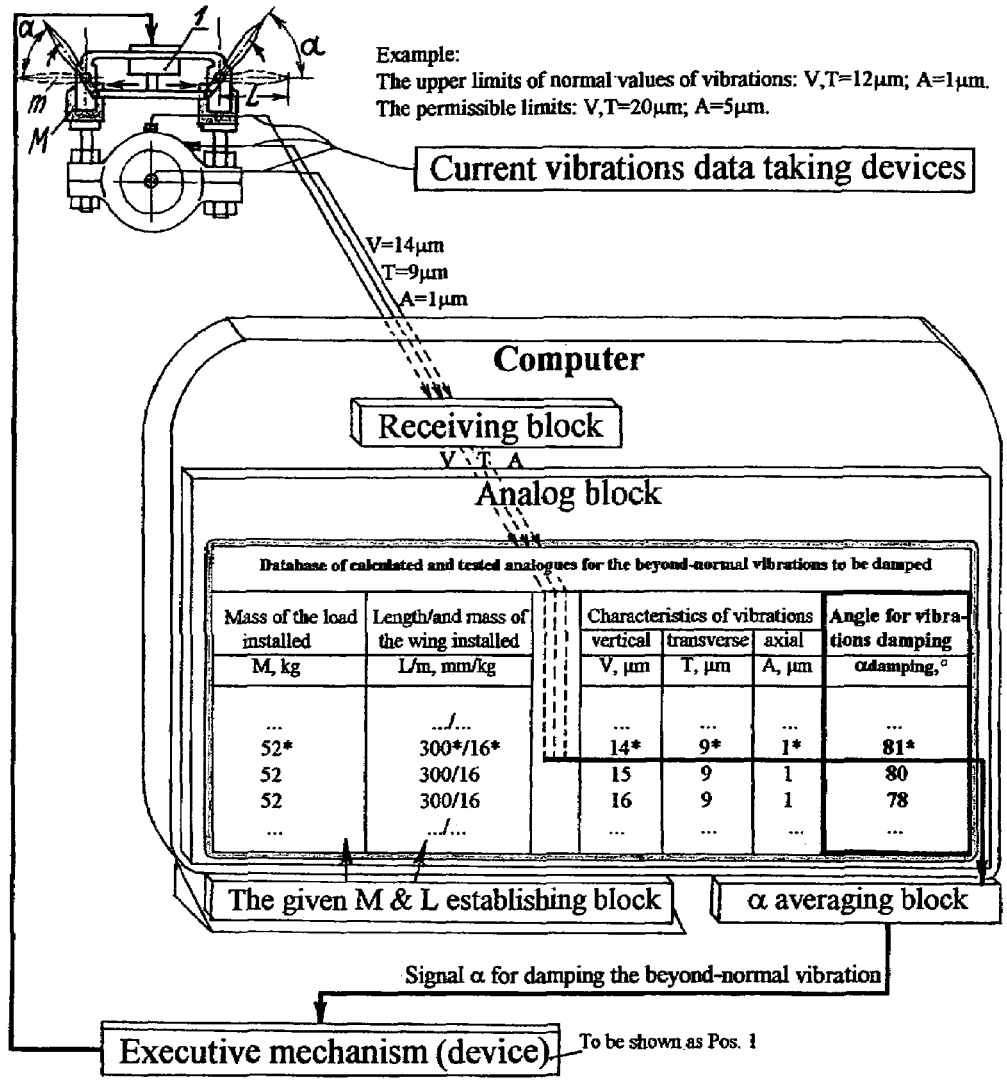
Fig. 29 Automation - - by use a computer and automatic equipment - - of process of removal of beyond-normal vibrations at T-G-Ss. [Wide diapasons.]
\* - Here, all the data are shown to serve as illustration only.

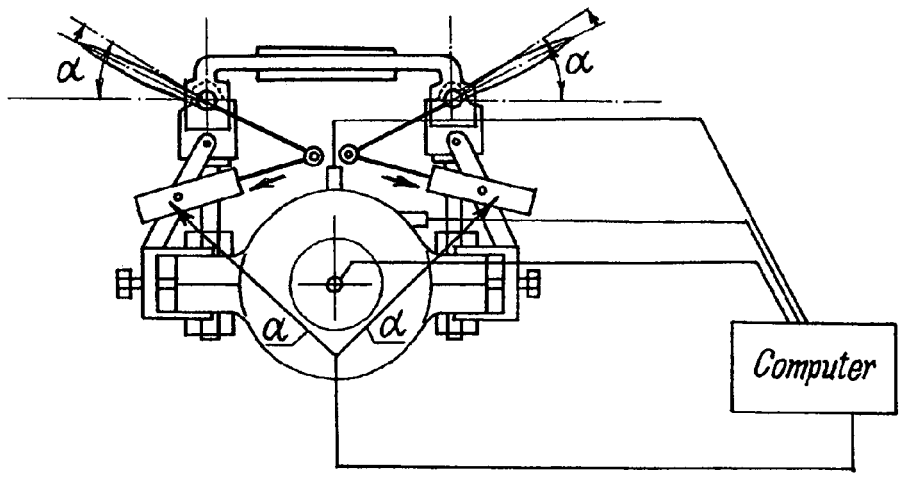
Variant I. Bifurcate signal α.
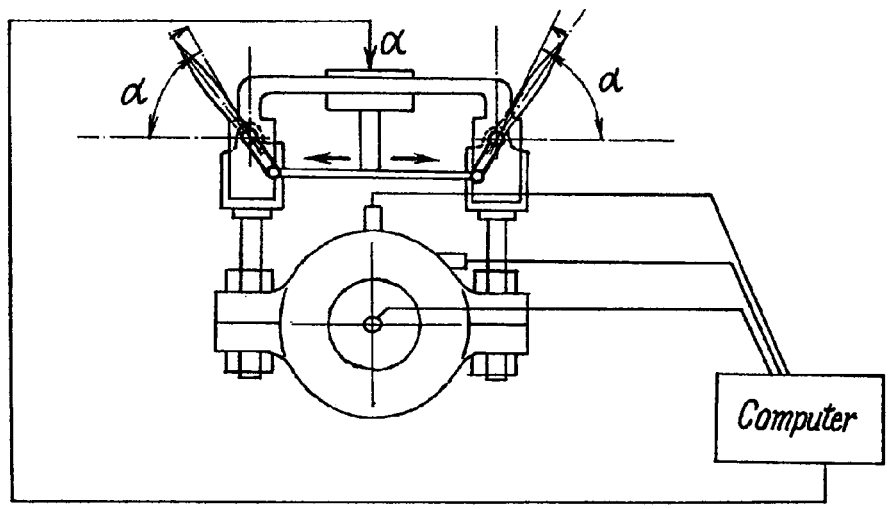
Variant II. Sole signal α.
Fig. 30 Variants of sending signal α.
Variant I: Bifurcate signal sent equally to the two separate executive mechanisms for turning the wings of the B-F-L-Ws.
Variant II: Sole signal sent to the united executive mechanism for turning the wings of the B-F-L-Ws.

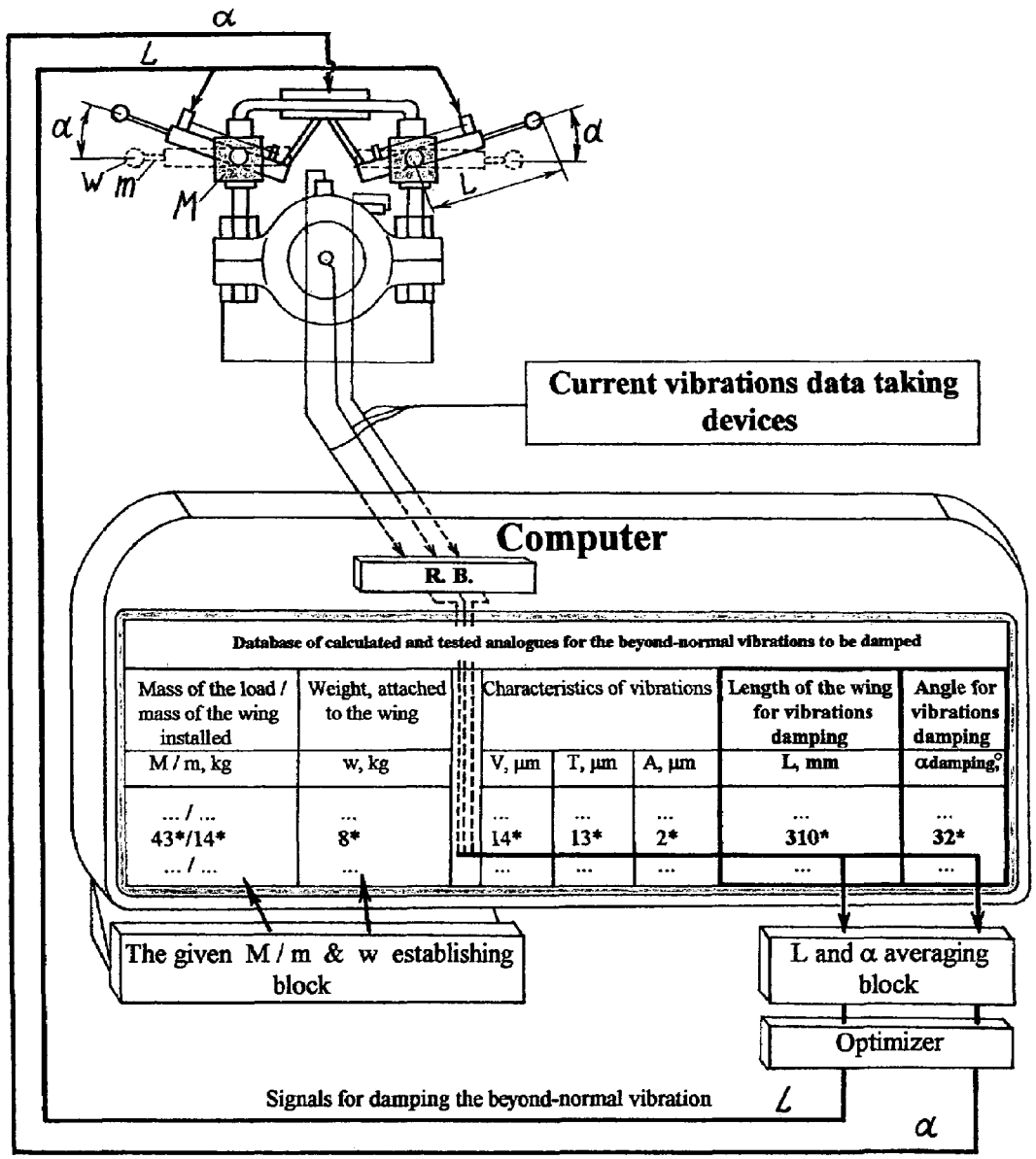
Fig. 31  Automation of process of removal of beyond-normal vibrations at T-G-Ss. [Super-wide diapasons].
\* - Here, all the data are shown to serve as illustration only.

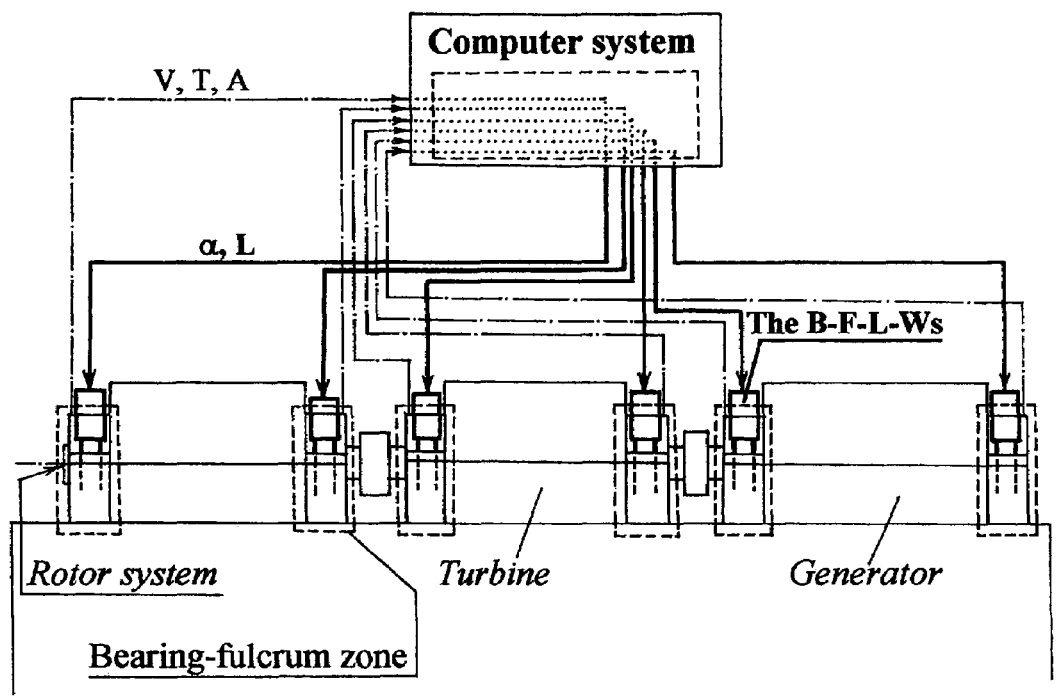
Fig. 32 Automation of process of removal of beyond-normal vibrations and keeping vibration situation normal and stable at whole T-G-S by the use of computer system and automatic equipment.

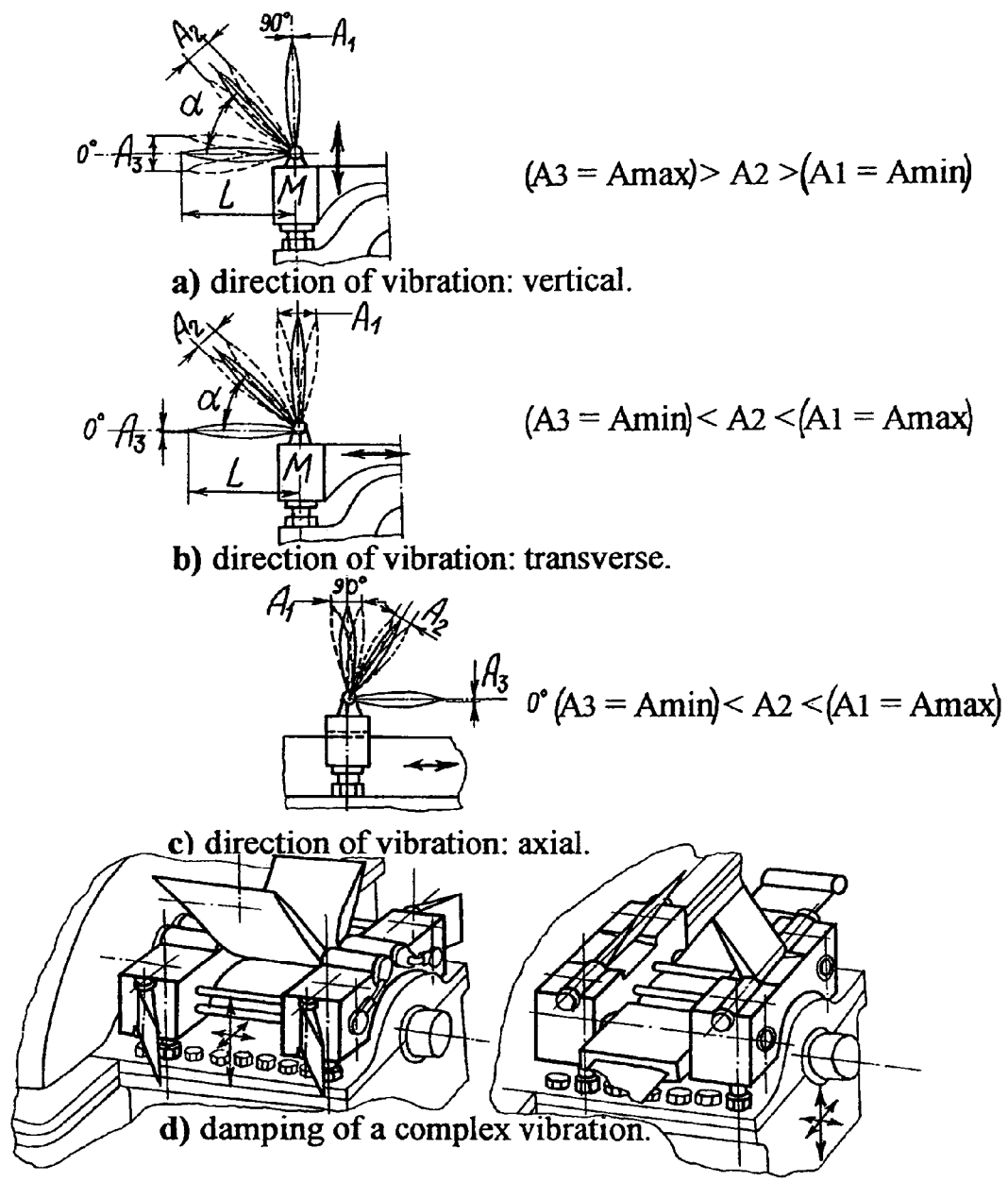
Fig. 33 Simple wings of the B-F-L-Ws.
Work of simple wing for damping vertical [a)], transverse [b)], axial [c)], complex [d)] vibrations within its turn round from 0° to 90°.

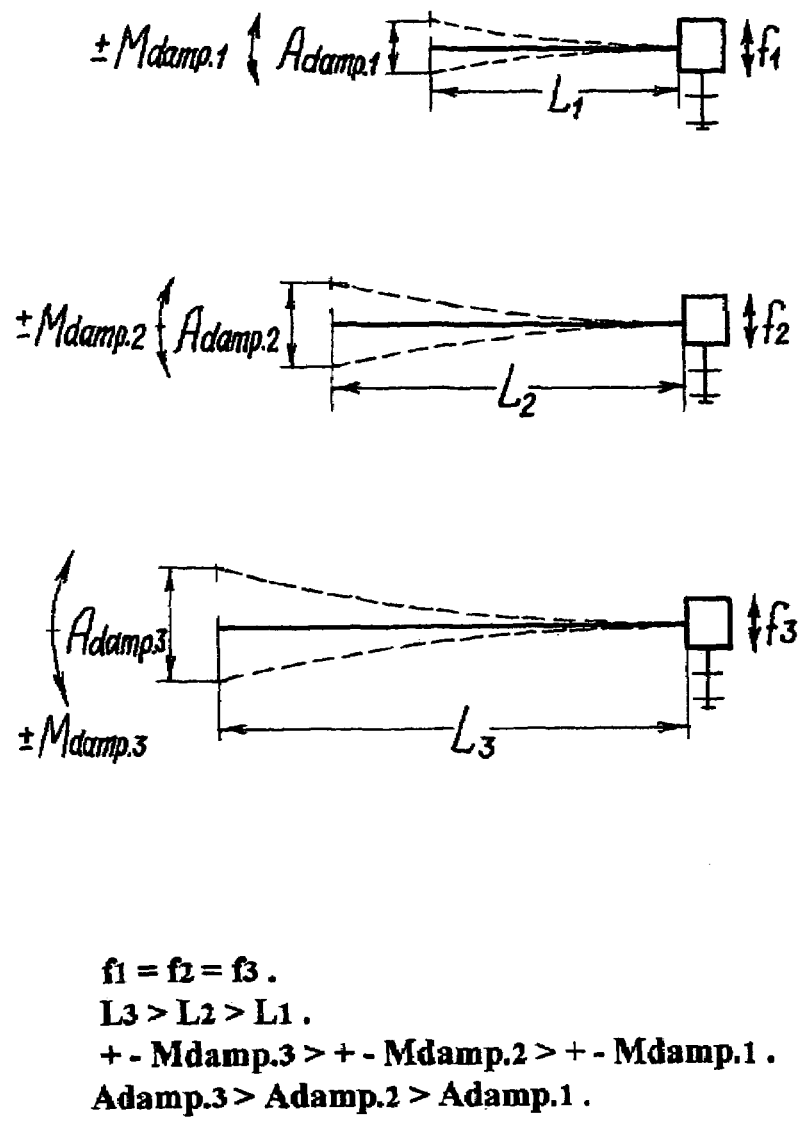
$f_1 = f_2 = f_3$.
$L_3 > L_2 > L_1$.
$+ - Mdamp.3 > + - Mdamp.2 > + - Mdamp.1$.
$Adamp.3 > Adamp.2 > Adamp.1$.
Fig. 34 An increase of damping capabilities (in damping momentum Mdamp. and damping amplitude Adamp.) of wing depending on elongation of its length.

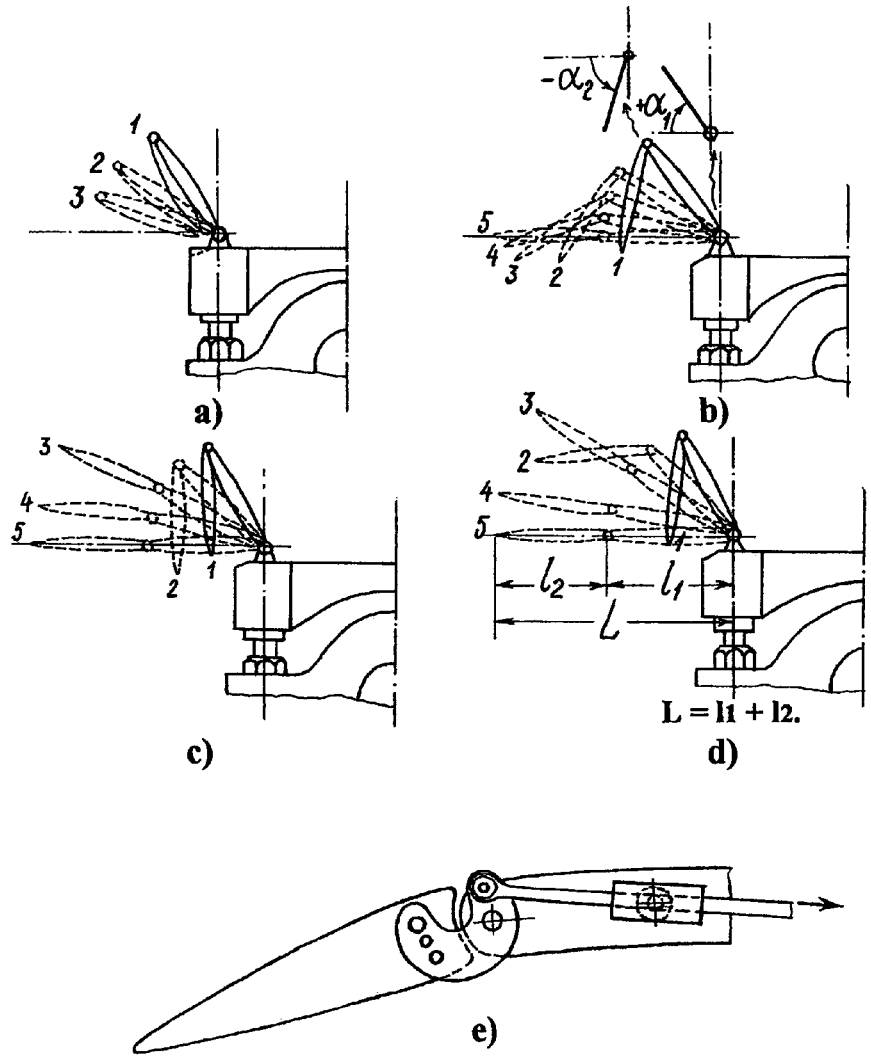
Fig. 35 Folding wings of the B-F-L-Ws.
Change of damping capabilities of folding wing depending on summary angle ($\alpha_1 + \alpha_2 + ...$) and total length of wing ($l_1 + l_2 + ...$).
a), b), c), d) - variants of spreading folding wings; e) - mechanism for turning the wing (variant).

Imitative model                    Real model

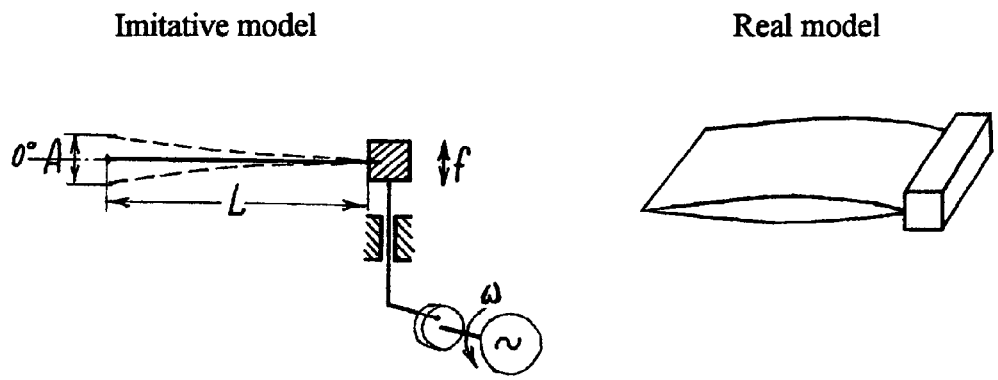

Velocity ω is low, frequency f is low.
Wing is firm, non-flexible / in construction, substance or texture of material /.

a)

Imitative model                    Real model

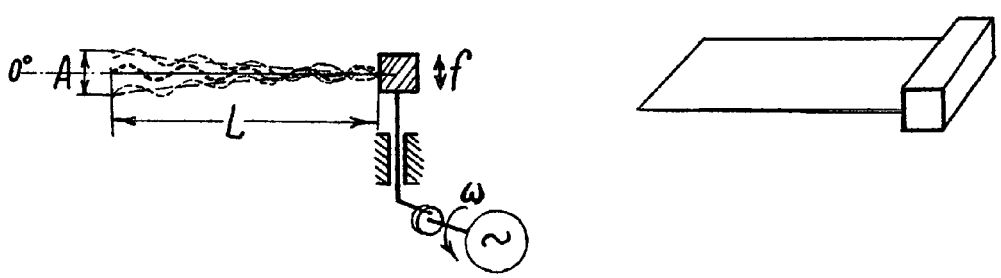

Velocity ω is high, frequency f is high.
Wing is highly elastic, flexible / in construction, substance or texture of material /.

b)

Fig. 36 Additional damping capabilities of wing depending on its flexibility.
a) firm wing; b) flexible wing.
(See text in Specification).

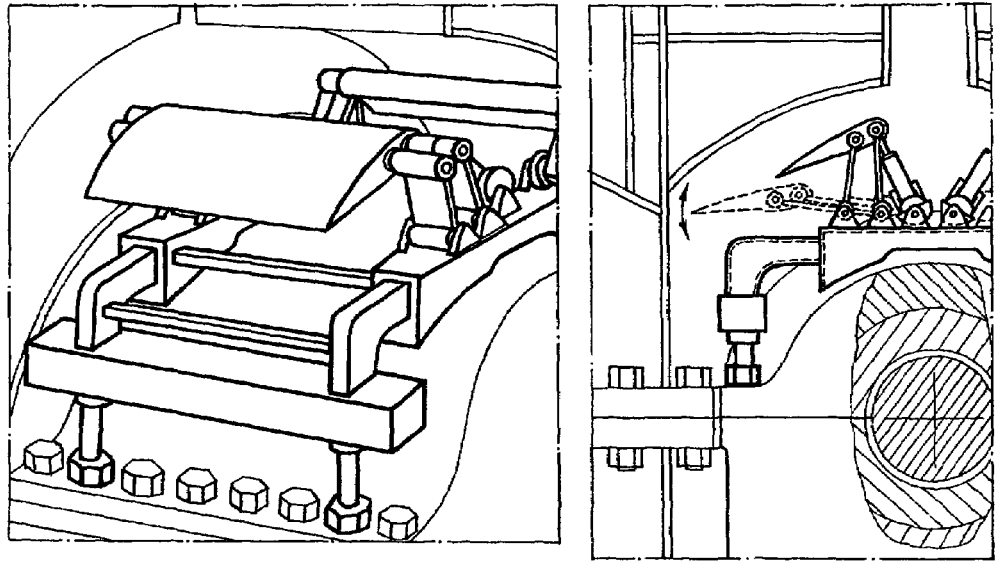
Variant A
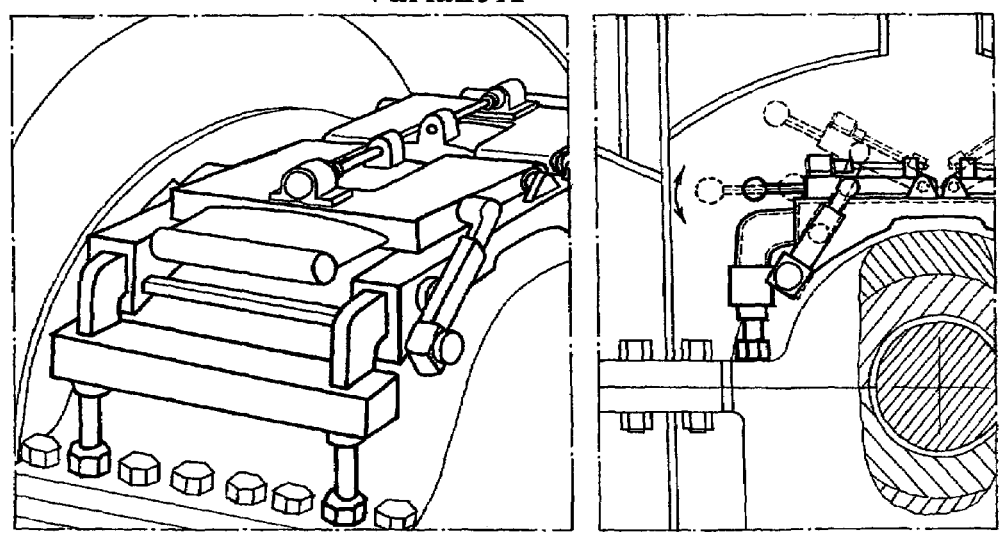
Variant B
Fig. 37 Some variants of the forms of the B-F-L-Ws adapted to be used at the T-G-Ss' bearings-fulcra with limited space for spreading the wings. See text in Specification.

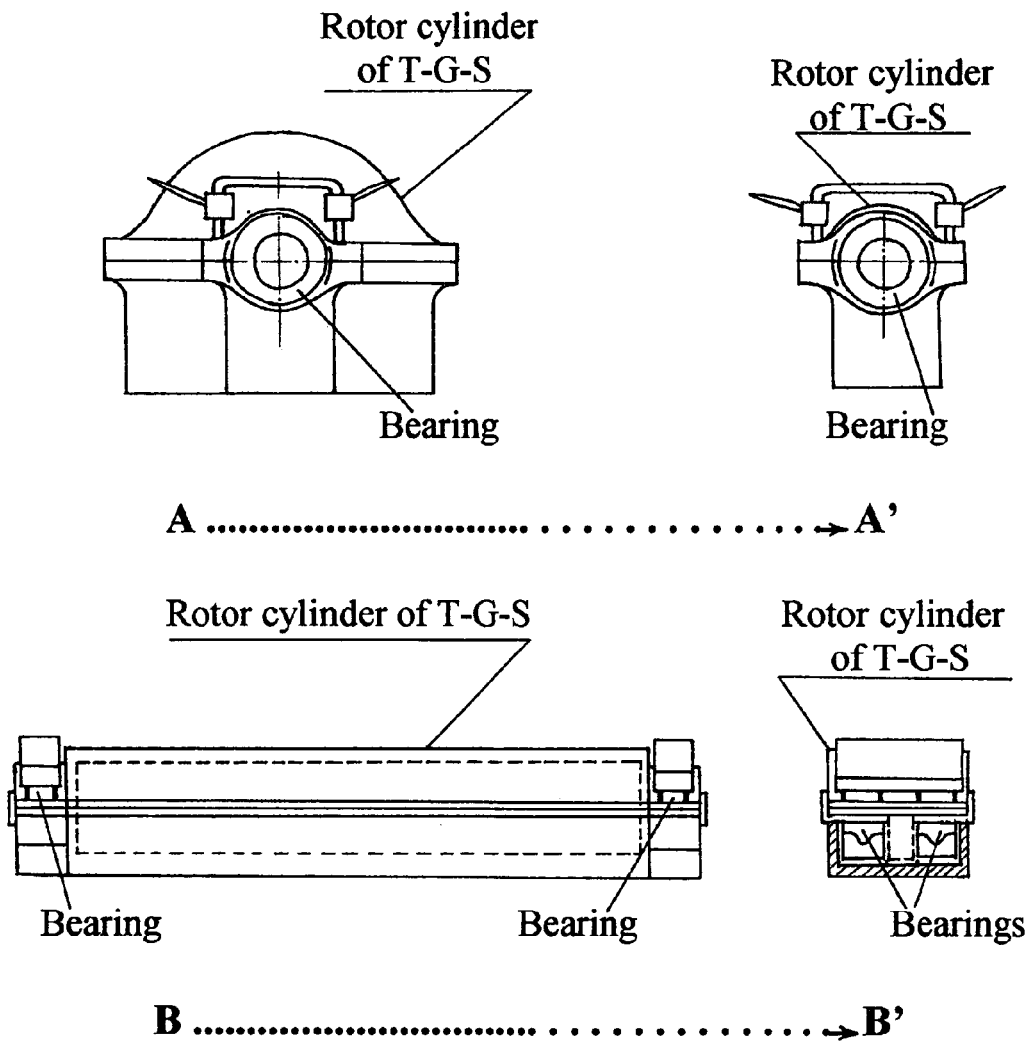
Fig. 38 Correlations A' and B' -- in mutual dimensions and constructions -- between bearings and their related rotor cylinder for which the method of removal of vibrations may be used so, that the B-F-L-Ws will be installed already upon whole rotor cylinder.
Those rotor cylinders are specified- see text in Specification.

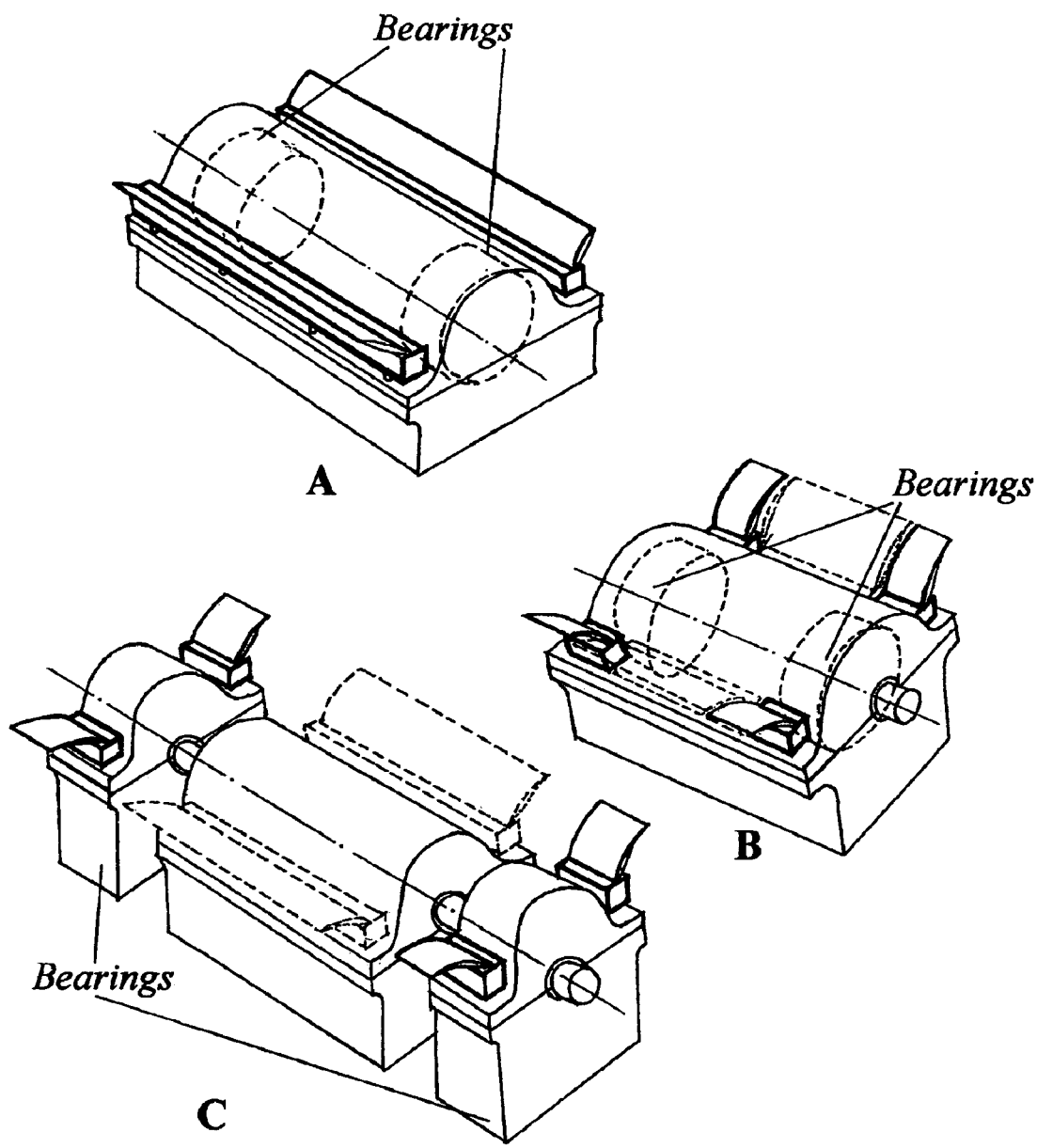
Fig. 39 Variants of installation of the B-F-L-Ws upon the whole rotor cylinders.
See text in Specification.

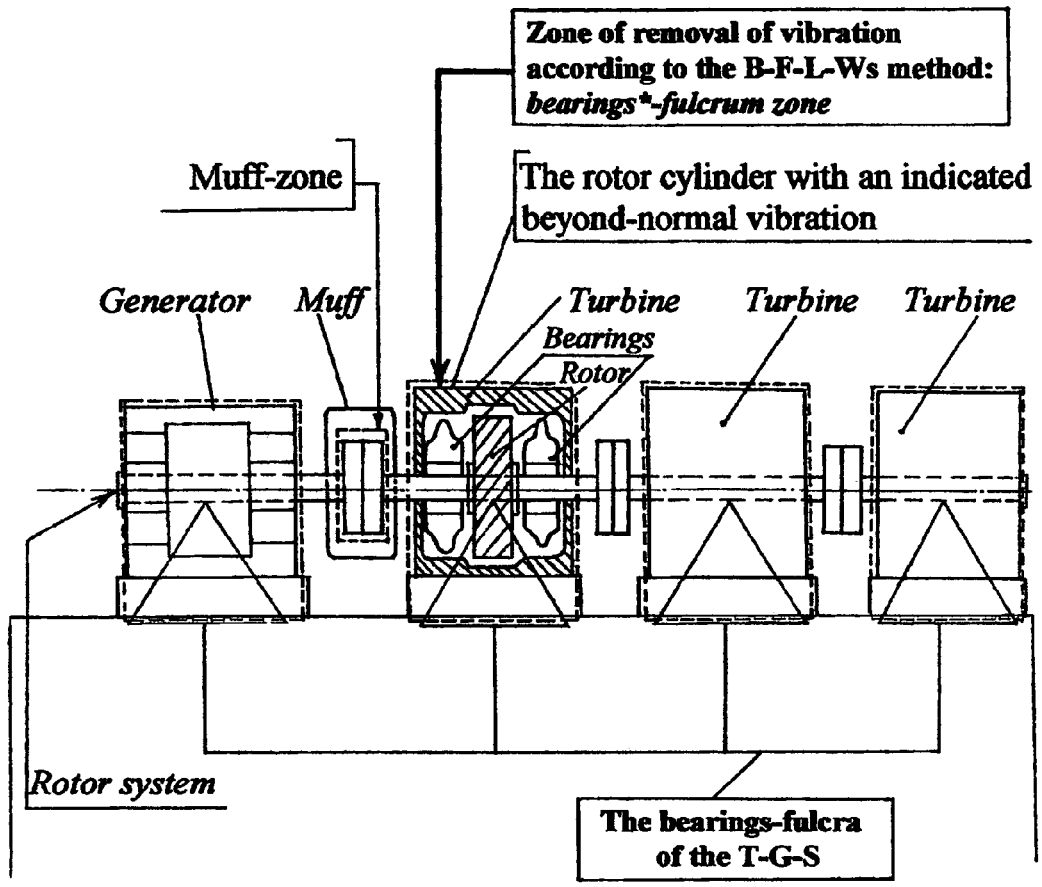

Fig. 40 The specified rotor cylinders of the T-G-S as the fulcra of the whole rotor system.
When the B-F-L-Ws may be used upon whole rotor cylinder and for the corresponding specified rotor cylinders - see text in Specification.

Installation of the B-F-L-Ws at the rotor cylinder as a whole, automation of the process of removal of vibrations at every cylinder as a whole and at whole T-G-S, the limitations are analogic to what must be done for the B-F-L-Ws to be installed and used at bearing-fulcrum.

\* - *bearings-fulcrum zone* - compare with *bearing-fulcrum zone* (see Fig. 1).

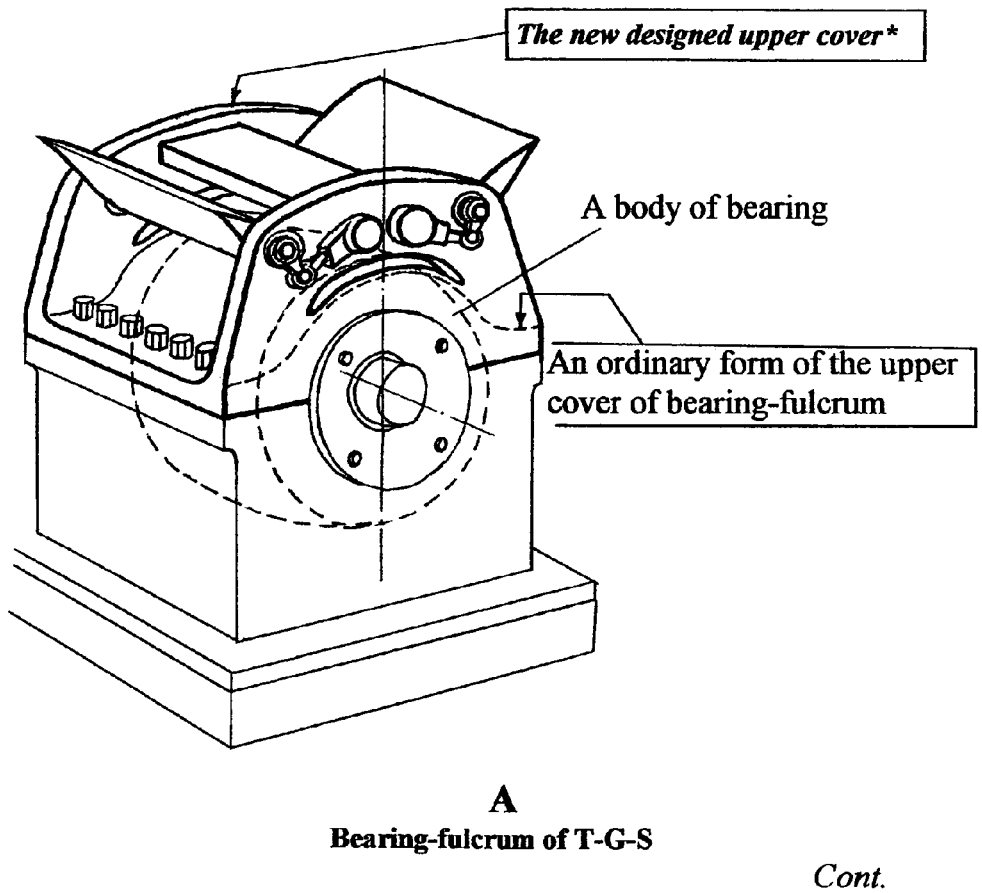

A
Bearing-fulcrum of T-G-S

*Cont.*

Fig. 41 Variants of simple changings of the construction of bearing-fulcrum (or the form of its upper cover) in the future designed T-G-Ss to be adapted for use of the B-F-L-Ws method - removal of vibrations at T-G-Ss without stopping their generating electricity / being in operation.

\* - *The additional mass (including loads-wings and related units) that will be added to the ordinary mass of upper cover has to be equal to a double mass of the single bearing-fulcrum-load-wing (B-F-L-W).*

Cont.

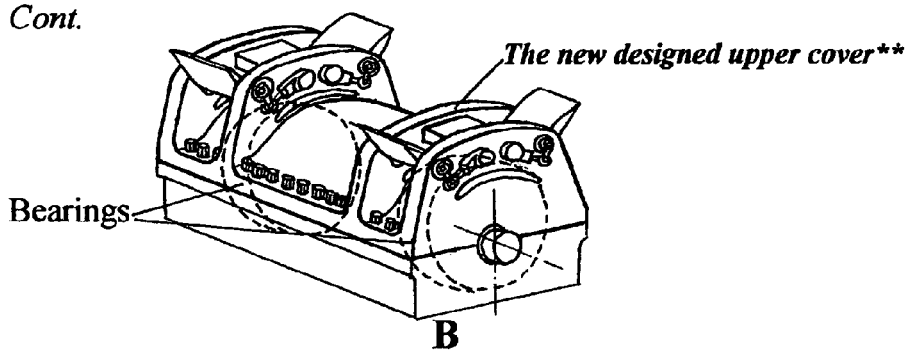

The specified rotor cylinder of T-G-S

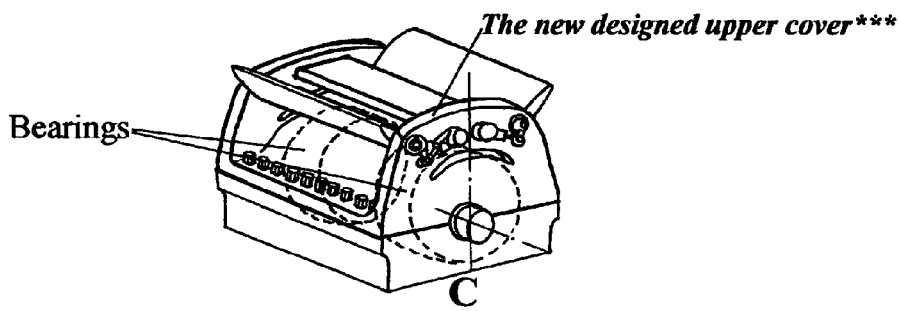

The specified rotor cylinder of T-G-S

Fig. 41 *Continuation.* Variants of simple changings of the construction of bearings-fulcrum (or the form of its upper cover) in the future designed T-G-Ss to be adapted for use of the B-F-L-Ws method - removal of vibrations without stopping their generating electricity / being in operation.

** - *The additional mass (including loads-wings and related units) that will be added to the ordinary mass of upper cover has to be equal to two double masses of the single bearing-fulcrum-load-wing (B-F-L-W).*

*** - *The minimal additional mass that will be added to the ordinary mass of upper cover has to be equal to two double masses of the single bearings-fulcrum-load-wing (B-F-L-W).*

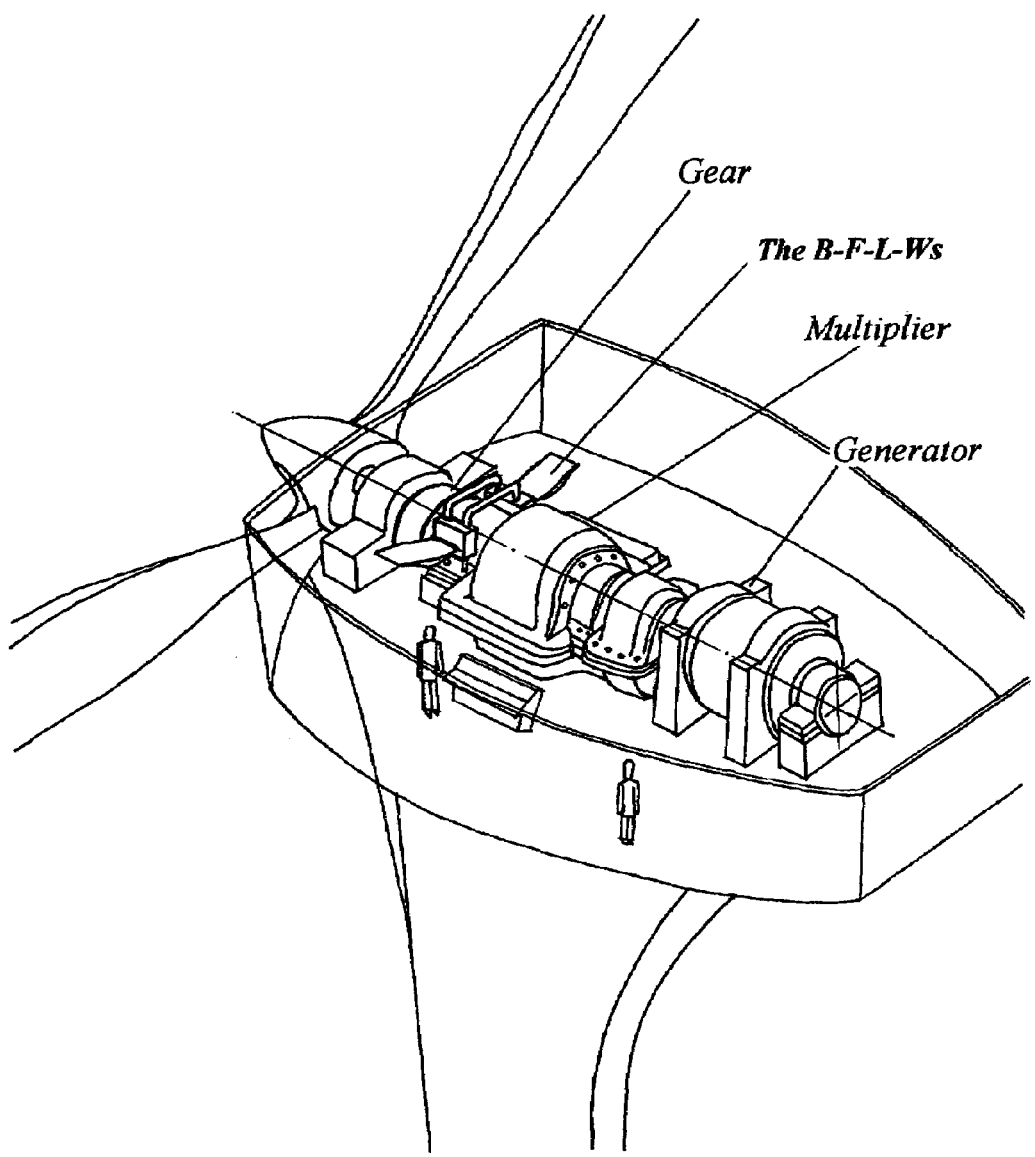
Fig. 42 Removal of vibrations with the B-F-L-Ws at bearing-fulcrum of T-G-S.
Wind Electro Power Plant.
General view.

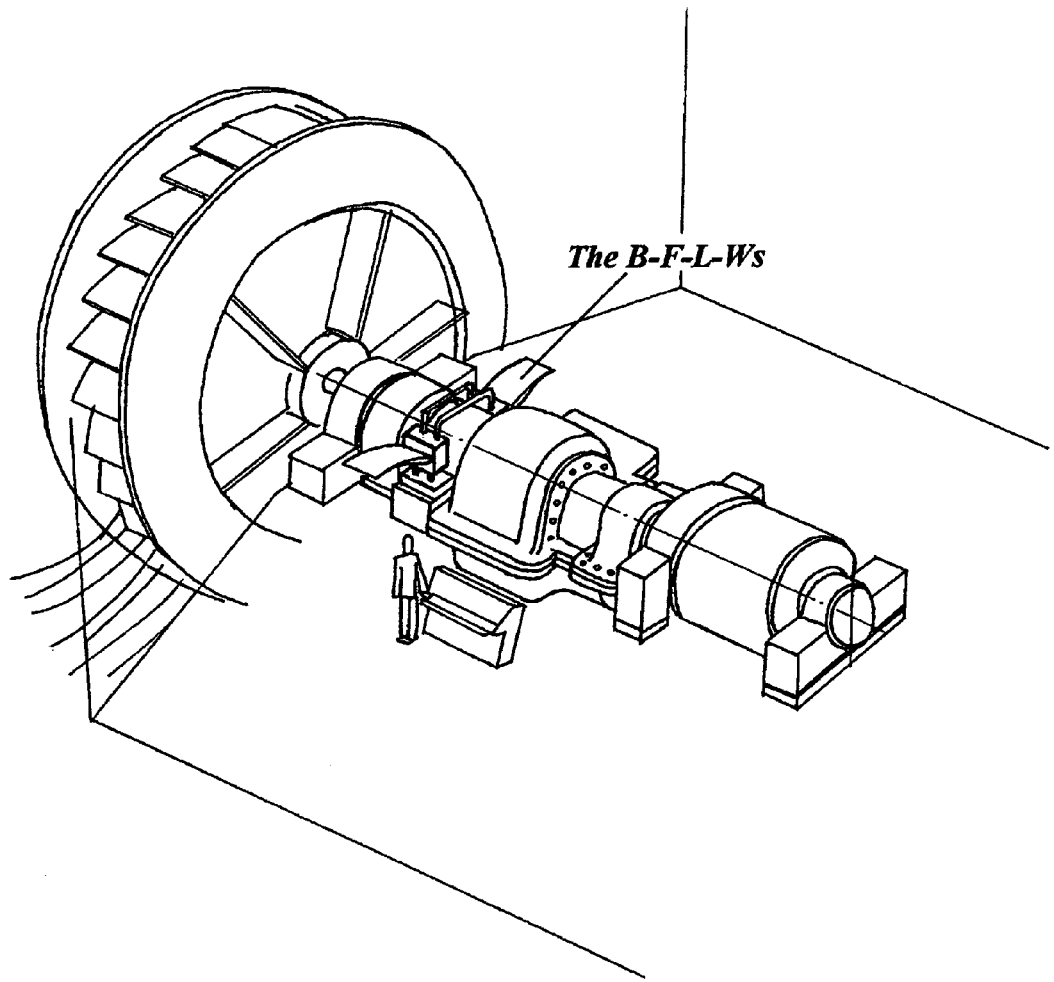
Fig. 43 Removal of vibrations with the B-F-L-Ws at bearing-fulcrum of T-G-S.
Hydro Electro Power Plant.
General view.

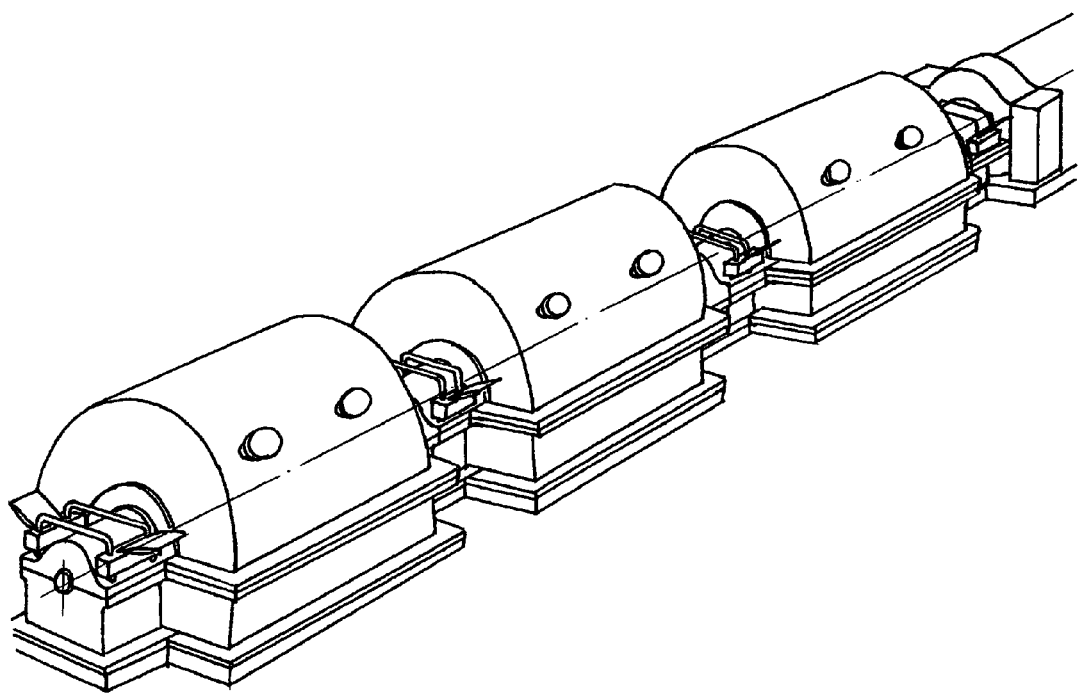
Fig. 44 Removal of vibrations with the B-F-L-Ws at whole T-G-S.
Electro Power Plant.
General view.

TURBINE GENERATOR VIBRATION DAMPER SYSTEM

RELATED APPLICATIONS

There are no previously filed, nor currently any co-pending applications, anywhere in the world.

BACKGROUND OF THE INVENTION

1. Field of the Invention

This invention relates to the methods and apparatuses for active removal internal vibrations from turbine-generator-sets (T-G-S). This invention covers all possible variations of horizontally placed T-G-Ss (in size, capacity, working velocity of rotor, diameter of working wheel, etc.), also all reasonable values of vibration (in amplitude and frequency, etc.), at presently existing all types power electro and other plants using rotary machines. Also, if the designs of future turbines and generators, first of all of high capacity, could originally include their bearings-fulcra improvements, based on this invention [use of the specified bodies, the B-F-L-Ws], that will make such machinery—with minimized shut-down period and minimized operating vibration—both more efficient and more safe for customers.

2. Description of the Related Art

From the beginning of time, mankind has relied on various sources of energy to survive. These sources have included wood, coal, oil, wind power, and nuclear energy to just name a few. However, just about all these sources rely on the fact that mechanical movement is transformed into electrical power by a turbine-generator-set. While the overall design of these turbine-generator-sets has been improved over the years, they still must deal with internal vibrations. Most of these vibrations are engineered or machined out during manufacture, but additional vibrations develop as the machine operates throughout the years. When these vibrations reach an unacceptable level, the turbine-generator-set must be shut down to allow adjustments to take place. These adjustments not only take time and money to perform, but the generator is not online, thus no electricity or associated revenue is produced. Accordingly, there exists a need for a means by which vibrations can be reduced in a turbine-generator-set in a continuous manner without the requirement of taking the generator off-line. The development of the Turbine Generator Vibration Damper System fulfills this need.

The Turbine Generator Vibration Damper System, as its name implies, is an apparatus that actively removes internal vibrations from turbine-generator-sets. The invention relies on dynamic forces generated by a pair of "wings" and associated hardware mounted on the bearing housing, which operate to offset internally produced vibrations in an active or "real time" fashion. This is in contrast to the typical method of taking the turbine-generator off-line, shutting it down and then eliminating the source of vibration. The invention allows the generator to remain operational during adjustments. Thus, it remains on-line producing electricity and associated revenue. Additionally, the workers, material and labor normally used in the static reduction of vibration are saved as well. As a net result, less redundancy or backup sources of electricity are needed. The use of the Turbine Generator Vibration Damper System provides a real solution to internal vibrations that develop in turbine-generator-sets throughout their lifetime.

A search of the prior art did not disclose any patents that read directly on the claims of the instant invention; however, the following references were considered related:

U.S. Pat. No. 6,070,704, issued in the name of Sasse, describes a torque converter with a torsional vibration damper.

U.S. Pat. No. 6,298,965, issued in the name of Krause et al., describes a force transmitting apparatus having an external damper.

U.S. Pat. No. 6,112,869, issued in the name of Krause et al, describes a force transmitting apparatus having an external damper.

U.S. Pat. No. 6,471,484, issued in the name of Crall, describes a method and apparatus for damping rotor assembly vibrations.

U.S. Pat. No. 6,006,879, issued in the name of Sudau, discloses a torque converter with a torsional vibration damper arrangement.

U.S. Pat. No. 6,056,093, issued in the name of Hinkel, describes a torque converter with a turbine shell integrated with a torsional vibration damper.

U.S. Pat. No. 6,056,092, issued in the name of Hinkel, describes a torque converter with bridge coupling and vibration damper between bridge coupling and turbine hub.

And, U.S. Pat. No. 6,102,174, issued in the name of Sasse, describes a hydrodynamic torque converter with a torsional damper arranged in the inner torus.

Consequently, a need has been felt for providing an apparatus and method for removing turbine generator vibrations without necessitating the shutdown of such turbine generators.

SUMMARY OF THE INVENTION

Vibration at rotary machines is what designers want least. Still, a beyond-normal vibration is the major problem causing unexpected emergency stops of a rotary machinery all over the world. In methods of removal of a beyond-normal vibration at turbine-generator-sets, it is known to shut these sets down into a short- or long-time stop, depending on the volume of work of vibration removal operation. In this invention, removal of vibration does not require a T-G-S to be shut down: its operating, and generating electricity and associated revenue, is continuing within process of removal of vibration.

According to the present invention, removal of vibration is accomplished by a summary action of both massive-loading and self-exciting forces, issued from Bearing-Fulcrum-Load-Wings [B-F-L-W], that are attached at extreme points, in where vibration is resulted upon T-G-Ss.

Installed either in advance or within process of operation of the T-G-Ss, the B-F-L-W's serve the following purposes:

1. To follow scanningly any change of vibration situation upon the bearings, with damping any slight increase of vibration, being indicated there as beyond-normal, down to normal values for all the processes of T-G-Ss operation/starting, all common-mode (power) operations, stopping/thoroughly, and, therefore, keeping a complete vibration situation upon T-G-Ss permanently normal;
2. To prevent an increase of vibration without stopping operation of turbo-aggregate, and thereby prevent any vibration from growing; and
3. To damp beyond-normal vibrations, that may occasionally occur within common-mode operations of the T-G-S's.

All of these avoid unexpected stops experienced presently at power, chemical and other industries that result from T-G-Ss throwing down into beyond-normal vibration situations and/or to prolong T-G-Ss being in operation/generating electricity up to their planned stops or up to other connected machinery/equipment stops, within which removal of vibration at these T-G-Ss may be done by other methods of adjustment.

In operation, the present invention relates to methods and apparatuses for removal, in wide in super-wide diapasons, of beyond-normal vibrations that may occur at horizontally placed turbine-generator-sets [T-G-Ss] within period of the time of their starting or/and current (common-mode) operations processes.

The key places of control of the vibration situation are presently the bearings of turbine-generator-sets. Any disbalance impulses or pulsations inside the cylinders, disturbances leading to vibration, are transferring eventually to influence on vibration situation at the bearings as fulcra of the rotors.

Increase of vibration at a bearing results into destroying of its lubricant layer, that results into a local increase of temperature of cooling oil (or cooling agent), and, therefore, into increase of temperature of babbitt-layer (or slippery surfaces) of a bearing.

When temperature of cooling oil (or cooling agent) inside a bearing is reaching upto the critical level, an automatic control system of turbine-generator-set is giving the signal 'STOP' to shut down this set on the whole, or this set may be stopped by operator before or within the temperature of oil has reached the critical level.

Destroying of slippery surfaces in such bearing results into destroying of the bearing(s), the rotor neck surfaces, etc., and may eventually lead to destroying of blade apparatus of the rotor and the correlative stationary parts in the cylinder. All parameters taken from the bearings of a turbine-generator-set are determining and forming the basic signal to shut down the set in case of a beyond-normal vibration.

Nevertheless, presently practicing methods of removal of a beyond-normal vibration at T-G-Ss, that occurs within its starting or/and common-mode operations processes, have a concern with the zone(s) of the rotor(s) muff(s), but not bearing(s).

According to presently practicing methods, removal of vibration is conducted by balancing the rotor(s) within the zone(s) located at the(se) rotor(s) muff(s)—the nearest muff(s) to the bearing(s) with an indicated beyond-normal vibration.

It is common that this balancing includes loading (with the small bodies—special weights of known mass—in the specially calculated place on a body of the rotor half-muff) or/and unloading this half-muff in the special place on its body. Loading is ordinary carried out by fixing the weight(s) (with welding, joining, etc.) on a body of the rotor half-muff. Unloading is ordinary carried out by cutting the weight(s) (or picking, burning, hollowing, grooving, etc. the weight(s) or body metal) off a body of the rotor half-muff.

To conduct this safely and according to the presently existing methods, two general things are required:

a) the covering case(s) of the rotor(s) half-muff(s) has/have to be open to reach the body of the muff(s), and/or, therefore, b) this turbine-generator-set has to be shut down, stopped in operation, and, therefore, not generating electricity (or compressing, or pumping products).

As minimum, the construction of all the(se) muff(s) covering case(s) (and of other parts) at all presently existing and the future turbine-generator-sets will require the preliminary and/or in-service changes to be done in a way to readily conduct these methods [in any bearing vibration occasion at any of turbines, generators, compressors or pumps] without stopping turbine-generator-sets.

However, if the decision to stop the set for balancing the rotor(s) at the muff(s) zone(s) is taken [or, more often, if the T-G-S has already been stopped automatically], then this stop also, commonly and as minimum, includes 1. Shutting down the set [turbine-generator].
2. Opening the bearing(s) of a beyond-normal vibration. Inspection the surfaces of babbitt layer inside the bearing(s) and the rotor(s) neck surfaces. Closing the bearing(s).
3. Opening the upper carter(s) of the case(s) of the rotor(s) muff(s).
4. Control of the rotors gathering in the place of their junction.
5. Loading the muff(s) body/(ies) with the balancing weights or removing (extraction) the balancing weights off the muff(s) body/(ies): balancing the rotor(s).
6. Dynamic balancing of the rotor(s). Testing within starting, gradually loading power, and stopping the set.
7. Closing the carter(s) of the case(s) of the muff(s).
8. Starting the set in operation.

Eventually, it results into loss of operating time from hours to days per year for the set, and into loss of money upto millions of dollars per year for the set (due to non-generating electricity, in case of power plants).

The new places (the new zones) of application to remove vibration at T-G-S. In this invention the place of application is transferred from the zone(s) of muff(s) to the zones of bearings-fulcra of T-G-Ss, i.e. where vibration is resulted.

Zones for application of the process (the method of removal of beyond-normal vibrations at T-G-Ss without stopping their generating electricity/being in operation) are shown in FIG. 1.

One can see that now the zone of application is transferred to the bearing-fulcrum zone(s) of the bearing(s) with indicated beyond-normal vibration.

An advantage of the present invention is that removal of vibration does not require a T-G-S to be shut down, thereby continuing operating and generating electricity during the process of removal of vibration.

Another advantage of the present invention is that ic can be installed in advance, or within process of operation of T-G-Ss, the B-F-L-Ws.

Yet another advantage of the present invention is that it is capable of damping beyond-normal vibrations that may occasionally occur within common-mode operations processes upon operating T-G-Ss, and, so, improving a thorough safety of T-G-Ss and their efficiency.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a cross sectional elevational view of a turbine generator vibration damper system according the present invention, showing zones for application of the process (the method of removal of a beyond-normal vibrations at T-G-Ss without stopping their generating electricity/being in operation)—bearings-fulcra zones;

FIG. 2A is a front elevational view of a principal scheme of application of the present invention upon presently existing T-G-Ss;

FIG. 2B is a front elevational veiw of a principal scheme of application of the present invention upon newly designed T-G-S's incorporating the present system integrally therein;

FIG. 3 is a front elevational view of a Bearing-Fulcrum-Load-Wings [B-F-L-W] for removal of beyond-normal vibrations in wide diapasons;

FIG. 4 is a front elevational view of a B-F-L-W for removal of beyond-normal vibrations in super-wide diapasons;

FIG. 5 is an exploded perspective view showing the main elements of the B-F-L-Ws;

FIG. 6 is a perspecitve view of the B-F-L-Ws for removal of beyond-normal vibrations in wide diapasons;

FIG. 7 is a perpective view of the B-F-L-Ws for removal of beyond-normal vibrations in super-wide diapasons;

FIG. 8 is a perspective view of the B-F-L-Ws for removal of beyond-normal vibrations in super-wide diapasons showing placement in direction perpendicularly to rotor axis of T-G-S;

FIG. 9 is an elevational view depicting loads of the B-F-L-Ws in various embodiments;

FIG. 10 depicts various configurations for the wings of the B-F-L-Ws;

FIG. 11 is an exploded cross sectional elevation of fixture units for fixing loads of the B-F-L-Ws to a case of bearing-fulcrum;

FIG. 12 is a side elevational view of the preferable setting of fixture units of the B-F-L-Ws.

FIG. 13 is a perspective view of the installation of the B-F-L-Ws with fixation which not requires replacement of the standard bolts of bearing-fulcrum;

FIG. 14 is a perspective view showing variants of units for changing the length of wings of the B-F-L-Ws;

FIG. 15 is elevational views of various types of drivers (shown schematically) of units for turning wings of the B-F-L-Ws;

FIG. 16 is a perspective view of a change of mass of wing of the B-F-L-Ws by attached weights;

FIG. 17 depicts side elevational views of variants of joint-units of the B-F-L-Ws;

FIG. 18 is an exploded view of the operations (in number and sequence) to install the B-F-L-Ws;

FIG. 19 depicts placements of the B-F-L-Ws around bearing-fulcrum of T-G-S in direction parallelly to rotor axis;

FIG. 20 depicts both correct and incorrect placements of the B-F-L-Ws at bearing-fulcrum/if to follow the instructions of the B-F-L-Ws method;

FIG. 21 depicts placement of the B-F-L-Ws upon bearing-fulcrum at T-G-S in direction perpendicularly to rotor axis;

FIG. 22 is a graph for determination of initial single mass of the load-wing of B-F-L-W as function of diameter of the rotor neck of T-G-S;

FIG. 23 depicts graphs for determination of initial single mass of the load-wing M(L-W)min as function of diameter of the rotor neck dneck rotor, for various values of designed operating frequency f of T-G-Ss;

FIG. 24 depicts distribution of the minimal/initial/single mass of the load-wing M(L-W)min among all elements and mechanisms, forming the single bearing-fulcrum-load-wing (B-F-L-W);

FIG. 25 depicts distribution of the minimal/initial/single mass of the load-wing M(L-W)min among all elements and mechanisms, forming the single bearing-fulcrum-load-wing (B-F-L-W);

FIG. 26 depicts distribution of the minimal/initial/single mass of the load-wing M(L-W)min among all elements and mechanisms, forming the single bearing-fulcrum-load-wing (B-F-L-W) with placement of the B-F-L-Ws in direction perpendicularly to rotor axis;

FIG. 27 depicts connecting of computer with the database to the bearing vibrations indicatory system to conduct removal of beyond-normal vibrations at the bearing-fulcrum automatically;

FIG. 28 depicts alternate methods of damping vibration;

FIG. 29 depicts automation of process of removal of beyond-normal vibrations at T-G-Ss utilizing computer control;

FIG. 30 is an alternate process of FIG. 29 depicting variants of sending signal "α";

FIG. 31 depicts automation of process of removal of beyond-normal vibrations at T-G-Ss for super-wide diapasons;

FIG. 32 depicts automation of process of removal of beyond-normal vibrations and keeping vibration situation normal and stable at whole T-G-S by the use of computer system and automatic equipment;

FIG. 33 depicts simple wings of the B-F-L-Ws for applications for damping vertical, transverse, axial, complex vibrations within its turn round from 0° to 90°;

FIG. 34 is a graphical representation showing an increase of damping capabilities (in damping momentum Mdamp. and damping amplitude Adamp.) of wing depending on elongation of its length;

FIG. 35 depicts folding wings of the B-F-L-Ws;

FIG. 36 depicts additional damping capabilities of wing depending on its flexibility;

FIG. 37 depicts variants of the forms of the B-F-L-Ws adapted to be used at the T-G-Ss' bearings-fulcra within limited space for spreading the wings;

FIG. 38 shows correlations A' and B'—in mutual dimensions and constructions—between bearings and their related rotor cylinder for which the method of removal of vibrations may be used so, that the B-F-L-WS will be installed already upon whole rotor cylinder;

FIG. 39 depicts variants of installation of the B-F-L-Ws upon the whole rotor cylinders;

FIG. 40 shows a side elevational view of the specified rotor cylinders of the T-G-S as the fulcra of the whole rotor system;

FIG. 41 is a perspective view showing variants of simple changings of the construction of bearing(s)-fulcrum (or the form of its upper cover) in the future designed T-G-Ss to be adapted for use of the B-F-L-Ws method—removal of vibrations at T-G-Ss without stopping their generating electricity/being in operation;

FIG. 42 is a perspective view showing removal of vibrations with the B-F-L-Ws at bearing-fulcrum of T-G-S. Wind Electro Power Plant;

FIG. 43 is a perspective view showing removal of vibrations with the B-F-L-Ws at bearing-fulcrum of T-G-S. Hydro Electro Power Plant;

And, FIG. 44 is a perspective view showing removal of vibrations with the B-F-L-Ws at whole T-G-S.

DESCRIPTION OF THE PREFERRED EMBODIMENTS

The best mode for carrying out the invention is presented in terms of its preferred embodiment, herein depicted within the Figures.

1. Detailed Description of the Figures

According to the preferred operation, the preseint invention relies on dynamic forces generated by the B-F-L-Ws, which operate to offset internally produced vibrations in an active or "real time" fashion. As seen best in FIG. 2A–2B, it can be seen that the static and dynamic components that would form the Turbine Generator Vibration Damper System include the loads 101 and the wings 102 that may be simple or changeable in length, width, weight, folding, multiply, etc. The fixture units 103 for fixing the loads to the case of the bearing-fulcrum, and the fixture units for fixing the wings to and turning the wings around the load (or to the joint-unit), utilize connecting arm 104 with the unit for turning the wings 105. It may also include, the loads, the wings and analogous associated mechanisms for damping of vibrations in the direction of the rotor axis, if necessary.

Damping of vibrations may be done with manual changing of the operational parameters of the vibrations damping or/and automatically by use of automatic equipment and computer system. The Turbine Generator Vibration Damper System may be installed at presently operating T-G-Ss, as shown in FIG. 2A, and in future designed T-G-Ss where the features of the bearing housing will be changed correspondingly for use of this method, as shown in FIG. 2B. Parameters V, T and A are current vertical, transverse and axial vibrations at the bearing.

As shown in FIGS. 3 and 4, more details on parameters $\alpha$ and L, indicated in FIG. 2A. The principal scheme of the B-F-L-Ws for removal of vibrations in wide diapasons is shown in FIG. 3. Here, for the stated mass of the load M and length of the wing L, also for the stated mass of the wing m and possible additional weight w, tuning the system to the damping of vibrations is done by changing the angle $\alpha$. Principal scheme of the B-F-L-Ws for removal of vibrations in super-wide diapasons is shown in FIG. 4. For the stated mass of the load M, also for the stated mass of the wing m and weight w, tuning the system to the damping of vibrations is done by changing the length of the wing L and the angle $\alpha$.

As earlier indicated, the system foresees the change of width, weights, etc. of the wings as well, if it would be necessary.

Principal view with indication of the main elements of the B-F-L-Ws, installed at the bearing-fulcrum of T-G-S, is shown in FIG. 5.

Here it includes: Loads, Wings, Fixture units, Units for turning the Wings (see: A), Units for changing the length of the Wings (see: B) and Joint-Unit. When, by all means, the final design (construction) of the B-F-L-Ws will eventually be, as designed, completed following the tests, it would be further reasonable to use FIG. 6 for illustrative purposes in the detailed description of this invention.

As above indicated, this invention covers all possible ways of designing, manufacturing, assembling, fastening, calculating the parameters, testing and using of the B-F-L-Ws and the computer system beyond those described below in this Specification unless the results of the work of the Turbine Generator Vibration Damper System are positive, i.e. it provides a solution to internal vibrations that develop in turbine-generator-sets throughout their lifetime.

This invention covers all possible variety of the B-F-L-Ws, which may be used within this method at presently existing and operating T-G-Ss and at the T-G-Ss of the future design. It also covers all possible variants of changes that may be done in the T-G-Ss bearings (or in the bearing-fulcra) of the future design at the future T-G-Ss in accordance with this invention.

The drawings, as described, are not of the final design (as the final design is to be obtained following the tests) but of the schematic design, that is sufficient, however, for detailed description of how the Turbine Generator Vibration Damper System may work for various applications upon T-G-Ss. Use of various elements and details of the B-F-L-Ws with placement in various directions to the rotor axis of T-G-S, including those with the space constraint and upon the whole rotor cylinders, of preferable placements and fixations of the B-F-L-Ws, of variations of automation of process, etc. is to be offered to manufacturers and customers. Being preferable, they are, however, not mandatory for as long as all other possible B-F-L-Ws and associated computer systems within frames of this invention are hereby covered when they may still provide a solution to internal vibrations.

Referring to FIG. 6, a detailed variant of the B-F-L-Ws, installed at the bearing-fulcrum of T-G-S, for removal of beyond-normal vibrations in wide diapasons is shown. This variant of B-F-L-W's include: Loads (101), Wings (102), Fixture units (103), Joint-Units (104) and Unit for turning the Wings (105). Detailed variant of the B-F-L-Ws, installed at the bearing-fulcrum of T-G-S, for removal of vibrations in super-wide diapasons is presented in FIG. 7. One can see that this variant of the B-F-L-Ws includes: Loads (101), Wings (102), Fixture units (103), Joint-Units (104), Units for turning the Wings (105) and Units for changing the length of the Wings (106). At the end of the wing one can also see Unit for changing the Weights.

Detailed variant of the B-F-L-Ws, installed at the bearing-fulcrum of T-G-S, for removal of vibrations in super-wide diapasons in the direction perpendicularly to rotor axis of T-G-S is shown in FIG. 8. In general, every B-F-LW, named hereinafter as the single B-F-L-W, may consist of the following elements:

1. The load, which may be casted as a whole body, if designed, or, as shown, assembled from the parts. An assembling must form the load as a rigid body. See more details in 9.

2. The wing, which may be formed (casted) as a whole body, if designed, or assembled from the parts as shown. See more details: FIGS. 10, 35.

3. The fixture unit for fixing the wing to and turning the wing around the load (or to the joint-unit). It may be of any suitable construction. See more details: FIGS. 10, and FIG. 17 (par. 4). If designed, the wing may be formed together with (the part of) the load.

4. The fixture unit for fixing the load to the case of the bearing-fulcrum. It may be of various [of any suitable] constructions, but here [see: FIG. 11(A), (B), (C)] as example, shown variant of using a pair of special pins and nuts. For preferable setting of fixture units, see FIG. 12. For variant of installation of the B-F-L-Ws with fixation which not requires replacement of the standard bolts, see: FIG. 13.

The single B-F-L-W may also include:

5. The unit for changing the length of wing (lengthening). See: FIG. 14. As earlier indicated, there might be the unit for changing the width of wing as well.

6. The unit for changing the weight of wing (weightening). See: FIG. 16.

The whole B-F-L-W needs

7. The unit(s) for connecting the single B-F-L-Ws together—the joint-units of the B-F-L-Ws. See: FIG. 17.

8. The computer system. See more details: FIGS. 27 and 29–32.

In reference to all the various embodiments, the loads 101 can comprise many possible types and at least fourteen various forms of the loads of the B-F-L-Ws are presented in the Figures. The ways (variants) of forming the loads of the B-F-L-Ws are also shown. The wings 102 can also come in various forms. Variants of fixation the loads to the wings are also shown. For preferable fixations of the wings fulcra (on)to the loads and the joint-units, see also: FIG. 17 (par. 4a, 4b, 4c). For variants of folding wings, see: FIG. 35.

Fixture units 104 are for fixing the loads of the B-F-L-Ws to a case of bearing-fulcrum. Variants of the fixture units for fixing loads of the B-F-L-Ws to a case of bearing-fulcrum are shown in FIG. 11. It may be in form of not divided pin (A) or bolt-collector and pin (B), (C). If such units will be installed, in advance or within operation of T-G-S, instead of the the standard bolts of the bearing-fulcrum, an installation of the B-F-L-Ws at the bearing-fulcrum may take just some minutes only.

The preferable setting of fixture units is shown in FIG. 12. Variant of installation of the B-F-L-Ws with fixation which not requires replacement of the standard bolts of bearing-fulcrum is presented in FIG. 13. Units for changing the length of the wings of the B-F-L-Ws, and variants of the units for changing the length of the wings of the B-F-L-Ws are shown in FIG. 14. The electrically driven units are presented on this picture.

Units for turning the wings of the B-F-L-Ws can use various types of drivers (shown schematically) of units for turning the wings of the B-F-L-Ws are presented in FIG. 15. Here one can see hydraulically (electro-hydraulically) driven wings (1), electrically driven wing (2), mechanically (manually) driven wing (3), electro-mechanically (and manually) driven wings (4), (5), (6).

Units for changing the weight of the wings of the B-F-L-Ws are shown in FIG. 16, which indicates variant of changing the weights w1, w2 and w3 by changing length and/or diameter of the weights.

Various kinds of the joint-units of the B-F-L-Ws are shown in FIG. 17. Variant 1 presents the connecting plates (also bars, ribs, etc.) that may serve to firmly join two loads. Variant 2 indicates the types of the connecting arch-shaped units for joining loads together. Here, for variants 2b, 2c and 2d wings fulcra are shown as fixed onto the joint-units. Variants 2e and 2f present the detailed view of the connecting arch-shaped pipe units. Variants 3a and 3b show the constructions when two loads may be manufactured as the whole one (by casting, pressing, shaping, etc.) with the arch jointing. For variant 3b wings fulcra are shown as fixed onto the joint-unit. One can also see the views of mechanisms for turning the wings of the B-F-L-Ws, shown in FIG. 17 with fixation (on)to the loads or onto the joint-units.

The most preferable variants of fixation of wings fulcra (on)to the loads and the joint-units are shown in FIG. 17 (par. 4a): those are the variants when the wings fulcra are fixed without eccentricity to the axises of the fixture units for fixing the loads to a case of the bearing-fulcrum of T-G-S (for the view perpendicularly to the axis of the bearing-fulcrum of T-G-S).

Pictures 4b and 4c in FIG. 17 describe what can happen if the wings of the B-F-L-Ws are fixed with the eccentricity to the axises of those fixture units. There are some recommendations given for designing the joint-units and correct fixing the wings (on)to the loads and the joint-units. First of all, designer should be tending to obtain the value of the external a and/or internal e eccentricities as little as possible to avoid the bending momentums in the joint-units. Second, the wider diameter $b_1$ of the fixture units is the better one, and the eccentricity (if any) $a_1$ should be less than $b_1/2$ (see: FIG. 17, par. 4b). Third, in case of internal eccentricity (such as for the B-F-W-Ss working in the limited space) the shorter wings are preferable (see: FIG. 17, par. 4c). Fourth, the system formed out of the loads M, the fixture units d and the joint-units $R_1$, $R_2$, should be so rigid that it may resist the momentum originated from the eccentricity (if any) (see: FIG. 17, pars. 4b, 4c).

As shown in FIG. 18, s the order (in number and sequence) to install—to place and to fix—the B-F-L-Ws at the bearing-fulcrum of T-G-S. This variant of installation includes:

1. Install 4 fixture units A (instead of the standard bolts of the case of the bearing-fulcrum). The parameters of the fixture unit A should be equal to (or better than) the corresponding parameters of the standard bolts. The installation of the fixture units A may be done in advance or within operation of the T-G-S. It may be done at one or several, or all bearings-fulcra of the T-G-S.

2. Place the B-F-L-Ws on the fixture units A. One should use a crane or lifting mechanism for this operation. Join the pins B with the fixture units A. And 3. Tighten the nuts D and E of the B-F-L-Ws.

Most adequate and practically possible variants of placement of the B-F-L-Ws around bearing-fulcrum of T-G-S in direction parallelly to rotor axis are presented in FIG. 19. Here, the most adequate and practically possible variant is (1 & 1'). Most adequate variant of placement is (4). Variants (2 & 2'), (3 & 3') and (6 & 6') may be considered additional (and limited in use).

Correct and incorrect placements of the B-F-L-Ws at bearing-fulcrum are shown in FIG. 20. One should pay attention to that transferring of vibrations from/to the case of bearing-fulcrum should be done through the zones of junction the B-F-L-Ws with the case of bearing-fulcrum, but not directly through the covering case(s) of bearing (for the view perpendicularly rotor axis) (see: FIG. 20, 2 Correct placement). Please also look at FIG. 12.

Most adequate and practically possible variants of placement of the B-F-L-Ws upon bearing-fulcrum of T-G-S in direction perpendicularly rotor axis (e.g. upon an axial stress bearing-fulcrum) are presented in FIG. 21. One can see that the most adequate and practically possible variant is (1), and most adequate variant is (2). Variant (3 & 3') may be considered additional.

2. Operation of the Present Invention.

When the B-F-L-Ws are being assembled, the complete tests are being passed and the data is collected, then being installed at the bearing-fulcrum the B-F-L-Ws may be operated by operator manually. Depending on whether the vibrations will be damped in wide or super-wide diapasons, operator should (manually or with the use of mechanisms) change the angles α, or the lengths of the wings L and corresponding angles α, according to the collected data for the vibrations being damped.

It is perferred that those operations will be done by automatic equipment with use of computers. Connecting of computer with the database to the bearing vibrations indicatory system to conduct removal of beyond-normal vibrations at the bearing-fulcrum automatically is shown in FIG. 27. Other methods of damping vibration are shown in FIG. 28.

The data taking devices of the current vibrations are practically installed at the bearings at all industrial T-G-Ss. Those electronic devices are indicating vertical, transverse and axial vibrations at every bearing of T-G-S. When computer with the installed database (see above: Collecting the data) is connected with the bearings vibration indicatory system, the values of vibrations will be received in computer and compared with what is in the database according to the tests of the B-F-L-Ws (see: FIG. 29—automation—by use of computer and automatic equipment—of process of removal of beyond-normal vibrations at T-G-Ss in wide diapasons).

By way of illustrations, if the values of current vibrations at the bearing-fulcrum are: vertical V=14 μm, transverse T=9 μm and axial A=1 μm. (The upper limits of normal limits of vibrations: V, T=12 μm; A=1 μm. The permissible limits: V, T=20 μm; A=5 μm.) Among the tested analogous situations, for this situation the angle α should be changed up to 81° to damp the beyond-normal vertical vibration. Computer gives signal "α=81°", which goes to the executive mechanism that turns the wing upto 810: the beyond-normal vibration is damped. The signal α, being sent from the computer to the executive mechanism(s) (see FIG. 30) may be bifurcate (variant I) or sole (variant II). For variant I: bifurcate signal sent equally to the two separate executive mechanisms for turning the wings of the B-F-L-Ws. For variant II: sole signal sent to the united executive mechanism for turning the wings of the B-F-L-Ws.

Automation of process of removal of beyond-normal vibrations at T-G-Ss in super-wide diapasons is shown in FIG. 31. Computer system works analogously to what is described in FIG. 32. But now, for the received and compared values of vibrations, computer sends two signals [L and α], to the executive mechanisms to damp beyond-normal vibration. Here, an optimizer may be used in this process: it is device serving to choose the variant of (L & α)—among many such sets of values for the one, which is the nearest [in time and to the values currently determined] set of (L & α)—to minimize work for the elongation and turning the wings in vibrations damping. Block for a averaging (see FIG. 29) and L and α averaging block (see FIG. 31) are devices that may be used for averaging of the values of α (FIG. 29) and the values of L and α (FIG. 30) among numerous currently obtained within certain very short period of time.

Automation of process of removal of beyond-normal vibrations and keeping vibration situation normal and stable at whole T-G-S by the use of computer system and automatic equipment is presented in FIG. 32. Here, analogously to above-described automation of vibrations damping at one bearing-fulcrum, vibrations are damped at all the bearings of the whole turbine-generator-set, i.e. at the bearings-fulcra of all cylinders simultaneously, following scanningly any change of vibration situation upon the bearings, with damping any slight increase of vibration, being indicated there as beyond-normal, down to normal values for all the processes of T-G-Ss operation; this will keep a complete vibration situation permanently normal and stable at the whole T-G-S. It should be noticed, that here every B-F-L-Ws receives its own command from the computer (computer system).

Automation of process of removal of beyond-normal vibrations at T-G-Ss may be done when the B-F-L-Ws are installed at the whole cylinders.

One can see in FIG. 33 how vibration damping capabilities of simple wings increase within wing's turn round from 0° to 90° for damping of vertical a), transverse b) and axial c) vibrations. Here two variants of the B-F-L-Ws for damping of a complex vibration, i.e. of vertical, transverse and axial vibrations simultaneously, are also shown.

An increase of damping capabilities (increase of damping momentum Mdamp. and damping amplitude Adamp.) of wing depending on elongation of its length is shown in FIG. 34. One can see that for the same operating frequency both the damping amplitude and the damping momentum will increase with elongation of the wing. As a variant of how an elongation of the wings may also be achived, one can see picture of use of the folding wings that may allow increasing of the damping amplitude and the damping momentum of the wings in FIG. 35. Here, pictures a), b), c) and d) show variants of spreading the folding wings. Variant of the mechanism for turning the folding wing is shown in picture e).

When spreading of folding wings (or even spreading of simple wings) in the operating space is limited, an increase of damping capabilities of the B-F-L-Ws may certainly be done by placement of two or several simple wings (e.g. the heavy and short wings) with their fixation (on)to the loads or/and the joint-units one under another as shown in FIG. 17 (par. 4a). For that the air space(s) between the wings must allow them not touch each other within turn of each wing from 0° to 90° when the turn is done simultaneously with other wings.

Pictures of additional damping capabilities of wing depending on its flexibility are presented in FIG. 36. Use of highly elastic, flexible (in construction, substance or texture of material) wings may change the damping capabilities of the wing, comparing with use of firm and non-flexible one. Some variants of the forms of the B-F-L-Ws adapted to be used at the T-G-Ss' bearings-fulcra within limited space for spreading the wings are presented in FIG. 37. They relate, first of all, to the bearings-fulcra which are not completely open at some types of T-G-Ss. Variant A shows the B-F-L-Ws with the wings which work is based on the principle of work of the folding wings. Variant B shows the B-F-L-Ws where fixation of the wings boxes (with the wings) onto the joint-unit is done closer to the rotor vertical axis.

Under certain conditions, the rotor cylinders themselves may be accepted as the bearings-fulcra of the whole rotor system of the complete turbine-generator-set. Then the B-F-L-Ws may be installed at those cylinders (analogously to how it is done at bearing-fulcrum of cylinder of T-G-S) to damp beyond-normal vibrations at the rotor cylinders and keep a complete vibration situation over the whole rotor system at the whole T-G-S stable and normal permanently.

One may use this method in the only way, when the B-F-L-Ws will be installed at the whole rotor cylinders, if only those rotor cylinders are of the type (in the size, the construction, etc.), where (a) the related indicated vibrations at the bearings at the whole rotor cylinder will not differ from each other, or will differ in the certain stable functional mutual dependence which is/or is enable to be/known (or determined by present methods) for every moment; and at the same time; and (b) the removal of beyond-normal vibrations by this method can surely be done reducing the related vibrations down to normal level simultaneously both at the whole rotor cylinder (and at all its internal parts) and at its rotor bearings in particular.

Those cylinders are named as the specified rotor cylinders. Correlations A' and B'—in mutual dimensions and constructions—between bearings and their related rotor cylinder for which the method of removal of vibrations may be used so, that the B-F-L-Ws will be installed already upon whole rotor cylinder are shown in FIG. 38. Here, as examples, are given variants when the size of the bearing (in diameter) of the T-G-S does not differ from (or approximately equal to) the size of cylinder itself (in diameter) (see: Correlations A . . . A'), or/and when the distance between the bearings along the rotor axis does not differ from (or approximately equal to) the length of the cylinder itself (see: Correlations B . . . B'). Variants A and B relate to the ordinary cylinders. Variants A' and B' relate to the specified rotor cylinders where the above-mentioned conditions (a) and (b) must be observed.

The installation of the B-F-L-Ws at the whole rotor cylinder may be done as general variant [as shown at FIGS. 39, 40], or as an additional variant. As additional (to the installation at the bearings) variant it may be done only if need will be.

Before the B-F-L-Ws are to be installed at the whole (specified) cylinder, the limit of permissible vibration at the whole rotor cylinder must be known [it must be indicated in the technical documentation of this rotor cylinder or of the T-G-S, or must be determined within the preliminary tests with certain definition how the vibrations at the whole rotor cylinder refer to the vibrations at its rotor bearings].

The installation and fixing of the B-F-L-Ws at the whole rotor cylinder is analogous to what must be done for the installation and fixing at the bearings. Here, the limitations of the mass, length, etc. of the B-F-L-Ws are analogous to the installation at the bearings. Automation of the process of removal of vibrations at every cylinder as a whole and at the whole T-G-S is analogical to what must be done for the B-F-L-Ws to be installed and used at bearing-fulcrum. The specified rotor cylinders of the T-G-S as the fulcra of the whole rotor system are shown in FIG. 40. Every specified cylinder along the rotor system of the whole T-G-S may be accepted as the bearings-fulcrum of the rotor system. Here, when the removal of vibrations is to be done at the specified cylinders, every zone of removal of vibration according to the B-F-L-Ws' method at the specified cylinder may be called the bearings-fulcrum zone; compare with the bearing-fulcrum zone (see also to compare: FIG. 1).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A Turbine Generator Vibration Damper System comprising:
    a pair of bearing fulcrum load wings mounted to a location on a bearing housing of a turbine-generator set that is susceptible to vibration;
   wherein each said bearing fulcrum load wings is foldable, wherein folding said wing results in tunability of vibration dampening capability.

2. A Turbine Generator Vibration Damper System comprising:
    a pair of bearing fulcrum load wings mounted to a location on a bearing housing of a turbine-generator set that is susceptible to vibration;
   wherein said pair of bearing fulcrum load wings are positioned at an angle relative to a lateral horizontal line of said bearing housing, said angle being changeable, and wherein said change of angle results in tunability of vibration dampening capability.

3. The Turbine Generator Vibration Damper System of claim 1, wherein each said bearing fulcrum load wing further comprises a plurality of multiple wing elements capable functioning integrally as a tunable bearing fulcrum load wing.

4. A Turbine Generator Vibration Damper System comprising a pair of bearing fulcrum load wings mounted to a location on a bearing housing of a turbine-generator set that is susceptible to vibration, wherein said bearing fulcrum load wings further comprises:
    a load element, said load element formed as a rigid body;
    a wing;
    a fixture unit for fixing said wing to said load element in a movable fashion; and
    attachment means for fixing said load to said bearing housing.

5. The Turbine Generator Vibration Damper System of claim 2, further comprising connecting means for firmly joining together at least two said load elements.

6. The Turbine Generator Vibration Damper System of claim 5, further comprising control means for manipulating said attachment means in a manner to move said load element such as to actively tune said system to prevent vibration.

7. The Turbine Generator Vibration Damper System of claim 6, wherein said control means for manipulating said attachment means in a manner to move said wing relatively said load element and to provide changes in lenght, width and weight of said wings such as to actively tune said system to prevent vibration is selected from the group comprising:
    computer electronic control, mechanical control, electro-mechanical control; hydraulic control; electro-hydraulic control; and manual control.

8. In a Turbine Generator set having a bearing housing, the improviement comprising a pair of bearing fulcrum load wines within said bearing hosing at a location on said bearing housing that is susceptible to vibration, wherein said pair of bearing fulcrum load wings are positioned at an angle relative to a lateral horizontal line of said bearing housing, said angle is changeable, and wherein said change of angle results in tunability of vibration dampening capability.

9. In a turbine generator set having a bearing housing, the improvement comprising forming at least one bearing fulcrum load wing within said bearing housing at a location on said bearing housing that is susceptible to vibration, wherein each said bearing fulcrum load wings is foldable, wherein the characteristics of each said bearing fulcrum load wings is changeable by folding, and wherein folding said wing results into tunability of vibration dampening capability.

10. In the turbine generator set of claim 9, wherein the characteristics of each said bearing fulcrum load wings is changeable by folding, wherein said folding changes in said characteristics result in tunability of vibration dampening capability.

11. In the turbine generator set of claim 9, wherein said characteristics changed by folding are selected from the group comprising: length, width, weight, shape, position, relative angle between said bearing fulcrum load wings and a lateral horizontal line of said bearing housing; flexibility of wings.

12. In the turbine generator set of claim 9, the improvement further comprising control means for manipulating an attachment means in a manner to move said wing relatively said load element such as to actively tune said system to prevent vibration.

13. In the turbine generator set of claim 12, the improvement further comprising wherein said control means for manipulating said attachment means in a manner to provide folding of said wings and to provide changes in length, width and weight of said wings such as to actively tune said system to prevent vibration is selected from the group comprising: computer electronic control, mechanical control, electro-mechanical control, hydraulic control, electro-hydraulic control; and manual control.

14. The Turbine Generator Vibration Damper System of claim 1, wherein each said bearing fulcrum load wings is changeable in length, width, or weight, wherein changes in any said length, width or wieght result in tunability of vibration dampening capability.

15. The Turbine Generator Vibration Damper System of claim 2, wherein each said bearing fulcrum load wings is changeable in length, width, or weight, wherein changes in any said length, width or weight at an angle relative to a lateral horizontal line of said bearing housing, result in tunability of vibration dampening capability.

16. In the turbine generator set of claim 15, wherein said characteristics are selected from the group comprising: length, width, weight, shape, position, relative angle between said bearing fulcrum load wings and a lateral horizontal line of said bearing housing, and flexibility of wings.

17. The Turbine Generator Vibration Damper System of claim 2, wherein each said bearing fulcrum load wing further comprises a plurality of multiple wing elements functioning integrally as a tunable bearing fulcrum load wing.

* * * * *